GRAPHICAL DATA DIGITIZER

Filed Dec. 21, 1965 29 Sheets-Sheet 1

INVENTORS.
RONALD D. CONE
JOHN A. DYKMANS
BY FOWLER, KNOBBE & GAMBRELL
ATTORNEYS.

GRAPHICAL DATA DIGITIZER

Filed Dec. 21, 1965 29 Sheets-Sheet 2

INVENTORS.
RONALD D. CONE
JOHN A. DYKMANS
BY FOWLER, KNOBBE
& GAMBRELL
ATTORNEYS.

April 7, 1970 R. D. CONE ET AL 3,505,670

GRAPHICAL DATA DIGITIZER

Filed Dec. 21, 1965 29 Sheets-Sheet 3

INVENTORS.
RONALD D. CONE
JOHN A. DYKMANS
BY
FOWLER, KNOBBE
& GAMBRELL
ATTORNEYS.

INVENTORS.
RONALD D. CONE
JOHN A. DYKMANS
BY FOWLER, KNOBBE & GAMBRELL
ATTORNEYS.

GRAPHICAL DATA DIGITIZER

INVENTORS.
RONALD D. CONE
JOHN A. DYKMANS
BY FOWLER, KNOBBE
& GAMBRELL
ATTORNEYS.

INVENTORS.
RONALD D. CONE
JOHN A. DYKMANS
BY FOWLER, KNOBBE
& GAMBRELL
ATTORNEYS.

INVENTORS.
RONALD D. CONE
JOHN A. DYKMANS
BY
FOWLER, KNOBBE
& GAMBRELL
ATTORNEYS.

INVENTORS.
RONALD D. CONE
JOHN A. DYKMANS
BY
FOWLER, KNOBBE
& GAMBRELL
ATTORNEYS.

TIMING DIAGRAM

INVENTORS.
RONALD D. CONE
JOHN A. DYKMANS
BY FOWLER, KNOBBE
& GAMBRELL
ATTORNEYS.

INVENTORS.
RONALD D. CONE
JOHN A. DYKMANS
BY
FOWLER, KNOBBE
& GAMBRELL
ATTORNEYS.

INVENTORS.
RONALD D. CONE
JOHN A. DYKMANS
BY
FOWLER, KNOBBE
& GAMBRELL
ATTORNEYS.

INVENTORS.
RONALD D. CONE
JOHN A. DYKMANS
BY FOWLER, KNOBBE
& GAMBRELL
ATTORNEYS.

FIG. 20. ENCODER PICK-OFF DRIVER 250

INVENTORS.
RONALD D. CONE
JOHN A. DYKMANS
BY
FOWLER, KNOBBE
& GAMBRELL
ATTORNEYS.

FIG. 21. ENCODER PICK-OFF READ AMPLIFIER R1

INVENTORS.
RONALD D. CONE
JOHN A. DYKMANS
BY
FOWLER, KNOBBE
& GAMBRELL
ATTORNEYS.

N LOGIC

INVENTORS.
RONALD D. CONE
JOHN A. DYKMANS
BY FOWLER, KNOBBE & GAMBRELL
ATTORNEYS.

INVENTORS.
RONALD D. CONE
JOHN A. DYKMANS
BY FOWLER, KNOBBE
& GAMBRELL
ATTORNEYS.

INVENTORS.
RONALD D. CONE
JOHN A. DYKMANS
BY FOWLER, KNOBBE & GAMBRELL
ATTORNEYS.

A1 LOGIC

A2 LOGIC

INVENTORS.
RONALD D. CONE
JOHN A. DYKMANS
BY
FOWLER, KNOBBE
& GAMBRELL
ATTORNEYS.

OB1 LOGIC

OB2 LOGIC

INVENTORS.
RONALD D. CONE
JOHN A. DYKMANS
BY FOWLER, KNOBBE
& GAMBRELL
ATTORNEYS.

1B1, 1B2 LOGIC

INVENTORS.
RONALD D. CONE
JOHN A. DYKMANS
BY
FOWLER, KNOBBE
& GAMBRELL
ATTORNEYS.

A3 LOGIC

A4 LOGIC

INVENTORS.
RONALD D. CONE
JOHN A. DYKMANS
BY FOWLER, KNOBBE
& GAMBRELL
ATTORNEYS.

OB4 LOGIC

INVENTORS.
RONALD D. CONE
JOHN A. DYKMANS
BY FOWLER, KNOBBE & GAMBRELL
ATTORNEYS.

1B4 LOGIC

1B8 LOGIC

INVENTORS.
RONALD D. CONE
JOHN A. DYKMANS
BY
FOWLER, KNOBBE
& GAMBRELL
ATTORNEYS.

OB8 LOGIC

INVENTORS.
RONALD D. CONE
JOHN A. DYKMANS
BY FOWLER, KNOBBE
& GAMBRELL
ATTORNEYS.

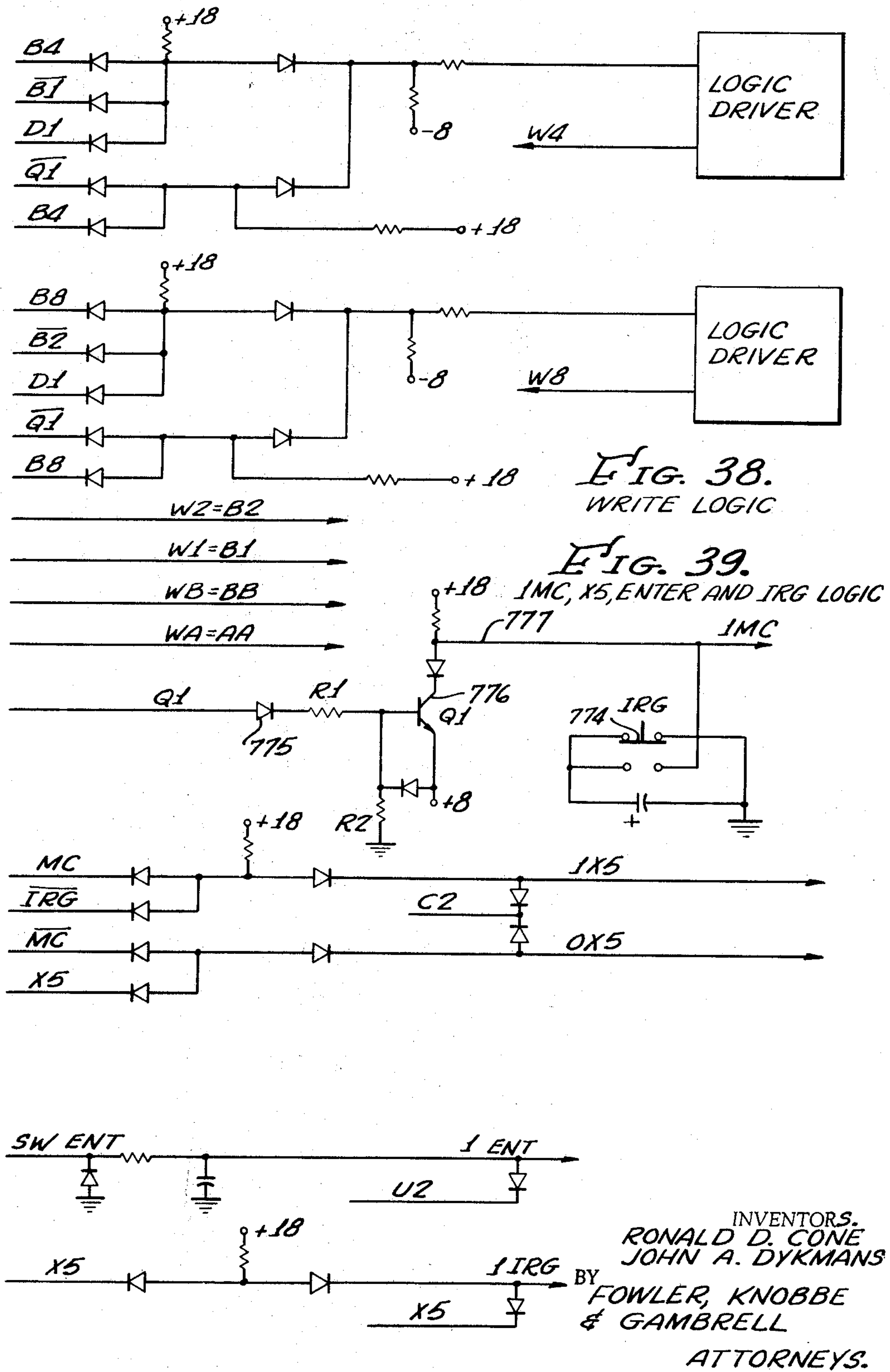
FIG. 38. WRITE LOGIC
FIG. 39. 1MC, X5, ENTER AND IRG LOGIC
INVENTORS.
RONALD D. CONE
JOHN A. DYKMANS
BY FOWLER, KNOBBE & GAMBRELL
ATTORNEYS.

INVENTORS.
RONALD D. CONE
JOHN A. DYKMANS
BY
FOWLER, KNOBBE & GAMBRELL
ATTORNEYS.

ES LOGIC

INVENTORS.
ROLAND D. CONE
JOHN A. DYKMANS
BY
FOWLER, KNOBBE & GAMBRELL
ATTORNEYS.

ES LOGIC

INVENTORS.
RONALD D. CONE
JOHN A. DYKMANS
BY
FOWLER, KNOBBE
& GAMBRELL
ATTORNEYS.

LAMP, DRIVER INPUT AND AUDIO ALARM LOGIC

OE LOGIC

INVENTORS.
RONALD D. CONE
JOHN A. DYKMANS
BY
FOWLER, KNOBBE
& GAMBRELL
ATTORNEYS.

United States Patent Office 3,505,670
Patented Apr. 7, 1970

3,505,670
GRAPHICAL DATA DIGITIZER
Ronald D. Cone and John A. Dykmans, Saratoga, Calif., assignors to Calma Company
Filed Dec. 21, 1965, Ser. No. 515,419
Int. Cl. H03k *13/02*; G06f *3/06*
U.S. Cl. 340—347 29 Claims

ABSTRACT OF THE DISCLOSURE

A graphical data digitizer wherein the graphical data is traced with a movable stylus and the motion of the stylus is translated into magnetically recorded digital data. Digital encoders produce digital data corresponding to movement of the stylus. These encoders are not supported by the carriage assembly, but rather by the digitizer housing so that the stylus has minimal friction and inertia. Data outputs from the digital encoders in excess of the capability of the magnetic recorder are immediately detected and a warning given the operator.

The present invention relates to a graphical data digitizer for converting graphical data into magnetically recorded digital data. More particularly, this invention relates to a digitizer wherein the operator traces the graphical data with a movable stylus and the digitizer translates the motion of the stylus into magnetically recorded digital data.

A very common source of input data for digital computers is information in graphical form. Such data may be located on single sheets of paper, rolls of paper, photographic film or photographs—i.e. on practically any type of visual recording media. Many governmental, industrial and scientific activities generate very large amounts of such data, examples being oil well logs, measurements of the earth's magnetic field, weather map contours, maps, cloud chamber experiments, electrical voltage and current wave forms, and business records. In these and many other fields of activity there exists a present need for digitizing all such graphically recorded data for digital computer computation or computer storage or both.

This invention provides a graphical data digitizer offering a number of significant features for providing extremely rapid, error free digitization of the graphical data. The invention produces digtized analog data directly on magnetic tape without the use of awkward hand wheels and cranks, delicate potentiometers, analog-to-digital voltage converters, punched cards, a buffer storage or synchronous tape recorder.

The overall design of the invention is directed toward providing an operator-actuated stylus having minimal friction and inertia. Accordingly, the movement of the stylus closely approximates the feel of an ordinary pen or pencil so that the operator is able to very quickly and precisely trace the graphical data.

Another primary feature of this invention is that the zero setting of the stylus may be changed from any point on the tracing bed to any other point thereon extremely quickly and without loss of accuracy. Stated in another way, the present invention provides infinite zero offset. For example, during a tracing procedure, if the analog data curve leaves the tracing bed, the graphical data may be moved so as to reposition the needed data on the tracing bed, the stylus shifted to accommodate the change of position of the curve, and the tracing resumed without recording any interruption on the magnetic tape.

A further advantage of the present digitizer is that it provides for an extremely rapid and accurate correction should any error be made during the tracing procedure. A separate key is provided on the digitizer for entering a blank interval at predetermined intervals during recording. Should an error be made, the operator need enter only an error code on the manual entry keyboard of the digitizer and return the stylus to the preceding gap position. Only that small portion of the graph between the error and the gap is then retracted and the processing computer disregards that portion of the tape which contained the error.

The speed at which data may be digitized with the present invention is apparent from the fact that with presently available incremental digital recorders, the digitizer of this invention can digitizer 125 inches of analog trace per minute. During an ordinary tracing procedure, an operator will never exceed the digitizing capability of the machine constructed in the manner of this invention. However, there is provided a means for detecting movements of the stylus which exceed the recorder capabilities in order to immediately notify the operator when he inadvertently jerks the stylus so as to momentarily exceed the 125 i.p.m. maximum allowable tracing speed. In this way, the operator may utilize the maximum capable recording capability of the machine with complete confidence since he knows that he will be given immediate warning should be exceed the maximum recording rate of the apparatus. Other safety features are also built into hte machine. Thus, a warning is given if the stylus is moved while the blank interval is entered on the tape recorder, thus indicating to the operator that he has shifted from the position at which he last ended his trace.

A further feature of the invention is that it provides a digitizer for graphical data appearing in practically any form, including data appearing on sheets or rolls of paper or like media and to optically projected graphictl data.

Other and further features and advantages of the invention will become apparent as the description proceeds.

Briefly, in accordance with a preferred form of the present invention, a graphical data digitizer comprises a stylus mounted upon a carriage assembly for movement along respective orthogonal axes over a tracing bed. At opposite ends of the tracing bed are located respective paper hold downs, paper feed and paper take-up drive assemblies. Each assembly includes a driven roll which may be used either as a paper take-up roll or in combination with an idler roll as a paper feed for folded paper.

The carriage assembly is supported for movement with respect to the tracing bed by a very low friction, low inertia means including a rod mounted at its upper and lower ends for translation across the tracing bed and a stylus housing movable along the length of the rod and having a locking means for locking the stylus at any point along the Y coordinate axis.

The X and Z axis digital encoders are supported by the digitizer housing. Each encoder includes a rotatable armature connected to the carriage assembly by a flexible cable. The cable connecting the carriage assembly to the X axis digital encoder is so arranged that a force applied to the stylus at any point along the carriage rod provides an equal force at both ends of the rod, thereby avoiding any tendency of the rod to skew and introduce error.

Means are provided for periodically sensing the position of the encoder armature heads and translating the output data therefrom into the X and Y increments which are recorded on the magnetic tape. Thus, each encoder comprises a rotatable magnetic armature cooperating with a magnetic core and produces a zero crossing signal for each rotational movement of the encoder armature through a predetermined distance. The encoder pick-offs and associated read-out circuitry provide a predetermined gap or dead space between respective read-out pulses thereby obviating generation of erroneous output signals when the stylus is at or near a threshold position.

Translation of the rod across the tracing bed upon movement of the stylus in the X direction produces rotational motion of both the X and Z axis encoder armatures, whereas movement of the stylus housing on the rod along the Y axis only produces movement of the Z axis encoder. Hence, rotational motion of the Z axis encoder produces data corresponding to the algebraic sum of movements along the X and Y coordinates.

The movements of the stylus by the operator are asynchronous and so likewise are the rotational movements of the encoder armatures. However, the pickoffs are synchronously pulsed and read to produce the output data bits which are recorded on the magnetic tape. The output signals of the X axis encoder are translated into data corresponding to +X and −X increments; similarly, the output signals of the Z axis pickoff are translated into data coresponding to +Z or −Z increments. The X increments are recorded directly on the magnetic tape, whereas the Z data is first combined with the X data in logic circuitry for producing digital data corresponding to +Y and −Y increments according to the equation $Y=Z-X$. An incremental or stepping recorder is pulsed to step and record only if a data bit or bits have been produced during the preceding record cycle. Thus, if the stylus remains stationary, so likewise the magnetic recording tape.

The digitizer has two primary modes, the tracer mode and the keyboard mode. In the tracer mode, the data produced by the digital encoders is recorded on the magnetic tape in accordance with the movement of the stylus along the X and Y coordinates. In the keyboard mode, a code may be manually entered into a keyboard and recorded on the magnetic tape for addressing the processing computer. In addition, the operator is provided with an Inter-Record-Gap (IRG) function which may be manually entered at the keyboard and which also is automatically entered each time the operator goes from the keyboard to the tracer mode. This Inter-Record-Gap provides a blank space on the tape and is used at periodic intervals along the graphical data in order to provide time for unloading the input memory. In addition, the IRG gaps provide a means for quickly and accurately correcting a tracing error.

The read-out circuitry associated with the pick-offs further includes a means for detecting if the stylus has been moved more quickly than the allowable record rate of the tape recorder. In this manner, the operator may utilize the full recording capacity of the recorder with confidence in that he is given an instantaneous warning if he should inadvertently exceed the recording capacity. In addition, a warning is given if the stylus is moved during the IRG entry.

A floating zero or infinite zero offset is provided by the invention by selecting the keyboard mode, moving the graphical plot to any desired position, re-positioning the stylus at the point at which the tracing was originally terminated, re-selecting the tracer mode and resuming the trace of the graphical data. The graphical data need only be aligned with respect to the orthogonal of the tracer bed without regard to any specific X or Y position thereon.

A more thorough understanding of the invention may be obtained by a study of the following detailed description taken in connection with the accompanying drawings in which.

Figure 2:
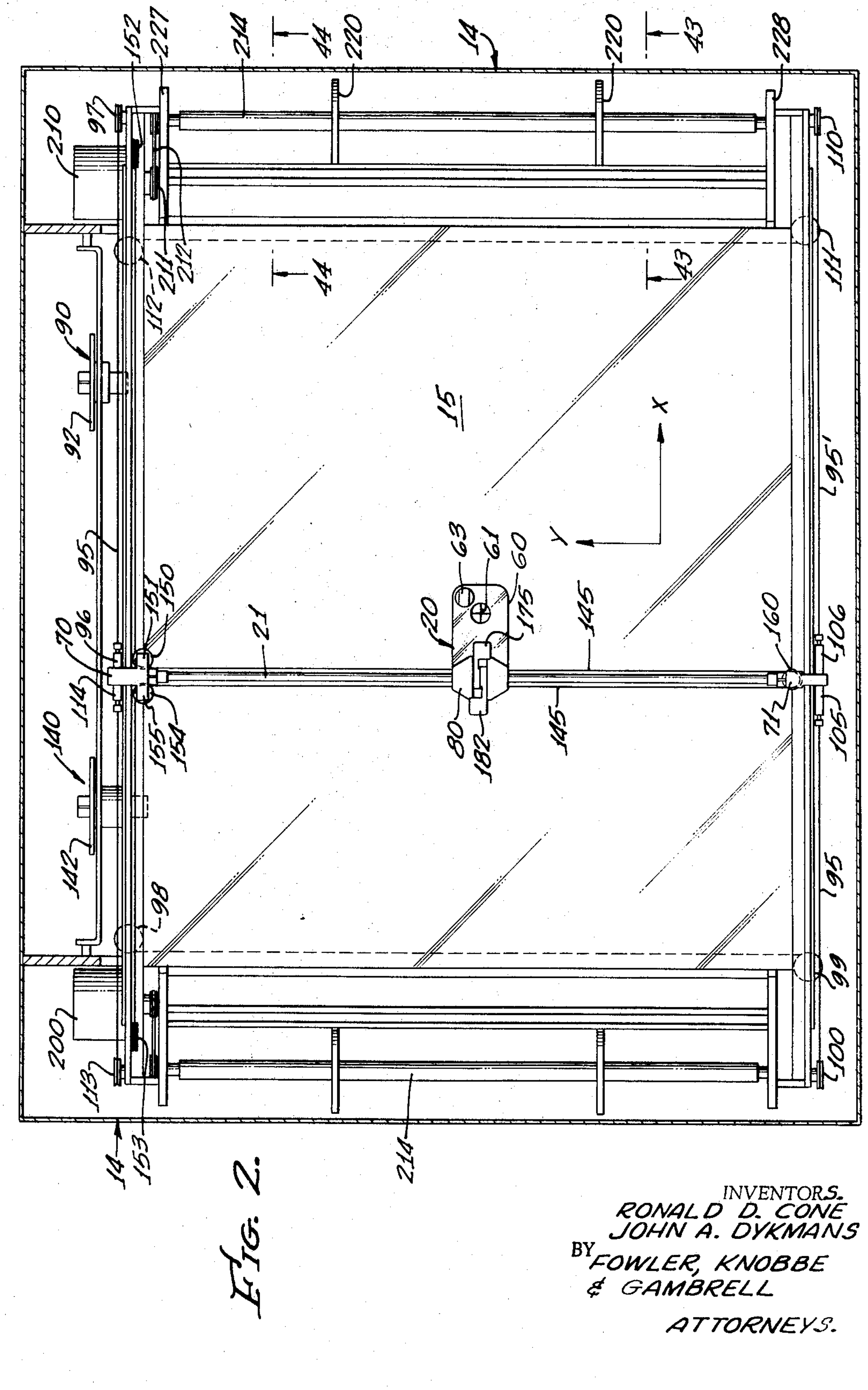
FIG. 2 is a plan view of the tracing bed, stylus, carriage assembly and the paper feed mechanism.
Figures 7, 8, 45:
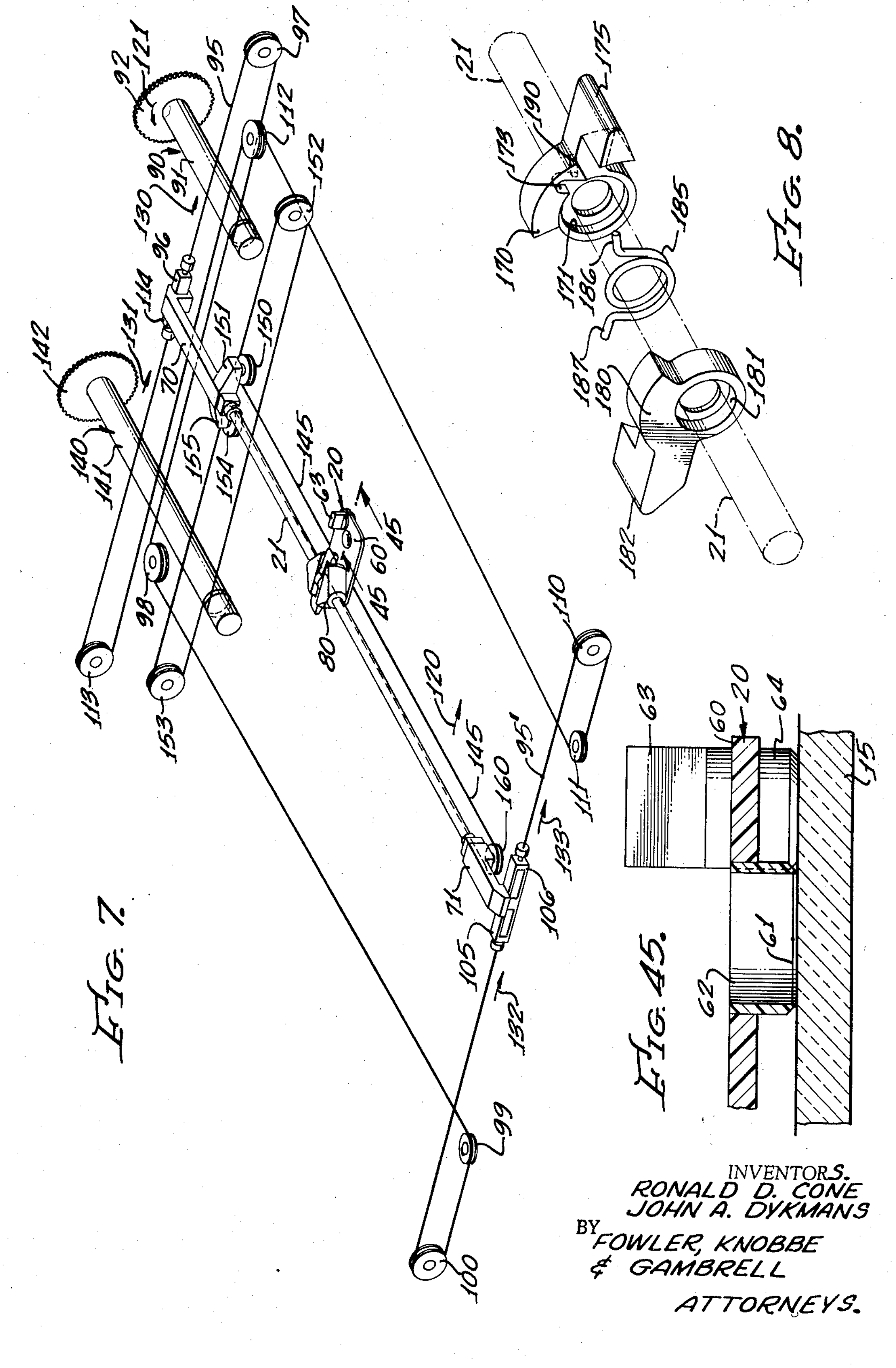
FIG. 7 is a perspective schematic illustrating the mechanical linkage interconnecting the stylus and carriage asembly with the X and Z axis digital encoders.
FIG. 8 is an exploded view of the housing lock for positioning the stylus at any selected position on the Y axis of the tracing bed.
Figure 9:
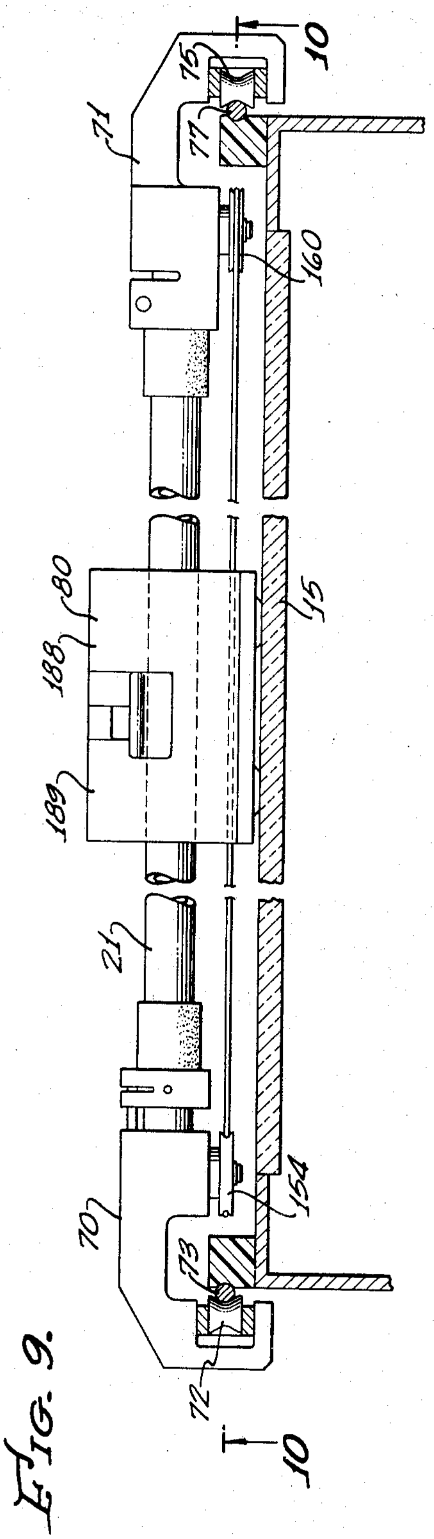
FIG. 9 is a partial side elevation view illustrating details of the carriage assembly.
Figure 43:
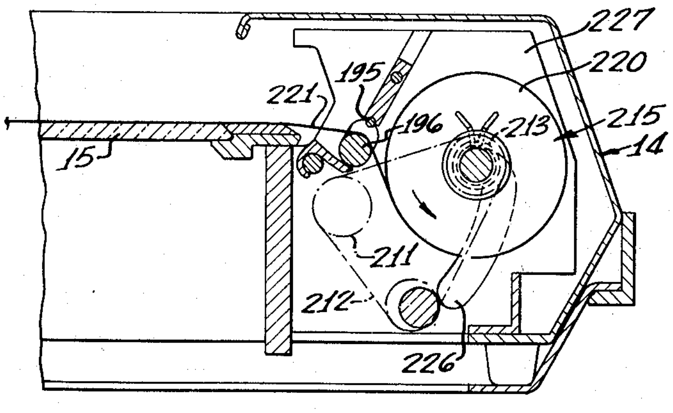
Figure 44:
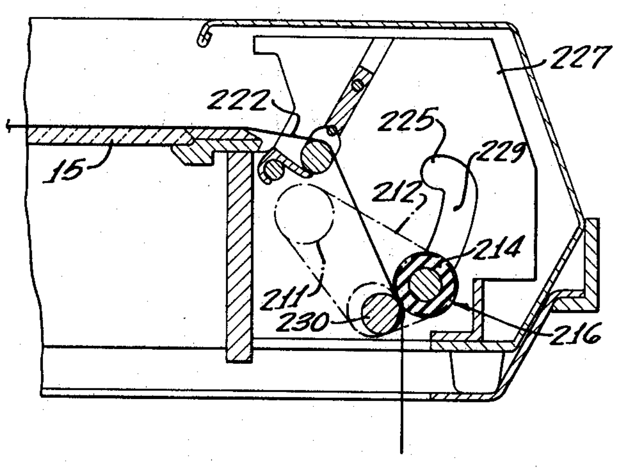
Figures 15A, 15B:
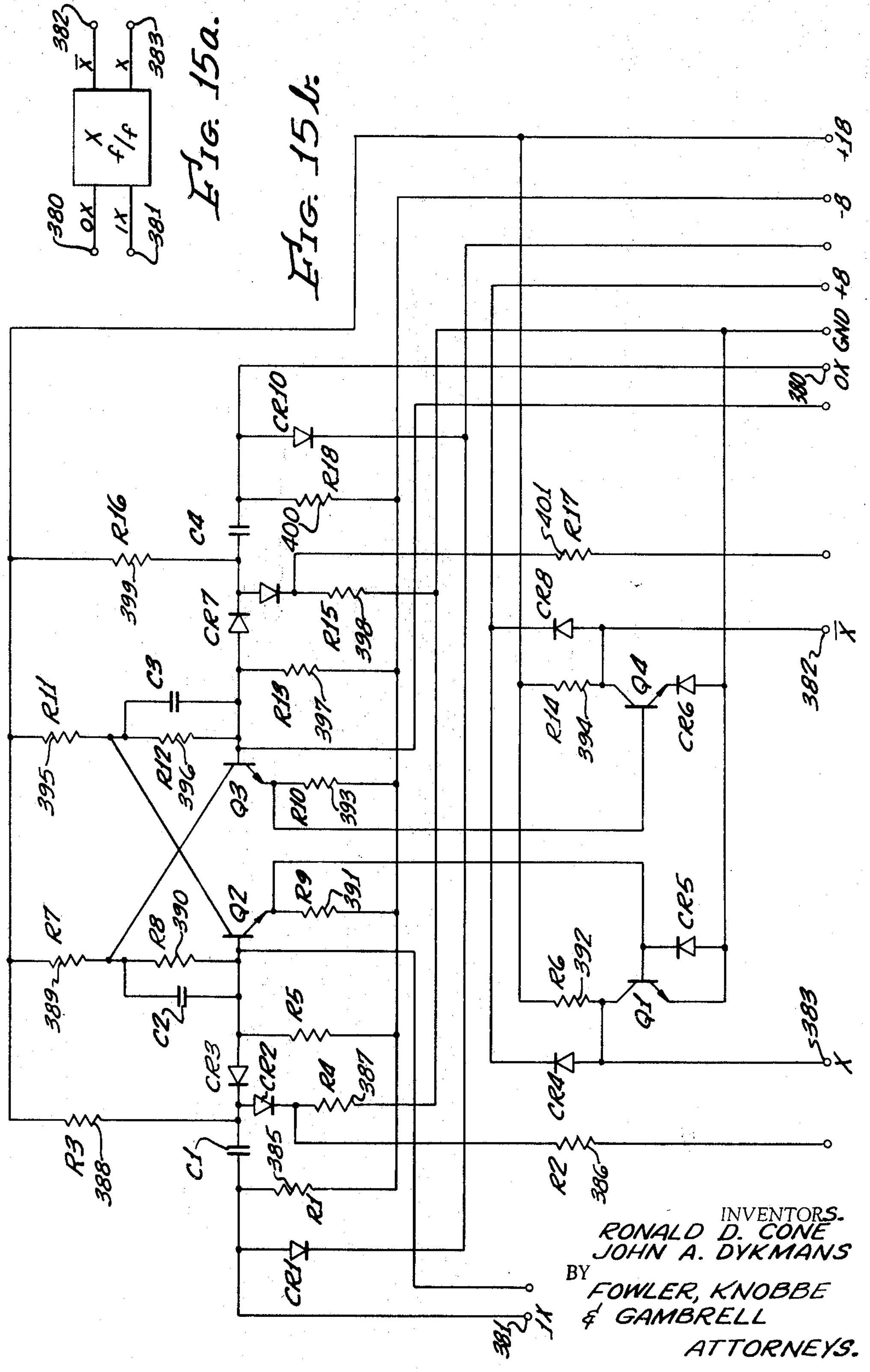
Figures 16A, 16B:
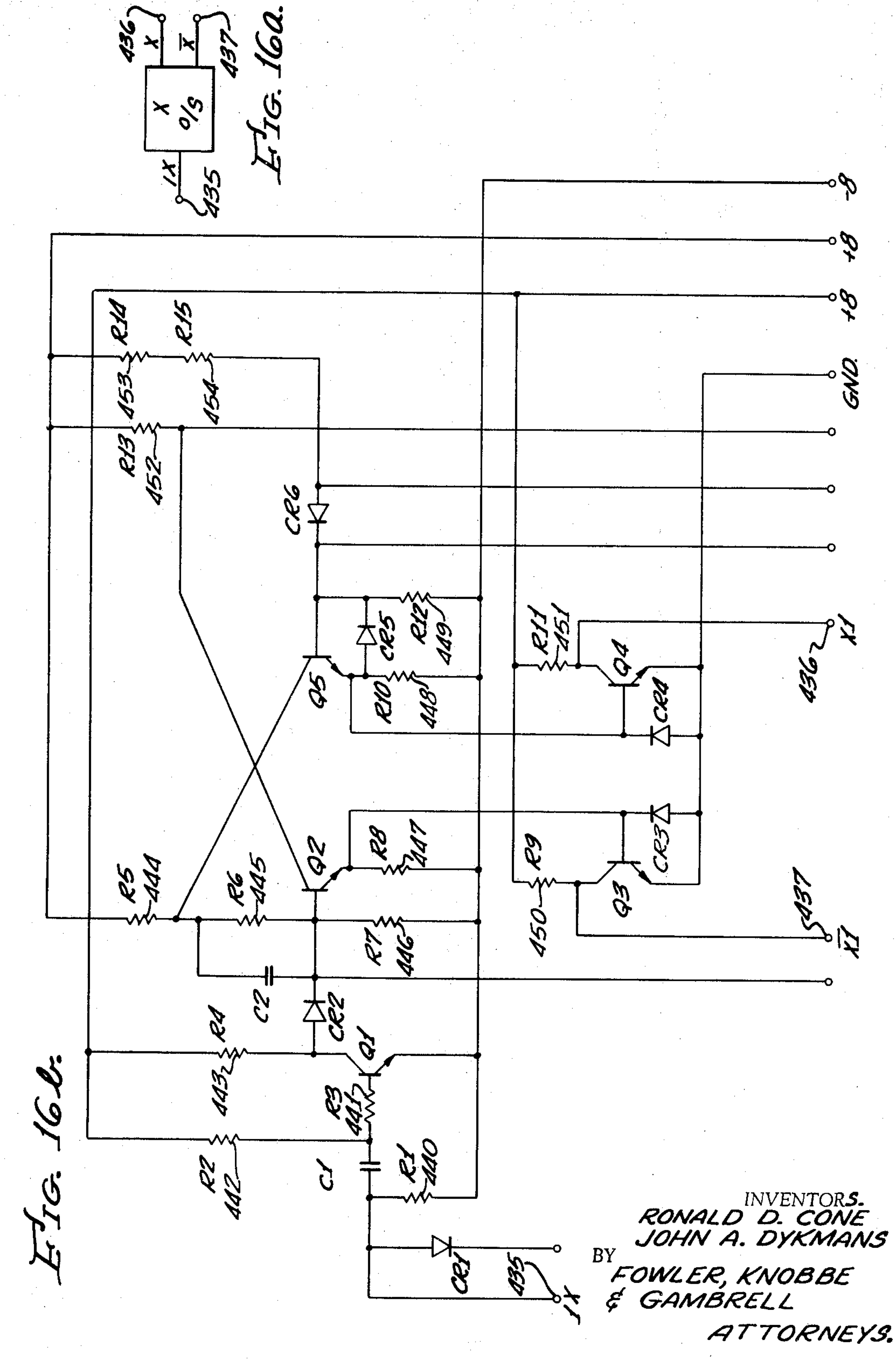
Figure 17:
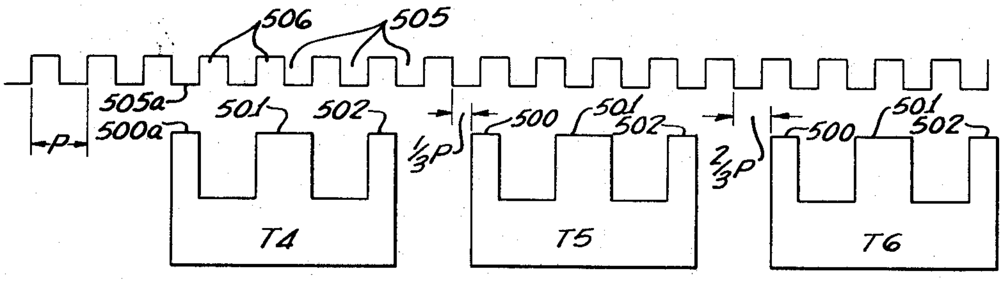
Figure 18:
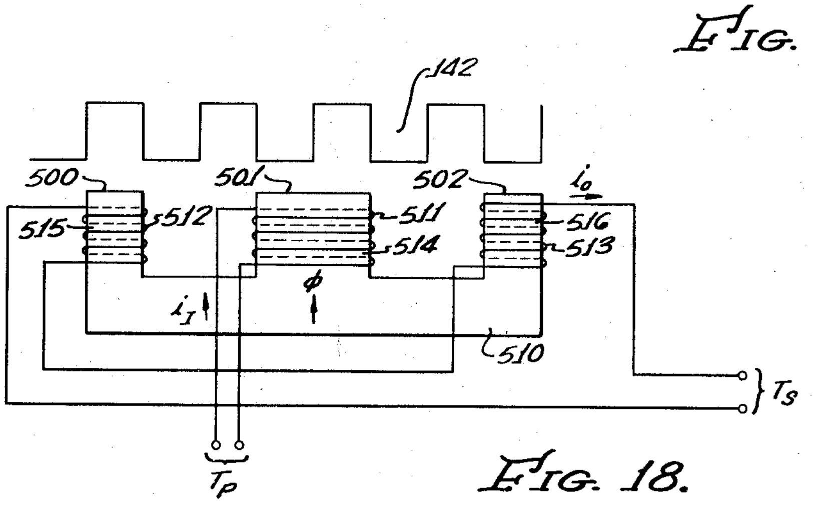
Figure 19:
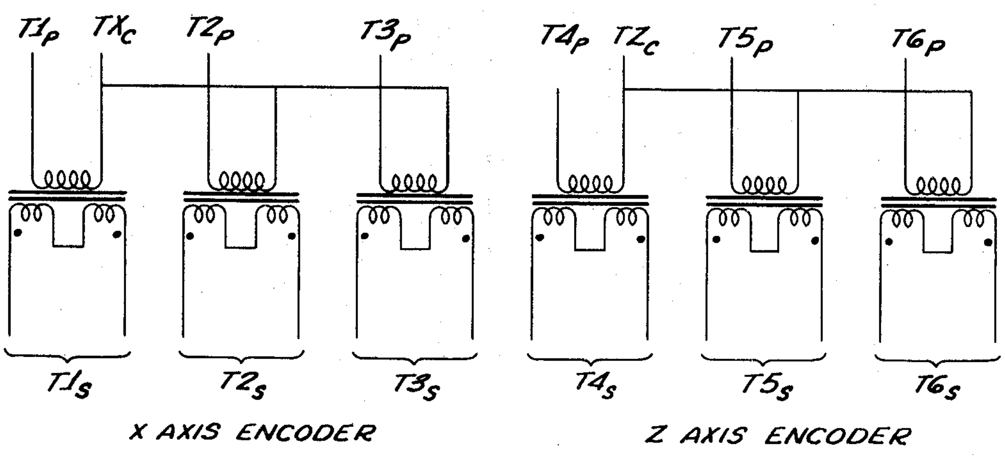
Figure 20:
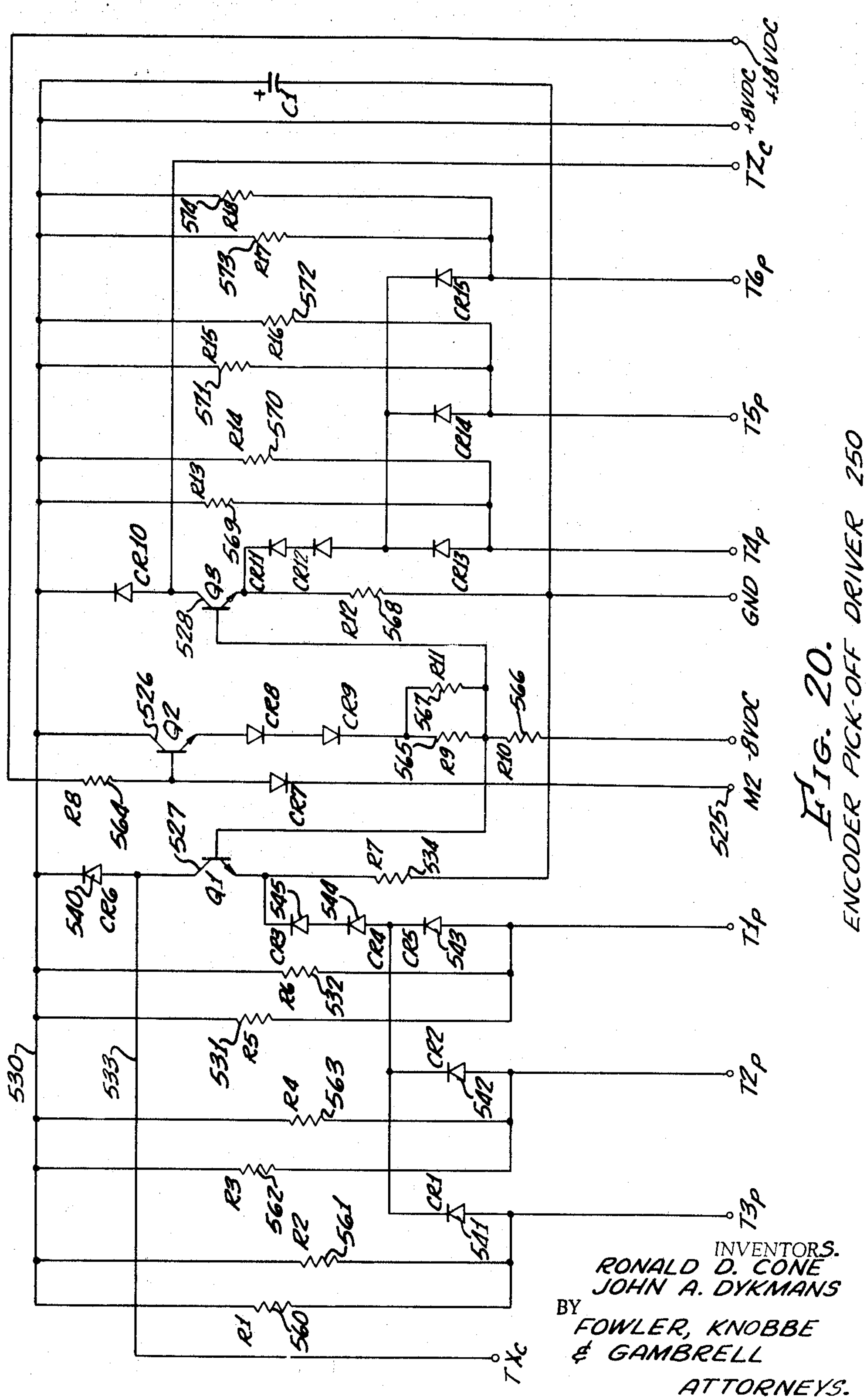
Figure 21:
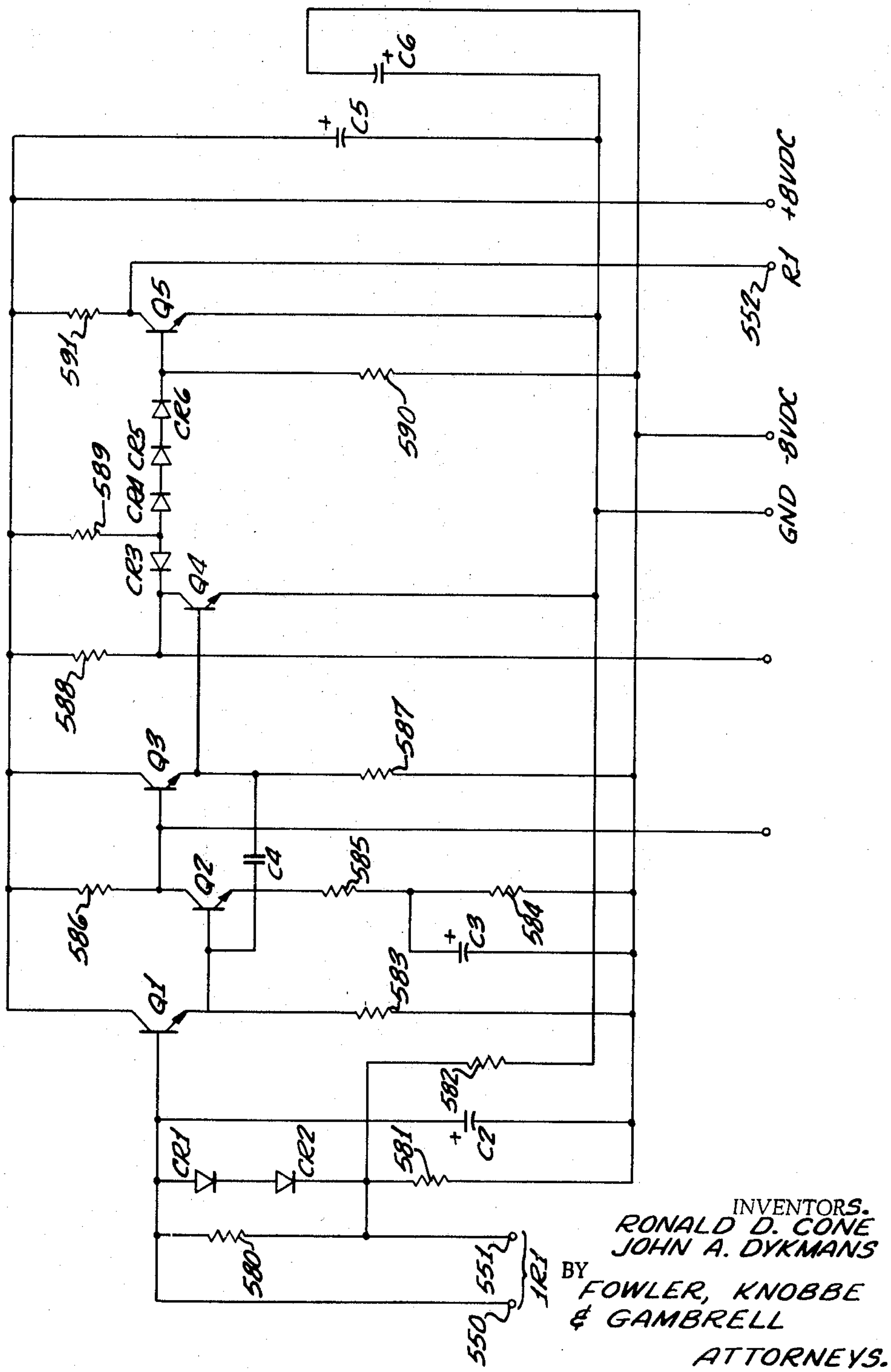
Figure 22:
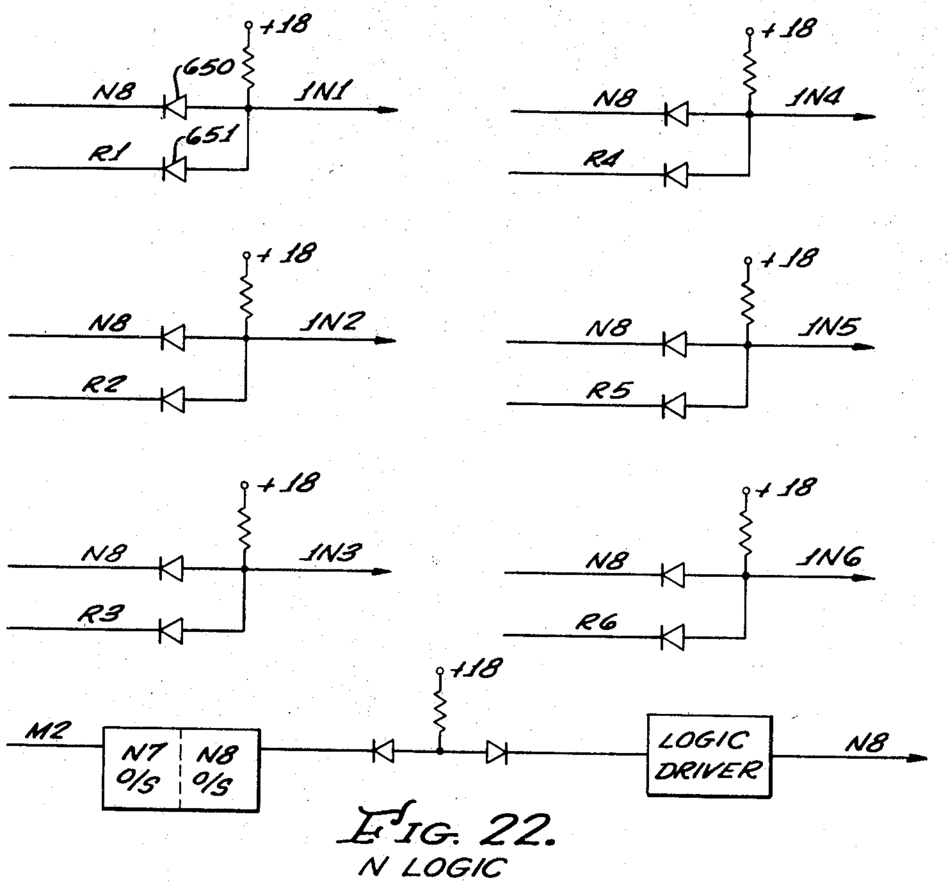
Figure 23:
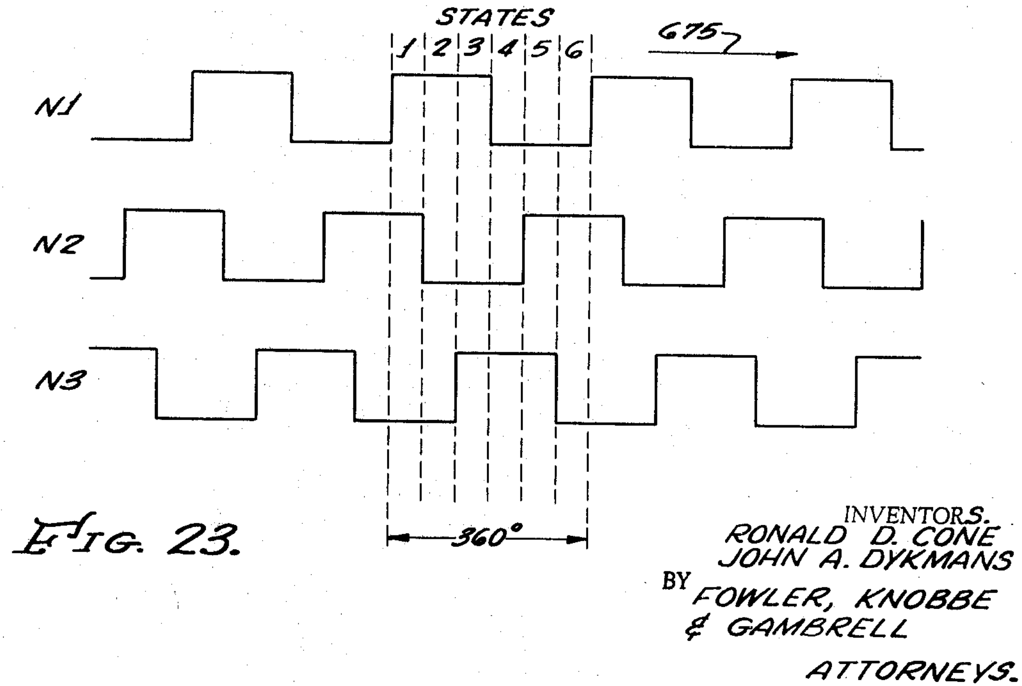
Figure 24:
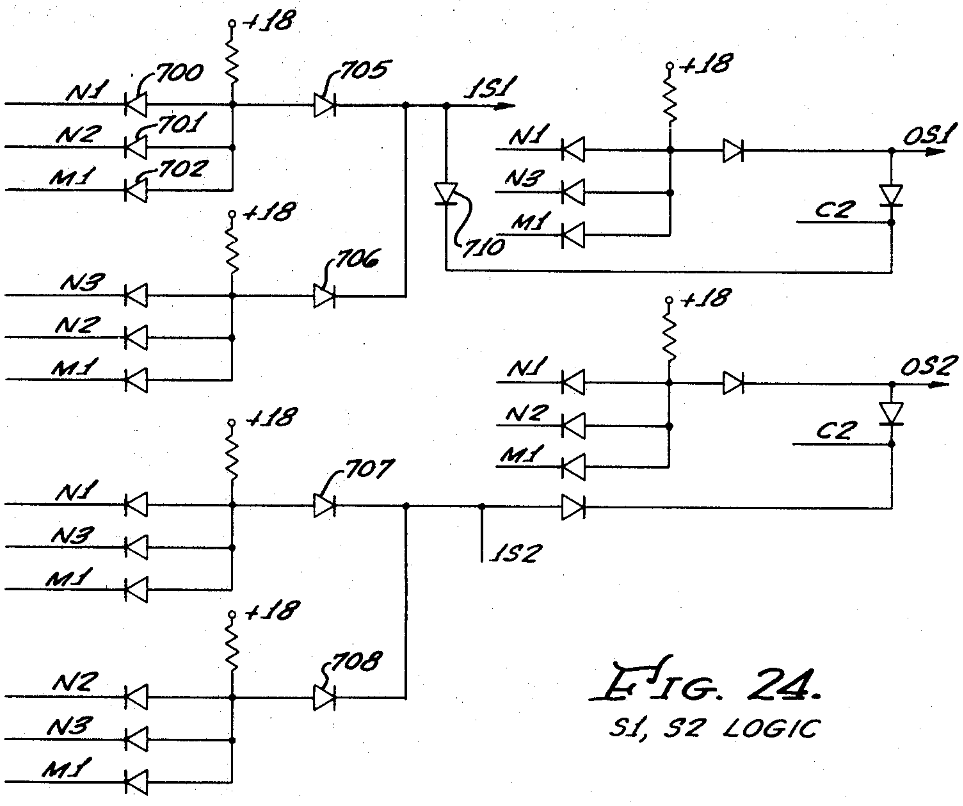
Figure 25:
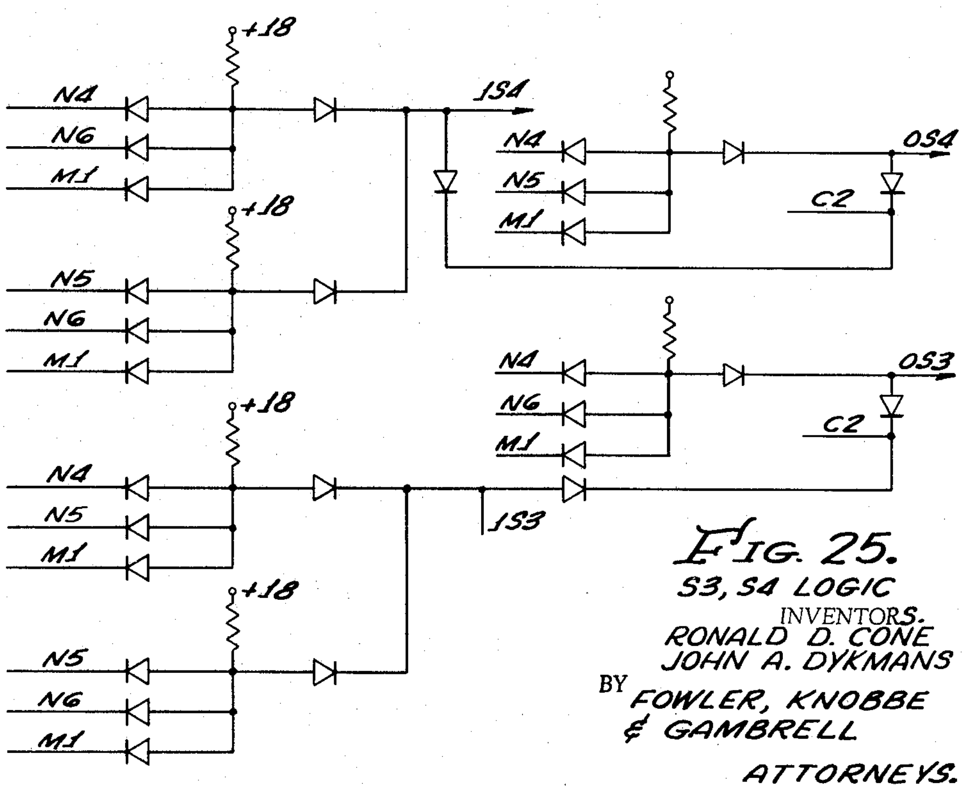
Figure 26:
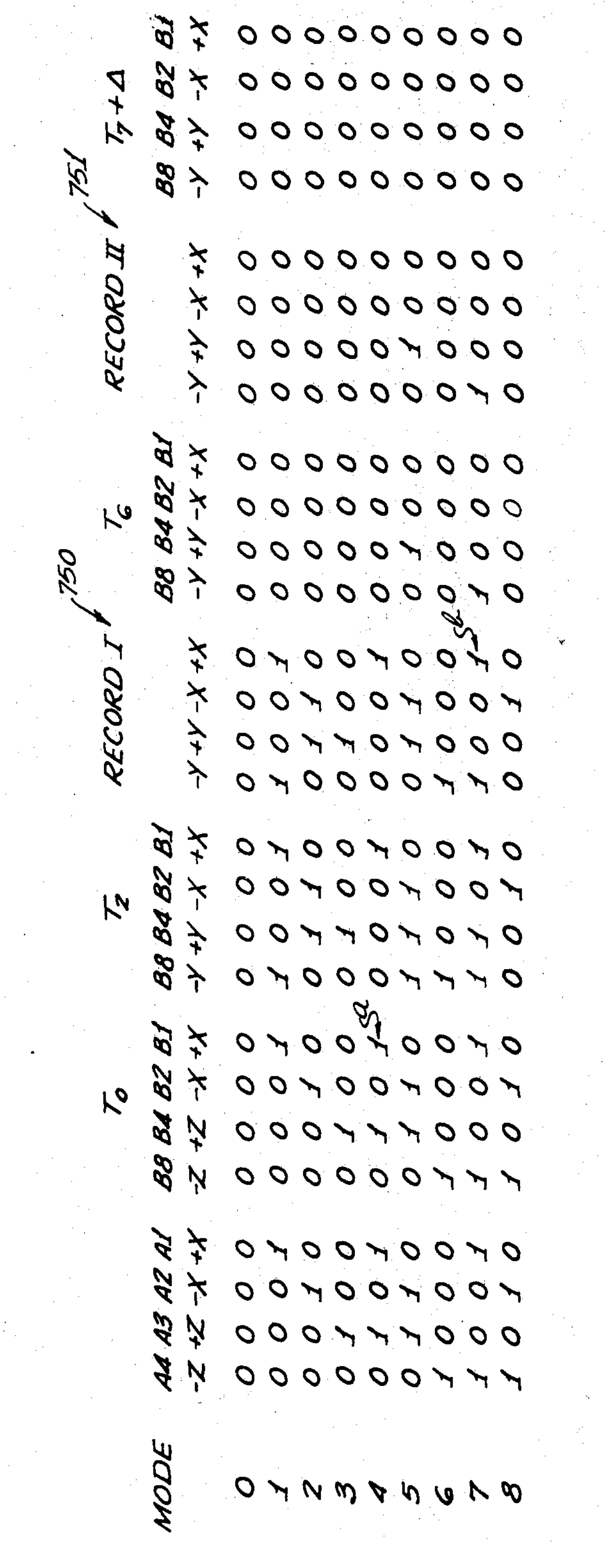
Figure 27:
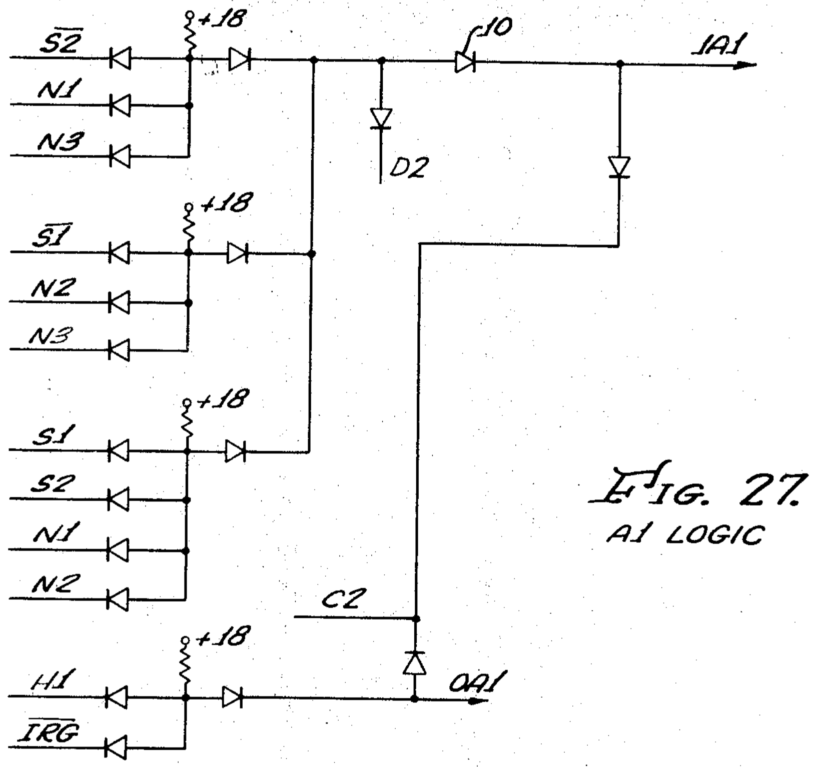
Figure 28:
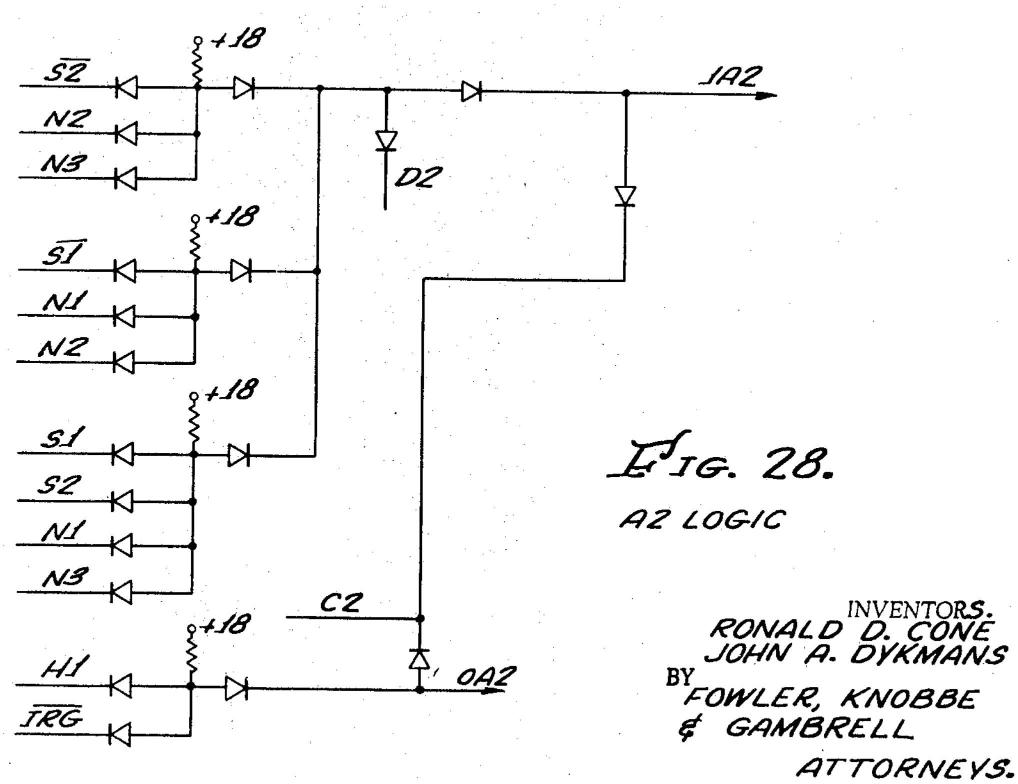
Figure 29:
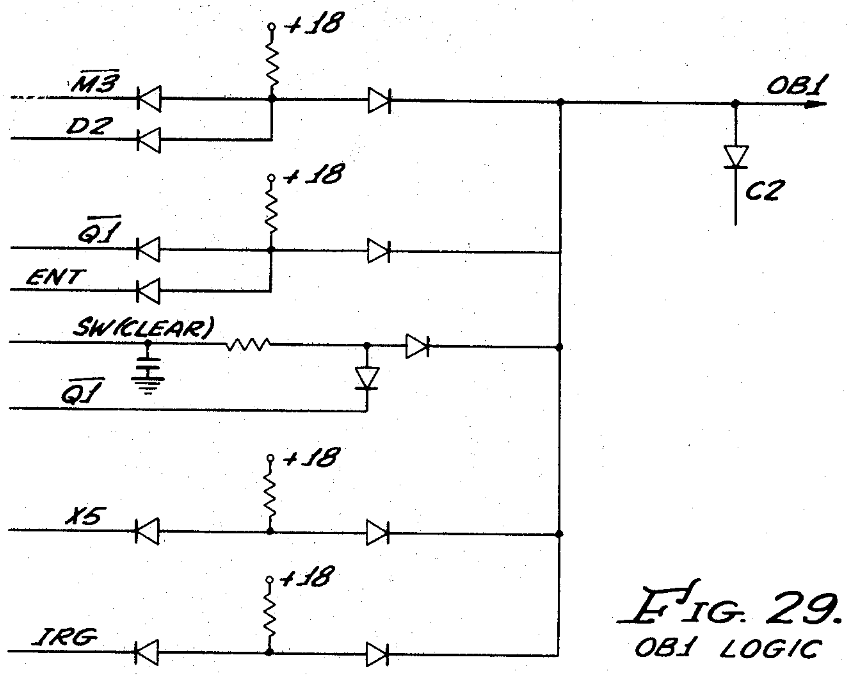
Figure 30:
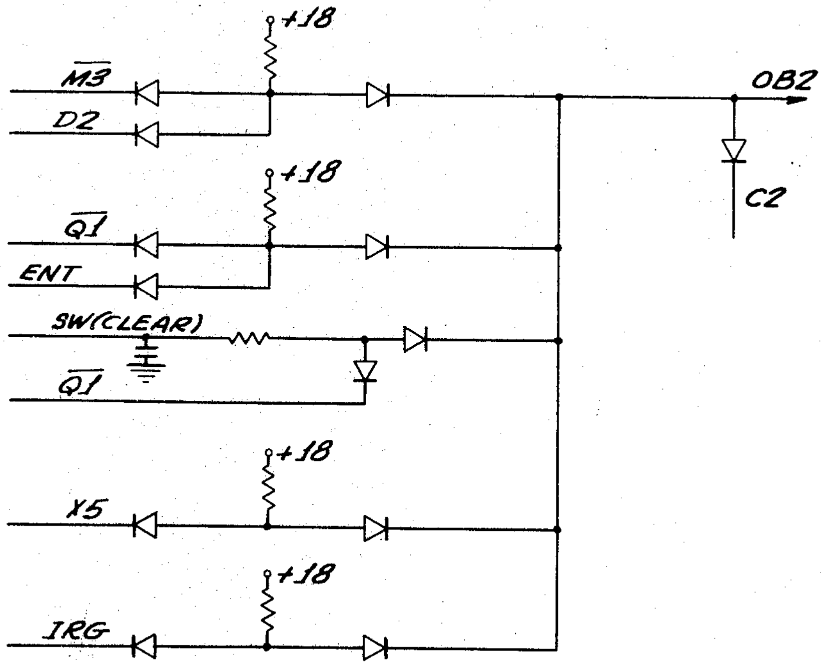
Figure 31:
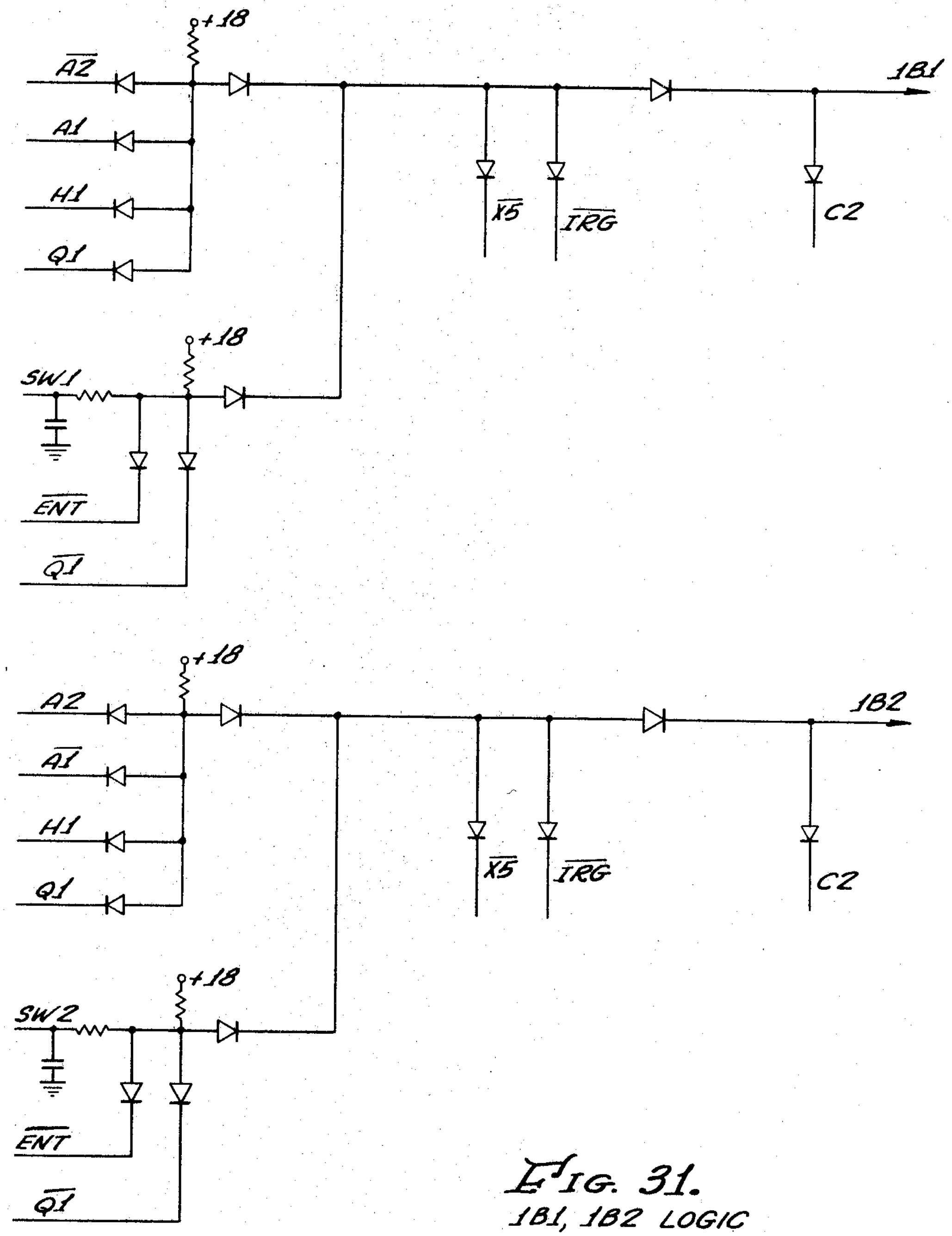
Figure 32:
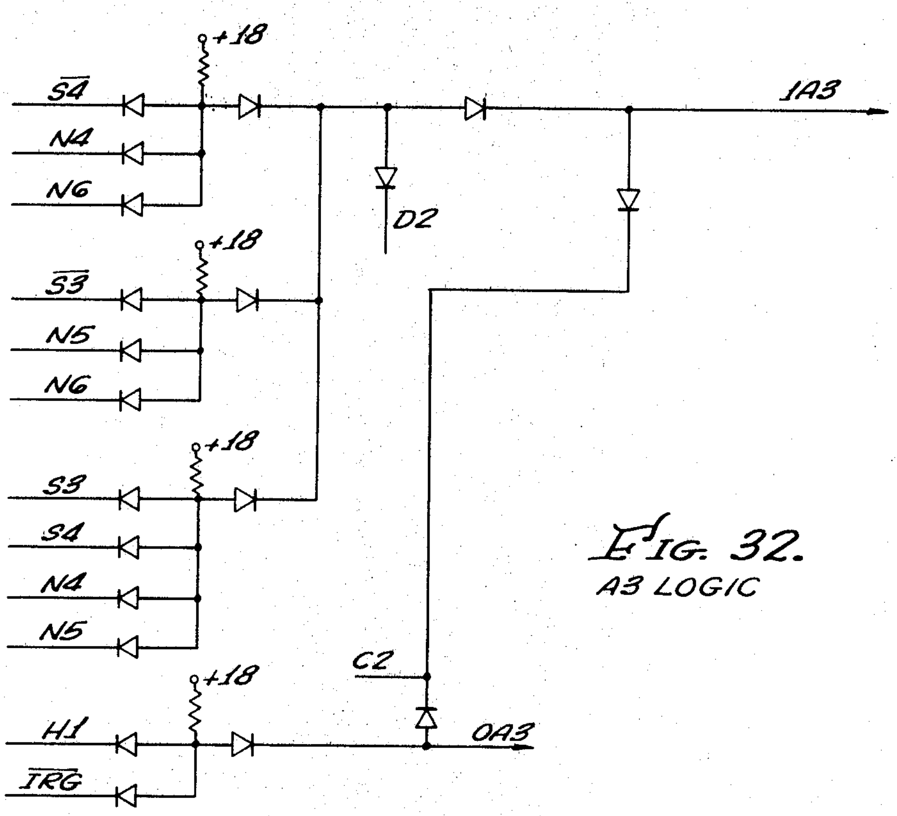
Figure 33:
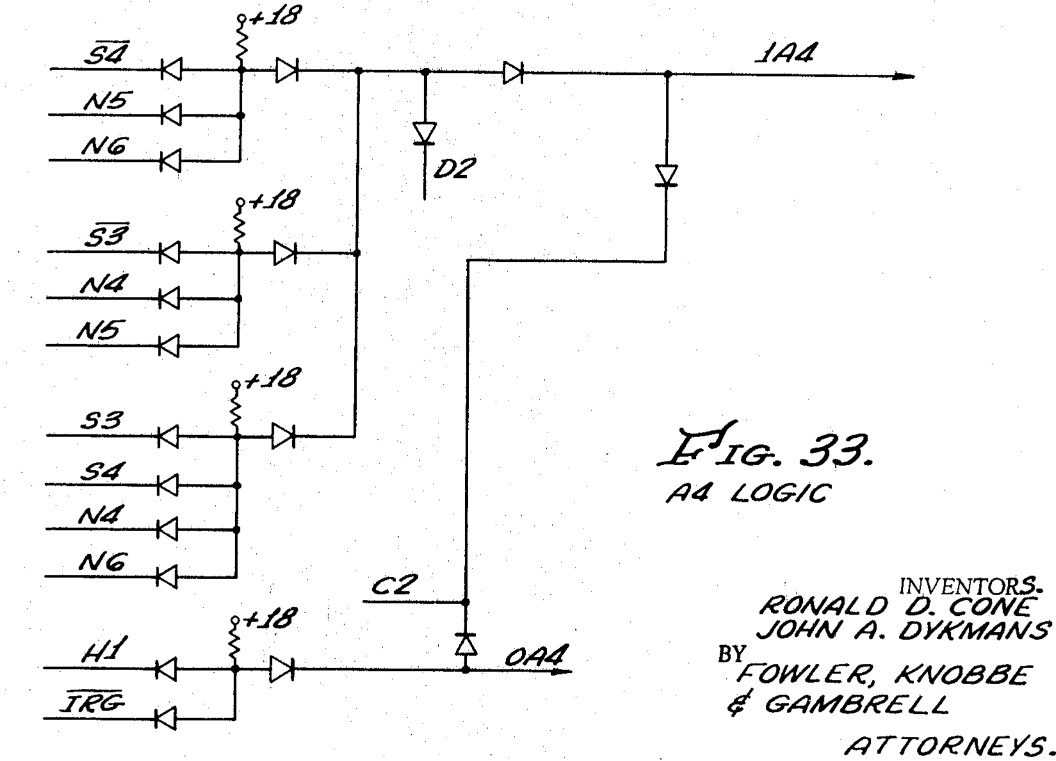
Figure 34:
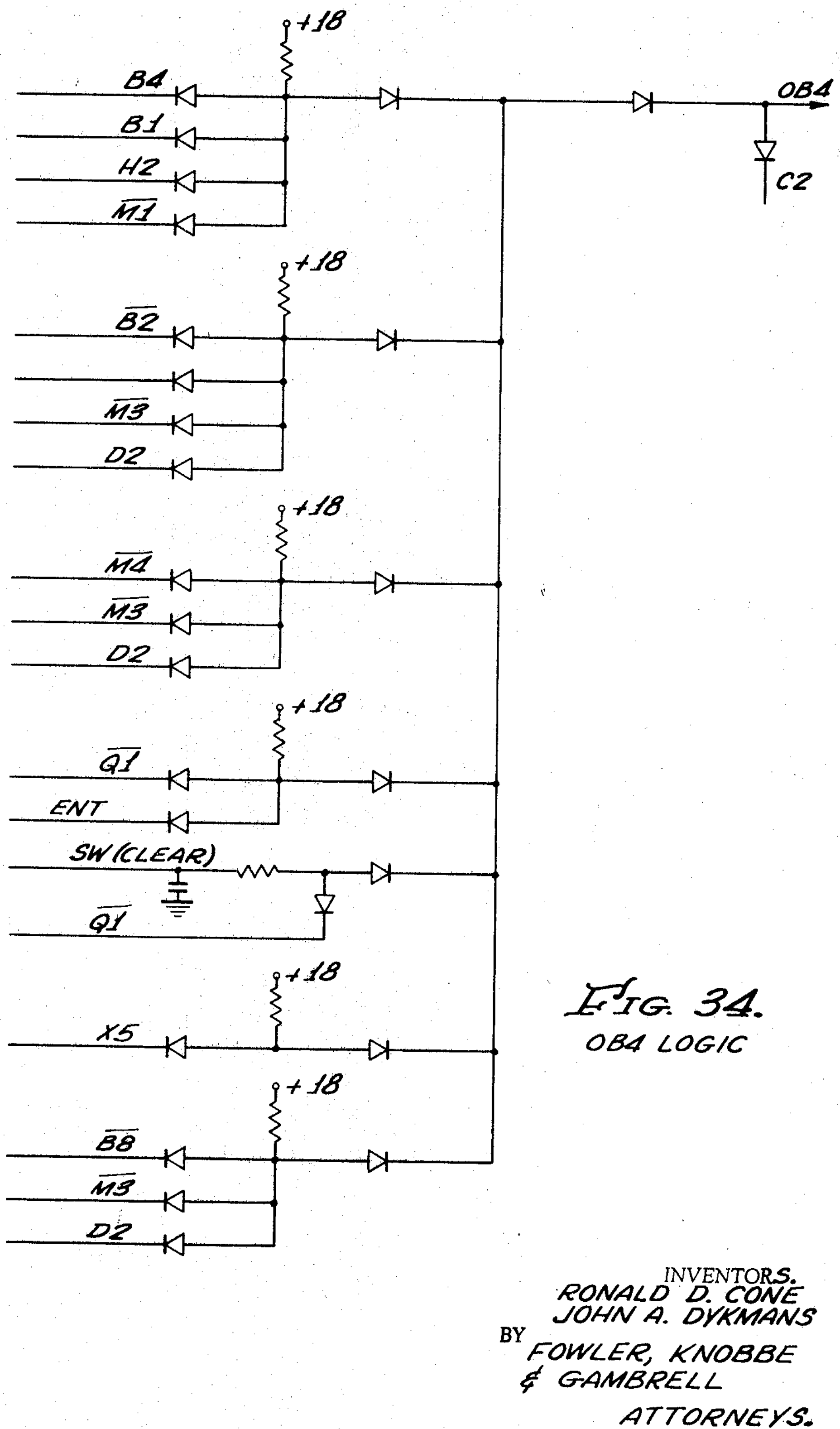
Figure 35:
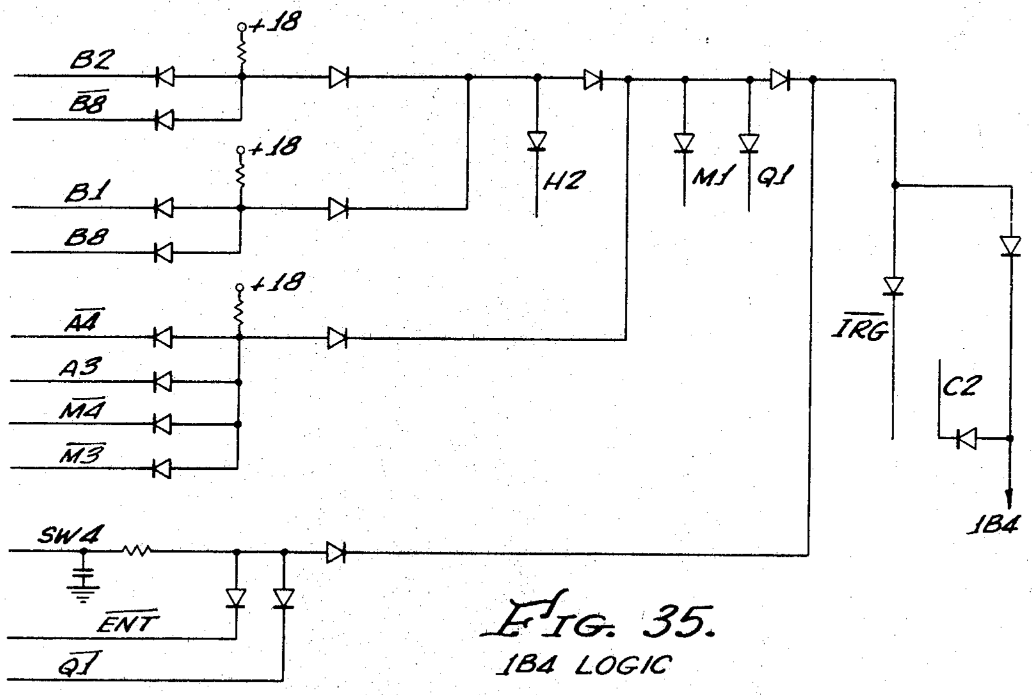
Figure 37:
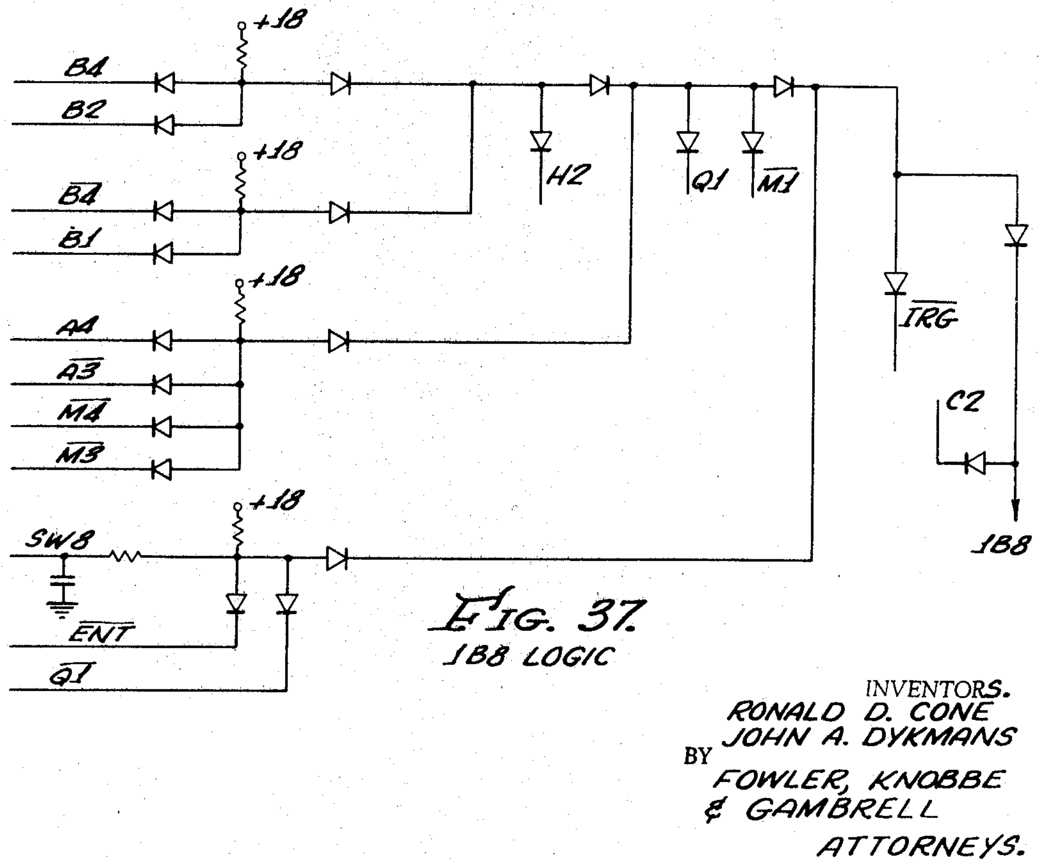
Figure 36:
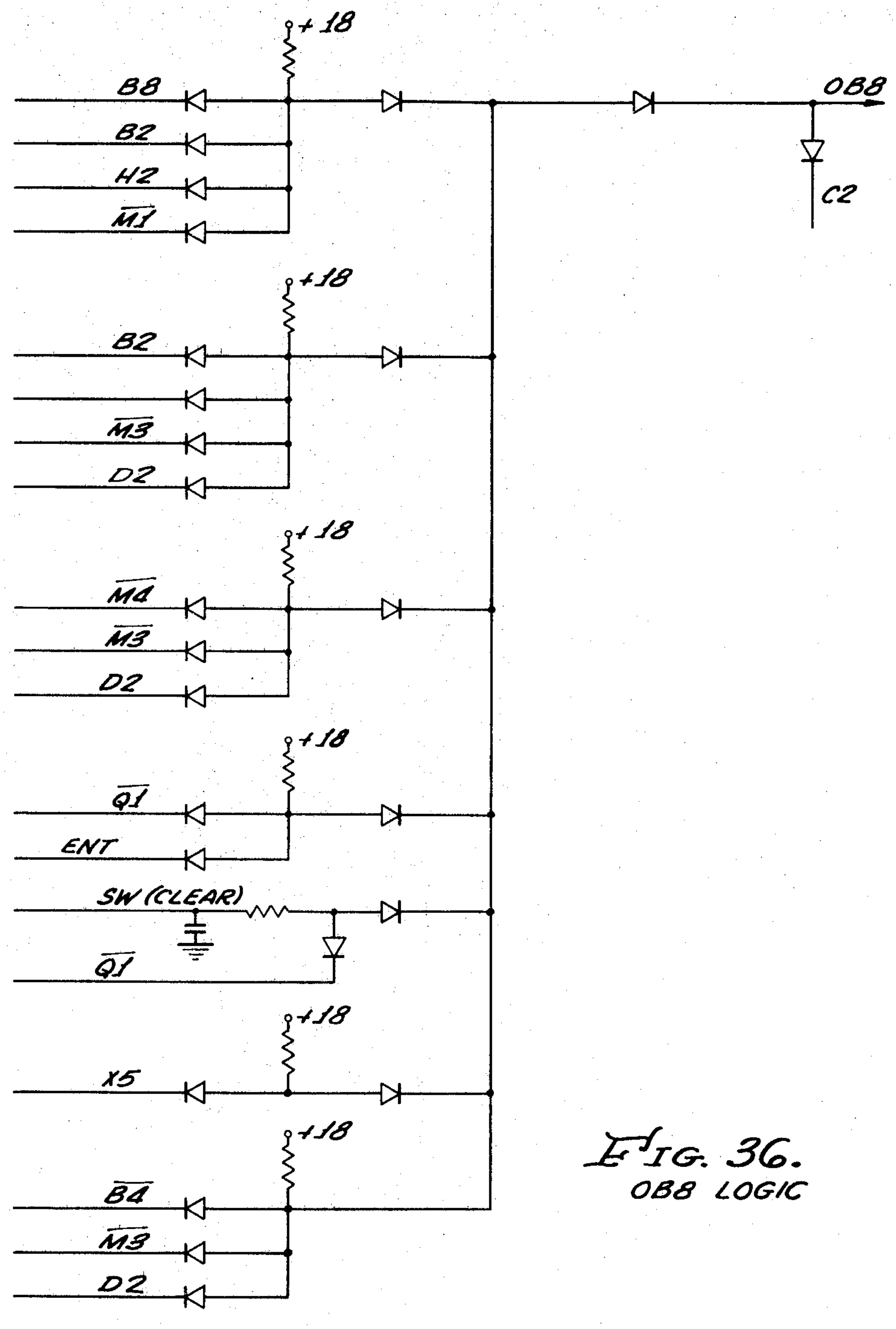
Figure 40:
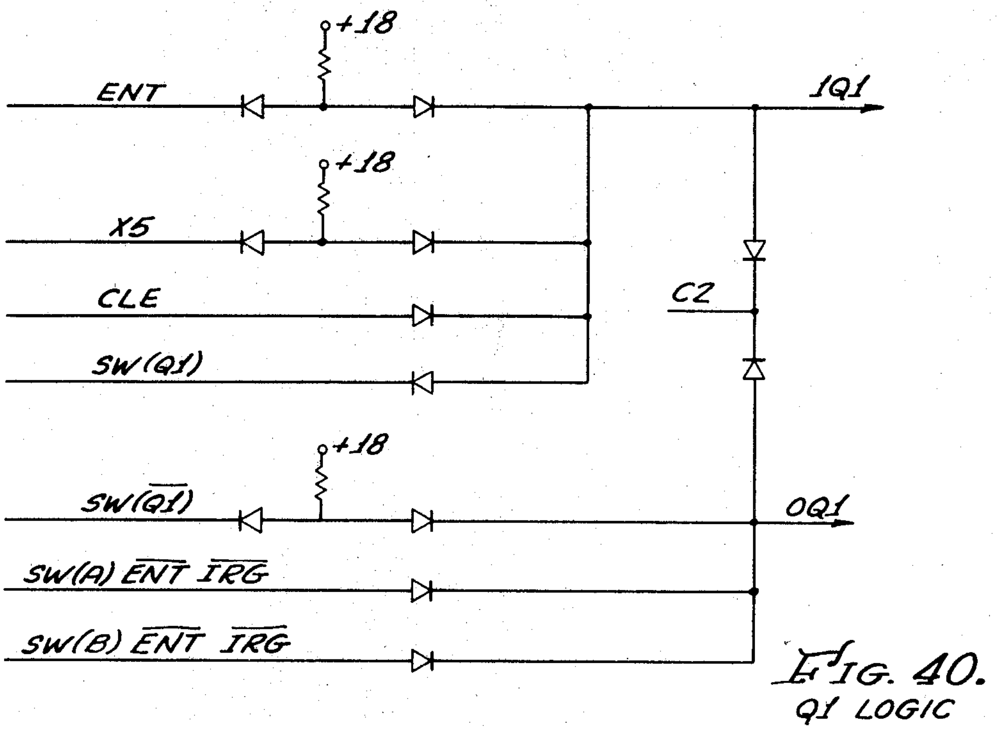
Figure 41:
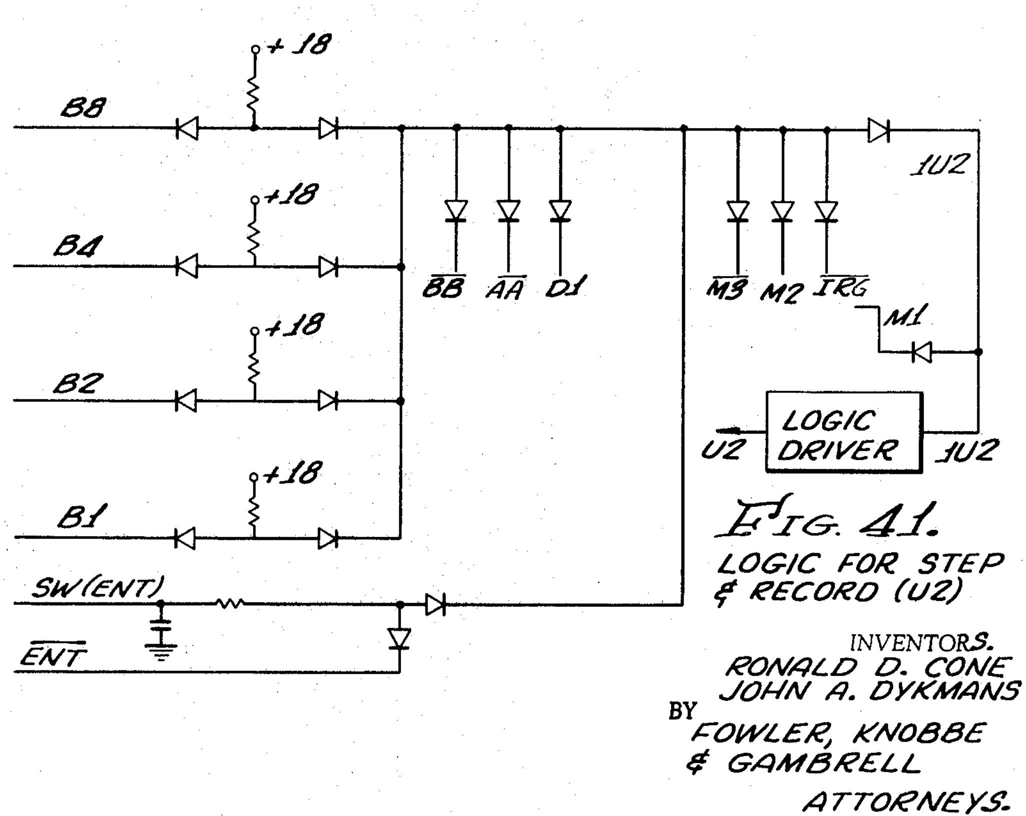
Figure 42A:
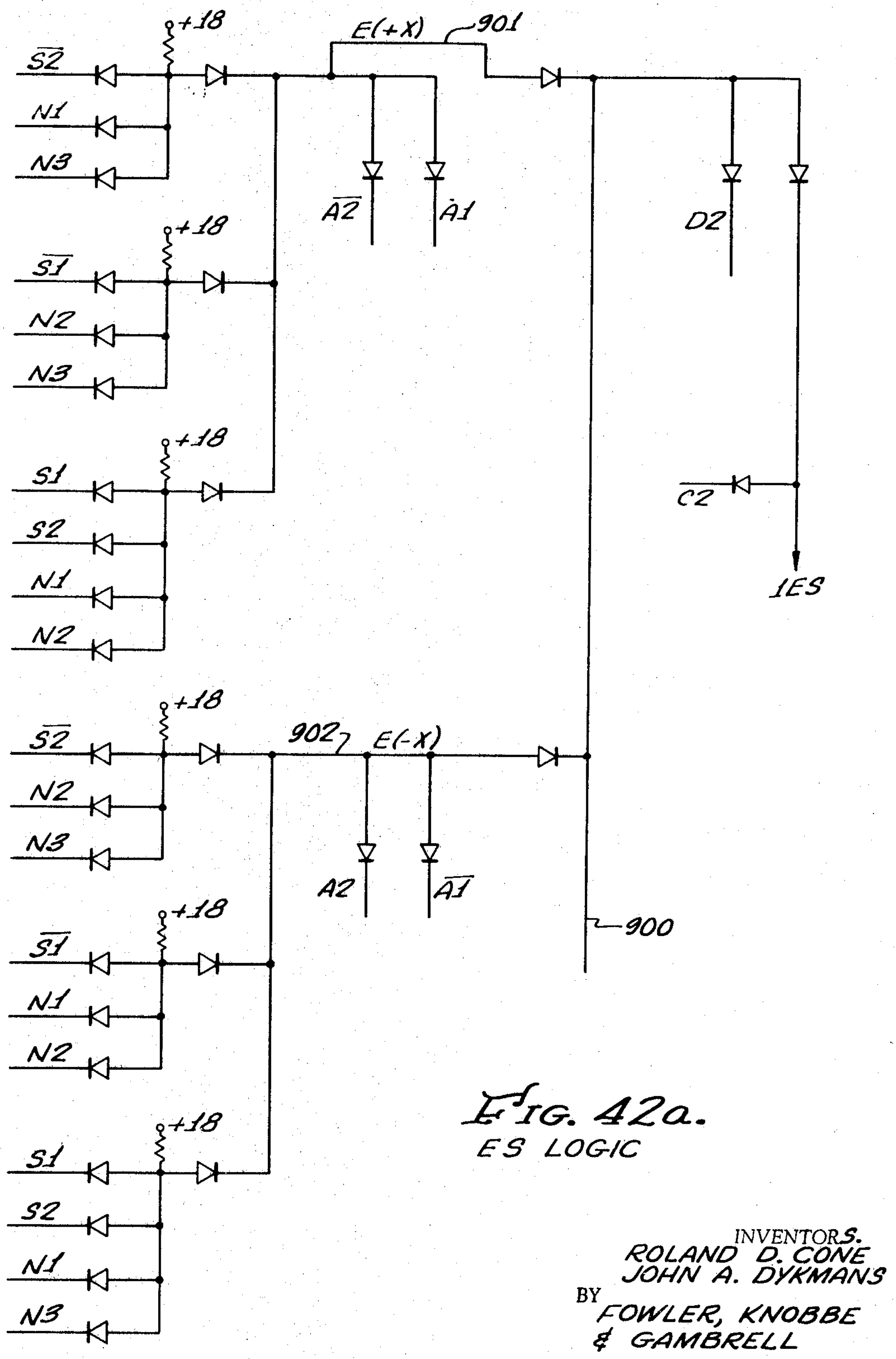
Figure 42B:
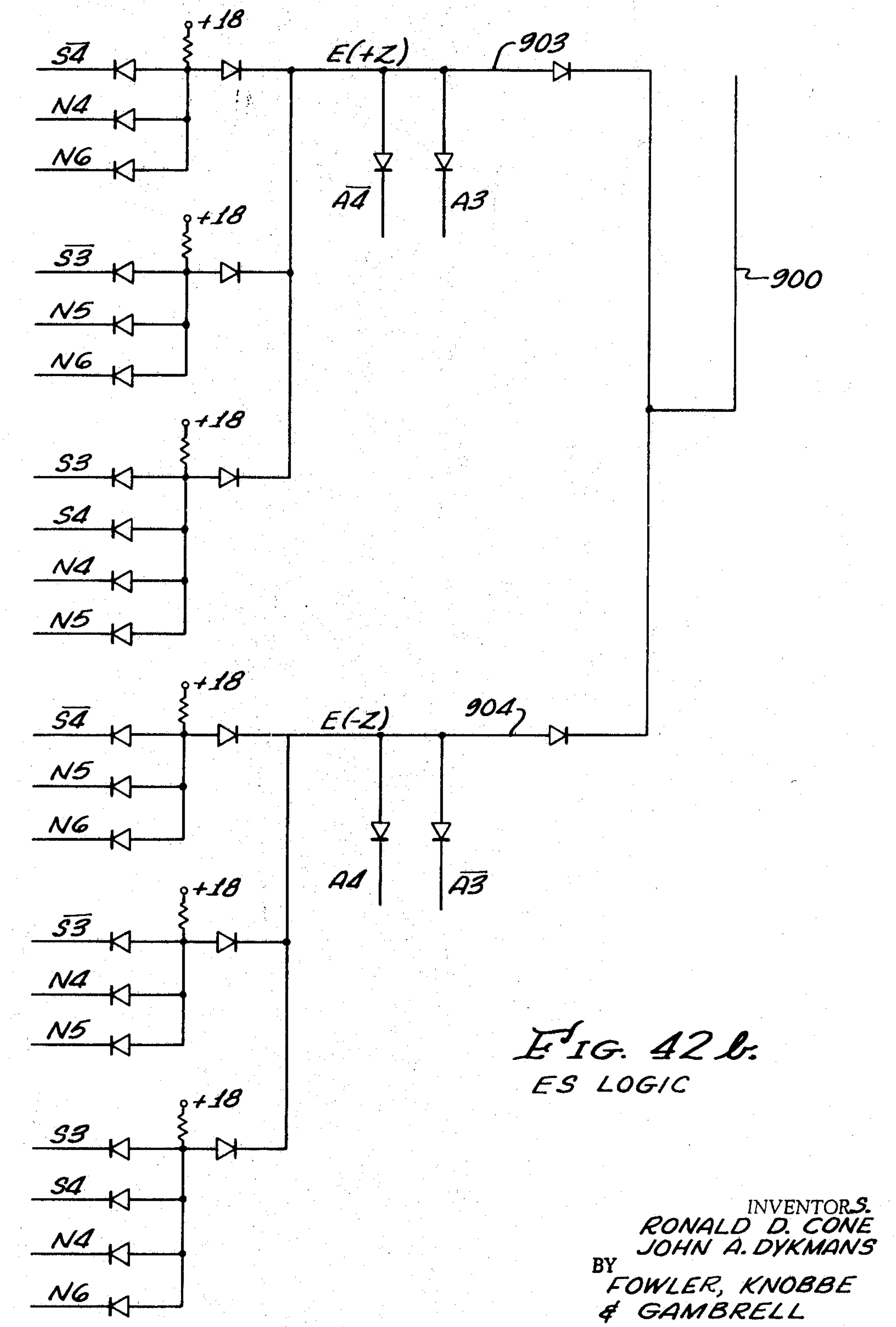
Figure 42C:
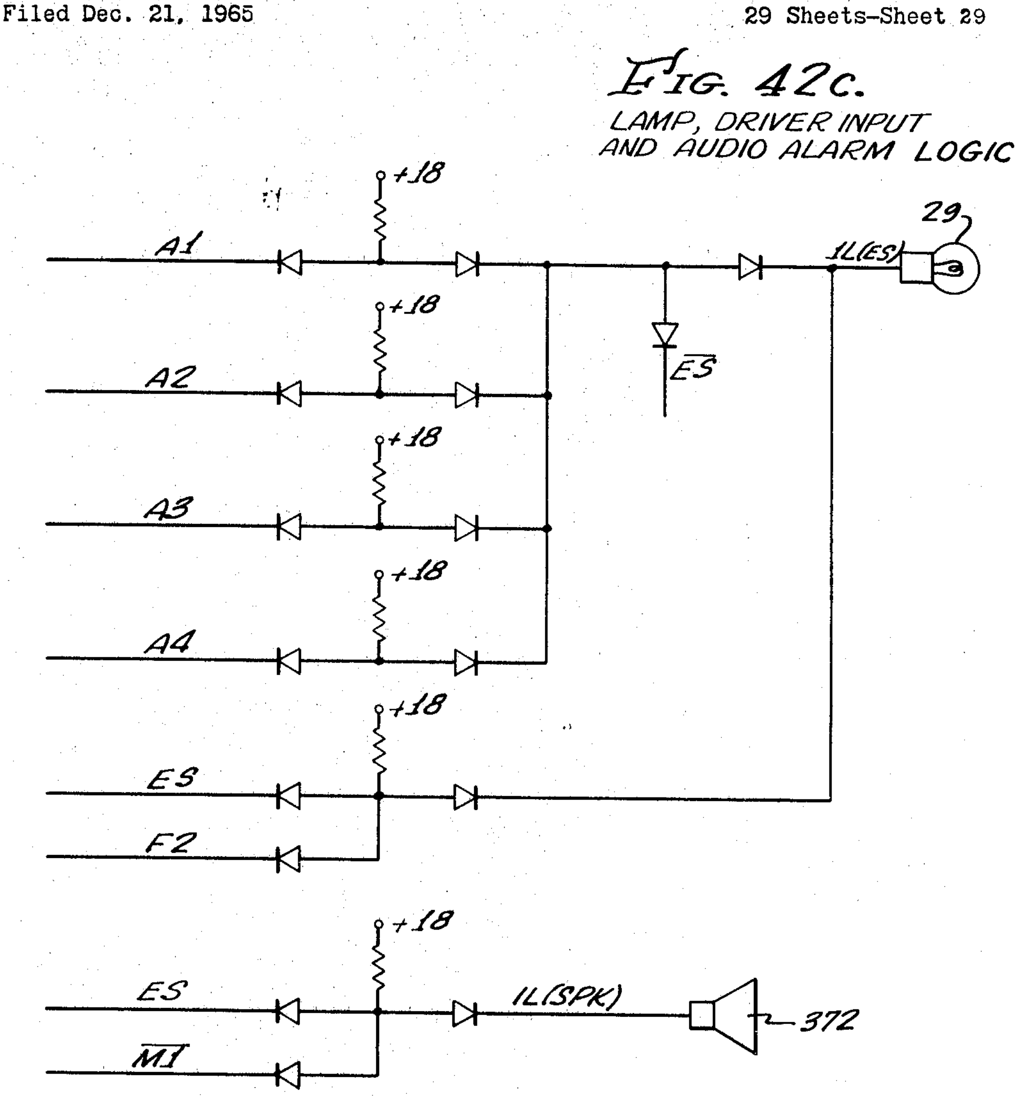
Figure 42D:
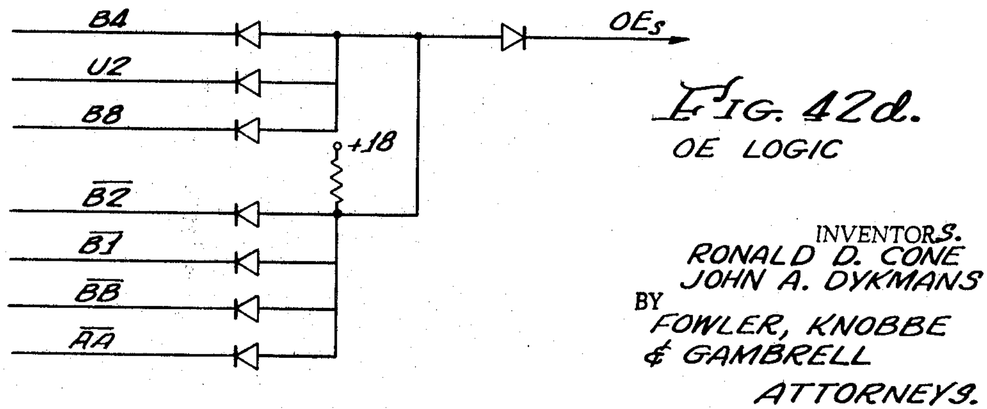

FIG. 15*a* is a simplified block diagram of a set-reset flip-flop;

FIG. 15*b* is a detailed schematic of the flip-flop of FIG. 15*a*;

FIG. 16*a* is a simplified block diagram of a one-shot multivibrator;

FIG. 16*b* is a detailed schematic of the one-short multivibrator of FIG. 16*a*;

FIG. 17 is a diagramatic drawing showing the relationship between the encoder armature and the three pick-off heads;

FIG. 18 illustrates the core and winding structure of a single pick-off head;

FIG. 19 is a circuit schematic for the respective pick-off heads of the X and Z axis digital encoders;

FIG. 20 is a detailed circuit schematic of the encoder pick-off driver;

FIG. 21 is a detailed schematic of an encoder pick-off read amplifier R;

FIG. 22 is a schematic of the input logic to the N one-shot multivibrators;

FIG. 23 illustrates the outputs of the one-shot multivibrators associated with the X axis encoder;

FIG. 24 is a schematic of the input logic to the S1 and S2 flip-flops;

FIG. 25 is a schematic of the input logic to the S3 and S4 flip-flops;

FIG. 26 is a table showing the states of the A and B flip-flops during a single record cycle;

FIG. 27 is a schematic of the input logic to the A1 flip-flop;

FIG. 28 is a schematic of the input logic to the A2 flip-flop;

FIG. 29 is a schematic of the input logic to the false input of the B1 flip-flop;

FIG. 30 is a schematic of the input logic to the false input of the B2 flip-flop;

FIG. 31 is a schematic of the input logic to the B1 and B2 flip-flops;

FIG. 32 is a schematic of the input logic to the A3 flip-flop;

FIG. 33 is a schematic of the input logic to the A4 flip-flop;

FIG. 34 is a schematic of the input logic to the false input of the B4 flip-flop;

FIG. 35 is a schematic of the input logic to the true input of the B4 flip-flop;

FIG. 36 is a schematic of the input logic to the false input of the B8 flip-flop;

FIG. 37 is a schematic of the input logic to the true input of the B8 flip-flop;

FIG. 38 is a schematic of the write logic associated with the input of the incremental tape recorder;

FIG. 39 is a schematic of the input logic to the X5 flip-flop, the input of the IRG one-shot multivibrator, and the logic associated with the ENTER switch;

FIG. 40 is a schematic of the logic associated with the input of the Q1 flip-flop illustrating the mode control logic for the digitizer;

FIG. 41 is a schematic of the step and record logic at the input of the U2 one-shot multivibrator;

FIG. 42*a* is a portion of that schematic of the trace error detector illustrating the circuitry for detecting tracing errors of +X and −X;

FIG. 42*b* is a schematic showing that portion of the error detector logic for detecting tracing errors in +Z and −Z;

FIG. 42*c* is a schematic of the input logic to the trace error indicator light and the trace error audio alarm;

FIG. 42*d* is a schematic of the logic for resetting the ES flip-flop;

FIG. 43 is a cross-sectional view taken along line 43—43 of FIG. 2 illustrating the details of the paper clamp and details of the paper drive when used with roll paper;

FIG. 44 is a cross-sectional view taken along line 44—44 of FIG. 2 showing the paper drive feeding folded paper; and, FIG. 45 is a cross-sectional view taken along line 45—45 of FIG. 7 illustrating details of the stylus assembly.

Figure 1:
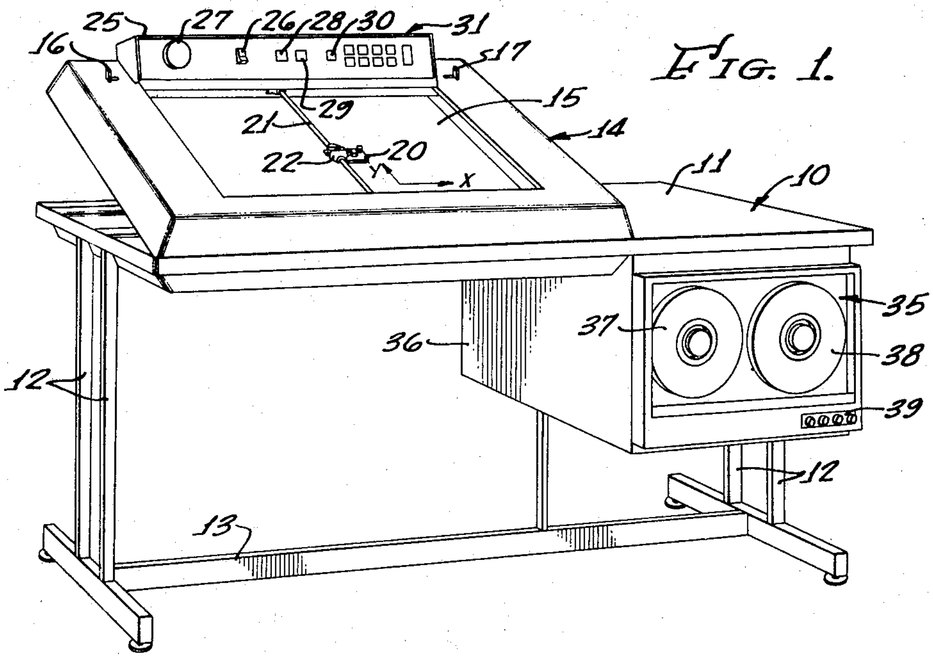
FIG. 1 is a perspective view of the preferred embodiment of the graphical data digitizer constructed in accordance with this invention.

Referring now to FIG. 1, there is shown a graphical data digitizer for converting graphical data on transparent, translucent or opaque sheets or in optically projected form to magnetically recorded digital data.

The digitizer components are supported by a table 10 having a top 11, legs 12, and a base assembly 13.

Housing 14 is mounted to the upper surface of the top 11 in a position sloping upwardly from the front of the table 10 and supports tracing bed or screen 15 and associated paper-drive mechanism. The rear of housing 14 is advantageously adjustable for height so as to vary the slope of the tracing bed 15 to the most comfortable position for any particular operator. Tracing bed 15 is designated to provide a platform for receiving (on which rests) the analog graphical data. Small plots are fixed to the upper surface of bed 15 with masking tape, while larger plots are engaged in mechanical hold-downs at opposite ends of the tracing bed which are engaged by respective levers 16 and 17. Analog data in roll form is accommodated by the paper drive mechanism described below which selectively advances the analog data across the face of the tracing bed. The tracing screen 15 is supported at opposite ends as shown in FIGS. 43 and 44 and advantageously comprises a sheet of white translucent Plexiglas. This screen is illuminated from below for data on non-opaque sheets, or data may be optically projected onto the sheet from the underside thereof. Also for this reason the table 10 preferably is formed as an open framework under the housing 14 so as to permit optical projection from beneath the housing.

A stylus 20 is mounted to a carriage assembly for movement along mutually orthogonal X and Y axes. This assembly includes a rod 21 supported for transverse movement along the X axis across the tracing bed and a housing 22 slideably supported on the rod 21 for movement along the Y axis.

A control panel 25 is mounted at the rear of housing 14 for initiating operation of the machine and for selecting the operational modes for performing a graphical data digitization. The controls include a main power switch 26, a chart-drive motor control 27, a record error indicator light 28, a trace error indicator light 29, a mode selector switch 30 and a manual entry keyboard 31.

The housing, tracing bed, movable stylus 20, and control panel are advantageously formed as an integral unit as shown so that the plane of the tracing bed may be adjusted to any angle convenient to the operator. Thus, the rear of the housing may be elevated as shown to provide a uniform slope angle for the tracing bed, or all four corners of the bed may be adjusted to different heights to angle the tracer bed in all four quadrants defined by the X and Y axes.

A housing 36 mounted underneath the top 11 mounts the incremental or digital stepping magnetic tape recorder 35 and the electronic control and logic circuitry of the digitizer. As shown, the tape recorder includes magnetic tape mounted on a pair of take-up reels 37, 38 and a separate control panel 39. For optimum results, the recorder should have a tape transport adapted for recording at least 200 characters per second and a density recording factor of at least 200 bits per inch in a format compatible with I.B.M. and other commercial digital computers. Several such recorders are presently on the market, including the Model 1400 recorder manufactured and sold by the C. F. Kennedy Company, Pasadena, Calif. and the DSR–1400 series recorders of Digi-Data Corporation, Bladensburg, Md.

General operation of the graphical data digitizer

Analog data is digitized directly on the magnetic tape by tracing the analog plot on tracing bed 15 with the movable stylus 20. Asynchronous movements of the stylus are recorded as synchronized incremental digital pulses. Also recorded on the tape, through the manual entry keyboard 31, are the required programming instructions to the final processing digital computer, e.g. scale factor, zero offset, and error correction by entering the proper code in the 1, 2, 4, 8, A and (B) data channels and a separate Inter-Record-Gap (IRG) position.

As the operator traces the analog plot, each movement of the stylus through a predetermined distance in either the X or Y direction causes a pulse to be generated by digital encoder elements. A representative incremental distance is .01″. Each such incremental movement of the stylus is recorded as individual (a single) characters on the magnetic tape, with the increments being summed by the final processing digital computer to provide the whole value coordinates.

Step-by-step operating procedure

The graphical plot is mounted on the tracing bed 15 underneath the stylus 20. Power is turned on by actuating power switch 26 on the control panel 25. The mode selector switch 30 is then actuated to place the digitizer in the KEYBOARD mode. The electronic circuit logic and error indicators are then reset by entering a predetermined code on the manual entry keyboard 31. Magnetic tape is then loaded on the recorder 35 and the tape-drive control switch on the recorder control panel 39 is turned on. If the tape recorder is not properly loaded and ready to accept data, the record error indicator light 28 will be energized.

The identifier and scale-factor codes are then recorded on the magnetic tape by depressing the appropriate buttons on the manual entry keyboard. This code is determined by the particular digital computer for which the magnetic tape is being prepared.

The tracer stylus 20 is then positioned precisely over the beginning of the plot to be digitized. The mode selector switch 30 is then actuated to the TRACER position so as to place the digitizer in the TRACER mode. After assuring that the record error indicator 28 is not glowing (thus indicating that the tape drive is properly loaded and ready to accept data), the analog plot is traced by following the graphical data with the stylus. During the tracing, should the stylus be accidentally jerked so as to generate more data than the tape drive can handle, a tracer error is signalled to the operator by both the trace error indicator light 29 and an audible warning tone emitted from a loud speaker.

Figure 11:
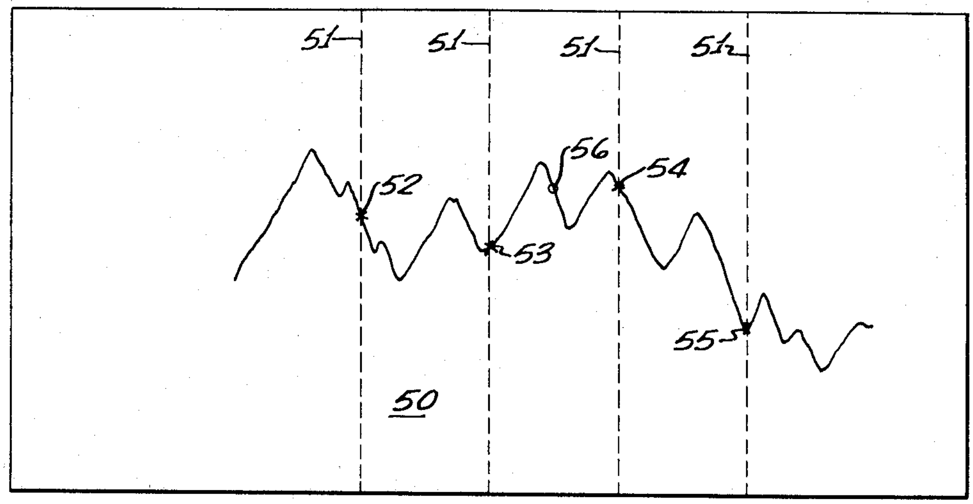
FIG. 11 illustrates a representative graphical analog plot sub-divided by measured Inter-Record-Gap intervals.

Means are provided for recording the digitized data in groups which can be handled by the input memory of the final processing digital computer. In addition, these means facilitate the correction of tracing errors made by the operator. Such errors occur if the operator wanders off the analog plot while tracing or if the operator jerks the stylus resulting in actuation of the speed error detector. Referring to FIG. 11, the analog plot 50 is sub-divided by measured Inter-Record-Gap (IRG) intervals indicated by the dashed lines 51. At each intersection of the plot with a line 51, respective visible marks 52, 53, 54, 55 are made on the graphical plot. The spatial distance between each line 51 is selected so that no more data may be generated between each interval than can be handled by the input memory of the final processing digital computer.

During recording, the operator enters an Inter-Record-Gap upon reaching each next position 52, 53, 54, 55, on the magnetic tape by depressing the IRG (Inter-Record-Gap) button in the manual entry keyboard 31. This causes the recorder to advance the tape through a preset distance, e.g. ¾ inch. The time that it takes for this blank interval of tape to pass through the processing computer is sufficient to transfer the data from its input memory to its other memory facilities. A new IRG entry is automatically made on the tape when the operator re-enters the tracer mode.

Means are also provided for entering a keyboard entry during the tracer mode without actuating the mode control switch. Thus, any code entry preceded by A or B which is made on the manual keyboard will be entered during tracer mode. While of wide application, this feature is especialy useful for designating particular points on the graphical data. For example, if a square were being digitized, it would be advantageous to indicate its four corners very critically. Accordingly, during the tracing procedure, each time a corner is reached, the operator need only enter a code beginning with A or B, which code is entered without touching the mode selection switch.

If while making a digitization of the graphical data the operator translates the stylus at a speed in excess of the recording rate of the magnetic recorder, both an audio and visual alarm are initiated. In addition, these alarms are energized if the stylus is moved during a quiescent machine state. In order to turn these alarms off, the operator must select the keyboard mode and enter the error codes on the magnetic tape, thus insuring that the processing computer disregards the incorrect data.

The trace error alarms encourage the operator to use the maximum digitization rates of the machine whenever possible since he can trace data with complete confidence that an instantaneous warning will be given if he exceeds the digitizing rate of the machine. Moreover, the trace error alarms permit the operator to direct his complete attention to accurately translating the stylus over the graphical data. As a result, the trace error alarm increases both the speed and accuracy of the digitizing procedure.

If a tracing error is made, e.g. at point 56, the operator need only switch to the keyboard mode, return the stylus to the preceding IRG position 53, enter an error code on the manual entry keyboard 31, and resume tracing from the IRG position 53. The error code produces a suitable signal recorded on the magnetic tape which informs the processing digital computer to disregard all the data recorded between the IRG preceding the error code and the IRG following the error code. As a result, the incorrect data is automatically discarded by the processing computer.

When the entire graphical plot is completed, the keyboard mode is again initiated by actuating button 30 to the keyboard position and a suitable E.O.F. code indicating the end of file is selected on the manual entry keyboard 31.

Stylus and carriage assembly

The stylus 20 as shown in FIGS. 2, 7 and 45 comprises a generally rectangular plate 60 of a clear transparent material such as acrylic or polystyrene. The stylus is adapted to be rapidly and precisely moved over the graphical record. Toward this end, a vertically extending lever 63 is affixed to plate 60. This lever is grasped by the operator in the manner of a pencil or pen and the graphical record traced in close aproximation to moving the pencil or pen in normal writing fashion. A support member 64 of Teflon resin material or the like is attached to the bottom of the stylus for resting the stylus on the upper face of the tracing bed or directly upon the sheet of graphical data located thereon. A plastic insert 62 extends through an aperture in plate 60 and has a sighting crosshair 61 inscribed and inked on its bottom face. As shown in FIG. 45, this crosshair is located closely proximate the surface of the graphical data thereby eliminating parallax.

The carriage assembly is best illustrated in FIGS. 2, 7, 9 and 10 and includes L-shaped brackets 70 and 71 respectively connected at opposite ends of the rod 21. A single guide wheel 72 having an annular groove around its circumference is rotatably mounted about its vertical axis to bracket 70 in an in line position with respect to rod 21. Guide wheel 72 engages a guide rod 73 which extends along substantially the entire length of the upper side of the tracing bed 15. A pair of similar guide wheels 75, 76 are rotatably mounted to bracket 71 about their respective vertical axes in respective positions on opposite sides of the rod 21. The guide wheels 75, 76 engage a guide rod 77 which extends along substantially the entire length of the lower side of the tracing bed 15. Guide wheels 72, 75 and 76 locate the rod 21 in a plane parallel with respect to the surface of the tracing bed 15 and support the rod for transverse movement across the tracing bed.

The stylus plate 60 is affixed to a movable housing 80 which is advantageously supported by a pair of ball bushings for translation along the length of the rod 21.

Linkage coupling the carriage assembly to the X axis encoder

Movement of the rod 21 along the X axis is converted into digital data by the X axis digital encoder 90 shown schematically in FIG. 7 as an input rotatable shaft 91 connected to a toothed digitizing wheel 92. The linkage coupling rod 21 to the input shaft 91 includes flexible cable segment 95. As shown, cable 95 is secured to horizontally extending cable support leg 96 of bracket 70. This segment passes around the vertically mounted pulley 97 located at the upper right corner of the tracing bed, then two times around the input shaft 91 of the encoder 90, across to a horizontally mounted pulley 98 located at the upper left corner of the tracing bed, over to another horizontally mounted pulley 99 located at the lower left edge if the tracing bed, around a vertically mounted pulley 100 also located at the lower left edge of the tracing bed, to a horizontally extending cable support leg 105 of bracket 71. Legs 96 and 105 are rotatably mounted on vertical pins in brackets 70 and 71 respectively, permitting the adjustment of horizontal skew in coupling rod 21 without affecting the tracking of the guide wheel 72, 75 and 76.

Another cable segment 95′ is attached to a horizontally extending cable support leg 106 of bracket 71. The cable 95′, fastened at one end to support leg 106, passes around a vertically mounted pulley 110, then around a horizontally mounted pulley 111 at the lower edge of the tracing bed 15, over to another horizontally mounted pulley 112 located at the upper right end of the tracing bed, across to a vertically mounted pulley 113 located at the upper left edge of the tracing bed, and back across to a horizontally extending support leg 114 of bracket 70 where the end of the wire cable 95' is secured. (Both ends of the cables 95 and 95' are terminated in threaded adjustment screws.)

It will be observed that as the rod 21 is translated in the direction of arrow 120, the cable segment 95' will cause the digitizing X axis encoder armature 92 to rotate in the direction of arrow 121 (clockwise as viewed from the rear of the digitizer). Likewise, movement of the rod 21 in the opposite direction across the tracing bed will cause the armature 92 to turn in a counterclockwise direction as viewed from the rear of the instrument.

A significant feature of the above-described coupling arrangement is that it maintains a uniform force at the bottom and top ends of the rod 21 so as to prevent skewing of the rod 21 as it is translated across the tracing bed. This is quite necessary in order to maintain the accuracy of the digitization. Thus, of the rod suspension was such as to allow the rod to be skewed 0.01 or more inch during a digitizing process, a translation of the stylus solely in the Y direction over the bed would result in deflection of the rod 21 and thus result in the erroneous recording of one or more X increments. This result is avoided in the present invention. For example, if a force is applied to cable 95 at the position and in the direction of arrow 130, this force will be translated, by virtue of its common connection to bracket 70 to cable 95' at the position of arrow 131. This cable will apply an equivalent force 133 (latter force will be applied by the cable 95') to bracket 71. Accordingly, any force applied at either end of the rod 21 or at any position along its length will cause equivalent forces to be applied at both ends of the rod so as to maintain rod 21 parallel to the Y Axis.

A further advantage of this feature is that it enables the carriage to be mounted and maintained in position by the three point contact suspension comprising guide wheels 72, 75 and 76. The stylus 20 is thus mounted on a carriage assembly of very low inertia and friction load to approximate as closely as possible the feel of an ordinary pen or pencil.

Linkage coupling the carriage assembly to the Z axis encoder

Figure 10:
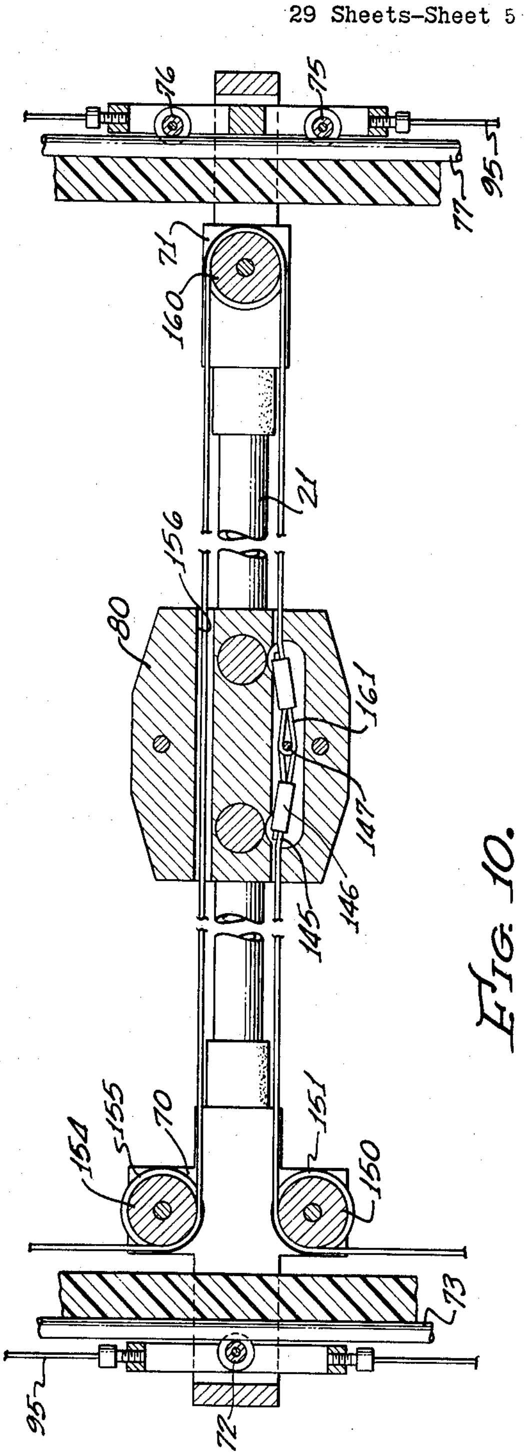
FIG. 10 is a cross-sectional view taken along line 10—10 of FIG. 9.

The Z encoder 140 as shown in schematic form has an input rotational shaft 141 and a toothed digitizing armature (wheel) 142. As in the case of the X axis encoder, the encoder provides digital output signals in accordance with rotational inputs supplied to the shaft 141. A substantially continuous cable 145 has one end 146 connected to a post 147 of housing 80 (FIG. 10). As shown schematically in FIG. 7, the cable wire 145, fastened at one end to housing 80, passes around pulley 150 horizontally mounted to a horizontally extending support leg 151 of bracket 70. The cable then passes around a vertically mounted pulley 152, across to shaft 141 where it is wrapped around two times, to another vertically mounted pulley 153, back to pulley 154 horizontally mounted to a horizontally extending leg 155 of bracket 70, through a slot 156 of housing 80 to pulley 160 horizontally mounted to bracket 71, and back to post 147 where its end 161 is secured.

It will be observed that as the housing 80 is translated along the rod in either direction of the Y axis, the Z axis encoder armature 142 will be caused to rotate. Furthermore, translation of the rod across the tracing bed produces a corresponding rotation of the armature 142. Accordingly, the rotation of the encoder armature 142 comprises both X and Y information and is defined by the equation $$Z=X+Y \quad (1)$$

As described below, the Z displacement is translated into Y axis data by combining the outputs of the X axis and Z axis encoders and solving the equation $$Y=Z-X \quad (2)$$

It will be seen from FIG. 7 that the carriage assembly and linkage coupling the assembly to the X and Z axis digital encoders is free of structural apparatus underneath the surface of the tracing screen. Accordingly, data may be conveniently optically projected onto the underside of this screen through the open framework of table 10.

Housing lock

The stylus supporting housing 80 of the graphical data digitzer of this invention is designed to incorporate a locking mechanism so that the stylus may be selectively retained in any position along the rod 21. This mechanism is most clearly shown in FIG. 8 and comprises a first pivot arm member 170 having a bore 171 therein slightly larger in diameter than the ball bushing (not shown) in communication with an inwardly extending pocket 173. An outwardly extending arm 175 is formed integral with the member 170. A corresponding pivot arm member 180 is formed with a similar aperture 181, rotating about another ball bushing (not shown) and integral arm 182. A coil spring 185 formed of steel wire sleeved in Teflon material or the like is confined within the respective cylindrical cavities of the pivot arm members with the ends of the spring 185 being bent in respectively opposite directions at right angles to the spring axis with one end 186 of the spring being located within the pocket 173 and the other end 187 being located within the corresponding pocket (not shown) of the member 180.

The members 170, 180 and spring 185 positioned together as described are located and retained in a yoke formed by respective upstanding shoulders of the ball bushings installed in the housing 80 and the rod 21 passing through the housing 80, bore 171 of pivot arm 170, the open interior of coil spring 185, and bore 181 of pivot arm member 180.

Locking action is provided by so dimensioning coil spring 185 that in its unbiased state, its open interior diameter is somewhat larger than the diameter of the rod 21 whereas in its biased state (with ends 186 and 187 drawn together) its interior diameter is somewhat smaller than the diameter of the rod 21. Hence, when both pivot arm members are rotatably actauted toward each other within the housing yoke, the spring 185 grips the rod 21 so as to lock the housing 80 thereto.

An upstanding shoulder 190 on member 170 and a corresponding shoulder (not shown) on member 180 permit the members to be retained in their upright position whereupon a continuous tension is applied to the spring and the housing is locked at any preset point. Slightly pivoting the members 170, 180 away from each other releases the upstanding shoulders. The spring then rotationally biases the pivot arm members to the horizontal position shown in FIGS. 8 and 9, thereby permitting the housing to slide freely along the rod 21.

Paper hold-downs and feed mechanism

The paper clamp and feed mechanisms are located at each end of the tracing bed 15 and are best shown in FIGS. 2, 4, 43 and 44.

A paper hold-down is located at each end of the tracing bed 15 and actuated by respective levers 16, 17 (FIG. 1). The right-hand clamp is shown in FIG. 43 and comprises a stationary clamp bar 195 and a movable clamp rod 196. In the position shown, the rod is disengaged from the clamp bar and the paper is free to travel therebetween. Suitable mechanical linkage (not shown) connects the lever 17 to the rod 196 so that actuation, of the lever 17 causes the rod to raise up and grip the paper web.

The left-hand paper feed assembly comprises an electrical motor 200 driving a pulley 201 which is connected by a belt 202 via an idler pulley 205 to a pulley 203 driving a combination take-up and feed roll. Similarly, the right-hand assembly shown in detail in FIGS. 43, 44 comprises a motor 210 driving a pulley 211 connected by a belt 212 via an idler pulley 217 (FIG. 3) to a pulley 213 coupled to a combination take-up reel and feed roll 214. The roll 214 may be driven in either of two alternate positions 215 (FIG. 43) and 216 (FIG. 44). In the former position, the roll 214 carries a pair of disc shaped spacers 220 adjusted for the width of the paper roll, and the end of the paper web 221 is attached to the roll 214. Accordingly, as the motor 210 rotates, the roll 214 advances the paper web across the face of the tracing bed 15.

In the alternate position shown in FIG. 44, the paper web 222 is fed off the tracing bed 15 down on to a platform or the floor. This embodiment is particularly suited for accordion folded paper. As shown, the roll 214 is physically moved downward to frictionally engage a second idler roll 230 and the end of the paper is threaded between the juxtaposed rolls 214, 230. Rotation of motor pulley 211 results in respectively opposite rotations of the driver roll 214 and driven roll 230 with the paper web 222 being drawn across the bed 15 and downward below the housing 14.

The bearing supports for roll 214 are provided by an arcuate slot 229 formed in the roll support end plates 227, 228. The lower end 226 of this slot provides a lower bearing support and the upper end 229 of this slot is formed as shown to provide an upper bearing support. The transition from one position to the other is provided by the arcuate slot 229.

Digital encoder drive

The X and Z digital encoder drives are schematically shown in FIG. 7. A more detailed showing of these mechanisms is contained in FIGS. 3, 4, 5 and 6. As shown in FIG. 4, the X encoder 90 includes a bearing support bracket 225 affixed to the rear housing 226. Bracket 225 rotatably supports the input shaft 91 in a pair of ball bearings 227. The encoder armature and a pulley 229 are affixed at one end of shaft 91 by collar 228. Pulley 229 includes a multi turn helical groove 230 in its cylindrical surface which is engaged by the two turns of the flexible cable 95. The number of turns of groove 230 is determined by its outer diameter and the maximum distance through which the rod 21 traverses from one end of the tracing bed to the other. As the rod is traversed across the tracing bed, the cable 95 is caused to traverse the pulley 229 by virtue of the helical groove 230. Hence, the number of threads must be sufficient so as to accommodate the maximum travel of the rod 21.

Figure 3:
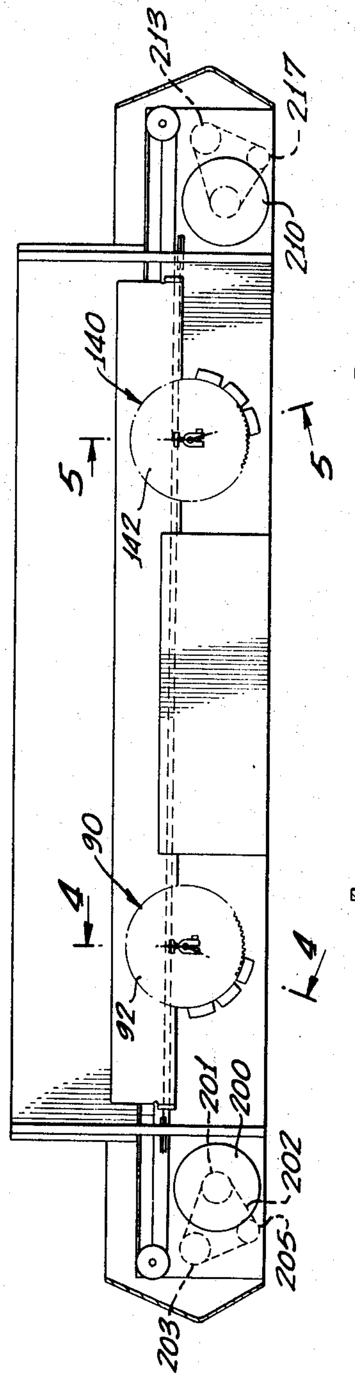
FIG. 3 is a partial rear elevation view particularly showing the placement of the digital encoders.
Figure 4:
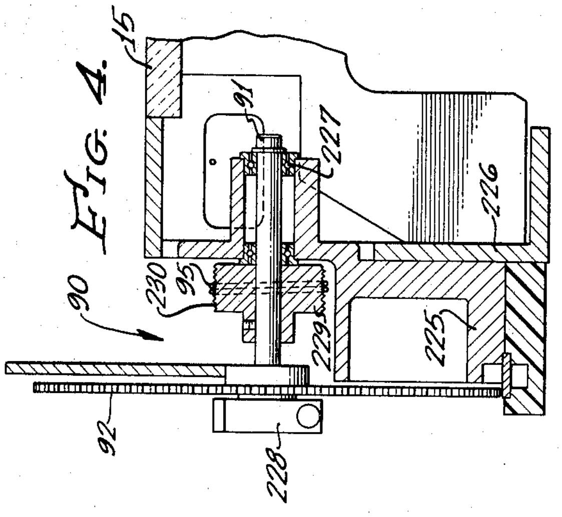
FIG. 4 is a cross-sectional view taken along line 4—4 of FIG. 3 showing details of the X axis digital encoder.
Figure 5:
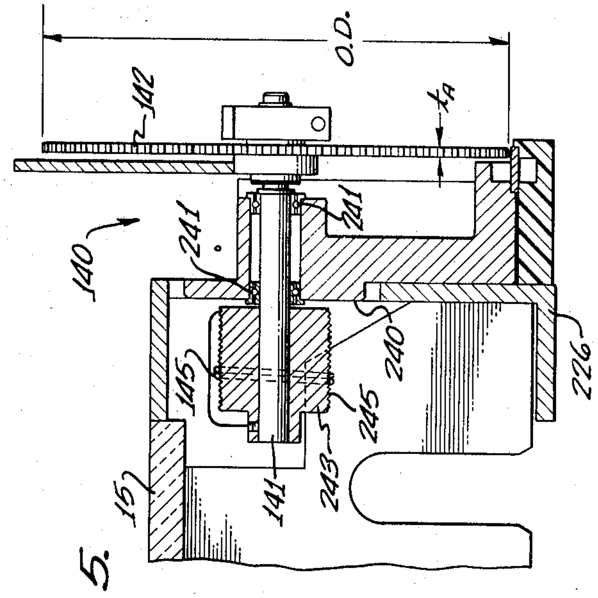
FIG. 5 is a cross-sectional view taken along line 5—5 of FIG. 3 showing details of the Z axis digital encoder.

The Z digital encoder 140 as shown in FIGS. 3 and 5 includes a support bracket 240 mounted to the rear housing 226 and rotatably supports shaft 141 in a pair of ball bearings 241. Affixed at opposite ends of shaft 141 are pulley 243 and armature 142. Pulley 243 includes a helical groove 245 which is engaged by the two turns of the flexible cable 145 and is sufficiently long to accommodate maximum translation of the stylus in both the X and Y directions.

General description of system operation

Figure 12:
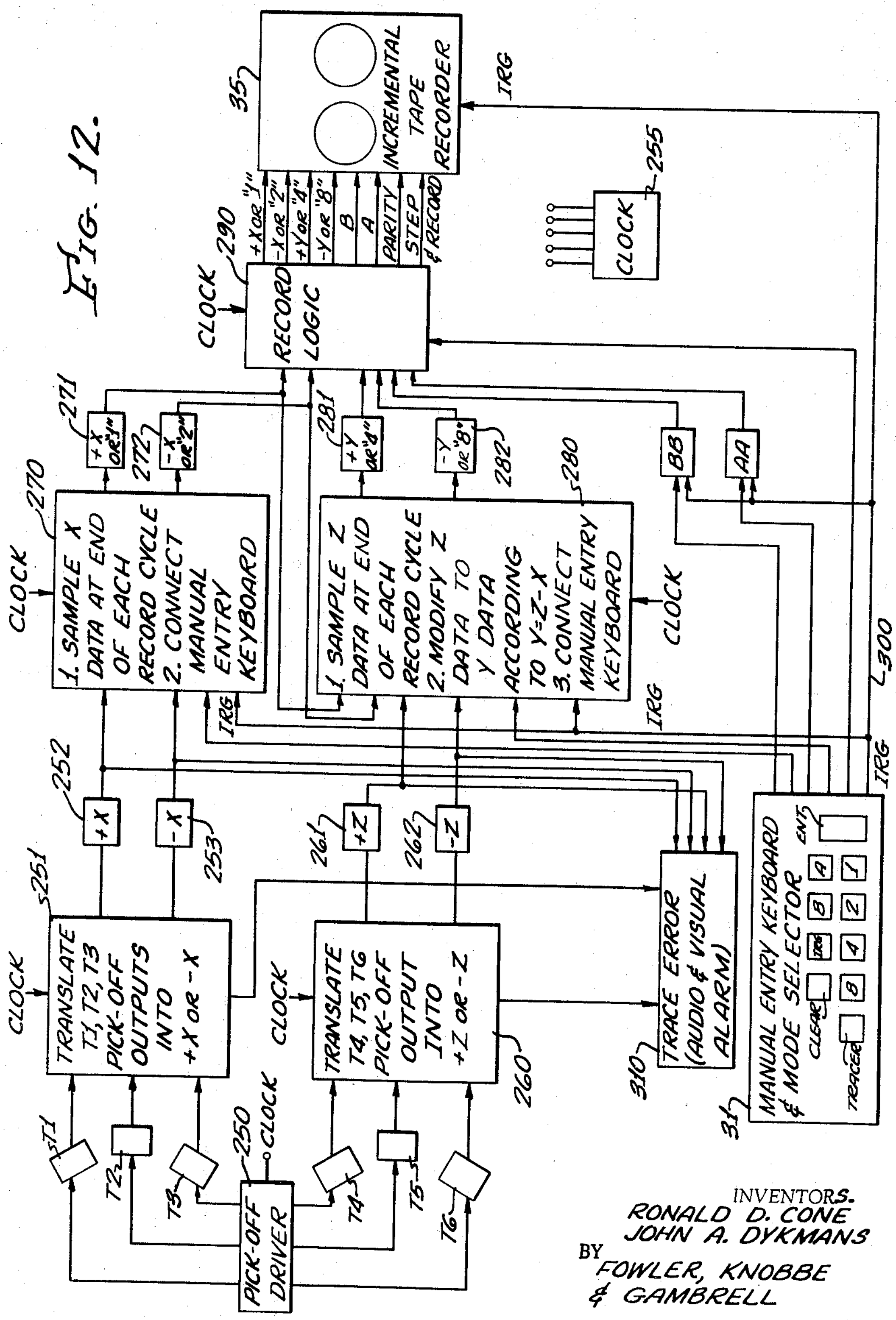
FIG. 12 is a simplified block diagram of the overall system for translating the outputs of the digital encoders into magnetically recorded digital data.

Referring to FIG. 12, the overall system for translating the outputs of the digital encoders into magnetically recorded digital data comprises three pick-offs T1, T2 and T3 responsive to the X axis encoder armature 92 (shown in FIGS. 2, 3, 4) and three pick-offs T4, T5 and T6 responsive to the Z axis encoder armature 142 (shown in FIGS. 2, 3 and 5). These pick-offs are excited by a clock synchronized pick-off driver 250.

Stage 251 translates the outputs of pick-offs T1, T2 and T3 into digital data corresponding to +X or −X and stores the increment in stage 252 or 253. That is, if the stylus 20 is moved one increment of distance in the +X direction, the resulting movement of the encoder armature 92 is stored as a bit in the storage element 252. Likewise, if the stylus 20 is moved one increment of distance in the −X direction, the resulting movement of the armature 92 is stored as a bit in the storage element 253. No movement along the X axis results in zero stores in elements 252 and 253. This information is synhcronized with the system clock 255 by the clock input to the stage 251. Accordingly, although the movements of the stylus may be completely random and asynchronous, the recorded data is completely synchronized by a common clock. A similar clock synchronized stage 260 translates the outputs of pick-offs T4, T5 and T6 into +Z or −Z and provides a data bit in storage element 261 representing a +Z incremental movement and a data bit in storage element 262 representing a −Z incremental movement.

The outputs of X axis storage elements 252 and 253 are sampled at the end of each record cycle by stage 270 which controls output storage elements 271 and 272. As described hereinafter, a record cycle is the time interval that it takes to record a single increment of movement of the stylus. Each such record cycle is defined by the clock 255 to which stage 270 is responsively connected. In the tracing mode, storage element 271 provides a temporary store for data representing a +X incremental movement and storage element 272 provides a temporary store for data representing a −X incremental movement.

Stage 280 is connected to both the outputs of Z axis storage elements 261 and 262 and the X data storage elements 271 and 272 and is synchronized with the clock 255 for sampling each of these storage elements at the end of each record cycle. Stage 280 provides the additional function of subtracting the X data from the Z data thereby performing the equation $Y=Z-X$. The resulting Y data is recorded in storage elements 281 and 282, storage element 281 storing data representing a +Y increment during the record cycle and storage element 282 storing data representing a −Y increment.

The outputs of the respective storage elements 271, 272, 281 and 282 are coupled to the incremental tape recorder 35 by record logic stage 290. The record logic stage is coupled to the recorder 35 by eight channels. Seven of these, the +X, −X, +Y, −Y, B, A and parity correspond to the standard seven-channel format compatible wtih the processing digital computer. An additional channel labeled step and record controls the actual recording of the data and is synchronized with the clock 255 and with the outputs of stages 271, 272, 281 and 282 so that in tracer mode, the tape is not advanced unless there is data to be recorded.

Stages 270 and 280 also provide the additional function of connecting the manual entry keyboard 31 to the incremental tape recorder. Thus, when the keyboard mode is selected, storage elements 271, 272, 281 and 282 respectively record data corresponding to binary 1, 2, 4 and 8 channels. Additional storage elemnts AA and BB store the A and B data. The data so selected at the manual entry keyboard and stored in the storage elements is recorded in the incremental tape recorder upon actuation of the ENTER button which applies a pulse on the step and record channel.

As previously described, the graphical data digitizer of this invention provides an Inter-Record-Gap (IRG) at selected intervals along the graphical data. This gap comprises a blank interval of tape and is provided as shown in FIG. 12 by an IRG button in the manual entry keyboard and an IRG channel 300 connected directly to the incremental tape recorder 35 and the stages 270, 280, BB and AA. Upon actuation of the IRG button, the tape is advanced through a predetermined distance while simultaneously the storage elements 271, 272, 281, 282, BB and AA are inhibited from transmitting any data to the incremental tape recorder.

A significant feature of this invention is that while the movements of the stylus by the operator are wholly asynchronous, the recording of the data bits is entirely synchronized by an internal clock 255. Built into the system is a means for immediately notifying the operator if he exceeds at any time the recording capability of the system. This is provided by a trace error audio and visual alarm 310 responsive to the outputs of storage elements 252, 253, 261, 262 and stages 251 and 260. The trace error logic stage 310 detects whether or not the armature encoders are translated at such a rate as to attempt to fill any of the storage elements 252, 253, 261 or 262 with more than one X or Z increment per recording cycle. Since the capability of the machine is such as to allow only the recording of data corresponding to a single increment of advance in either the X or Z axes or both during a record cycle, it will be apparent that movement of the encoder armatures at a rate in excess of this recording rate will produce data bits which would otherwise be lost in the digitization process. This loss is prevented by the trace error audio and visual alarm stage 310. For example, if during a recording cycle, stage 251 detects a +X increment after a like increment has already been stored in element 252, the trace error stage 310 is triggered resulting in an instantaneous audio and visual alarm.

The tracer error alarm is also sounded if the stylus is moved during entry of an Inter-Record-Gap, thus notifying the operator that the stylus was advanced while the tape recorder was otherwise occupied.

More detailed description of system operation

Figure 13:
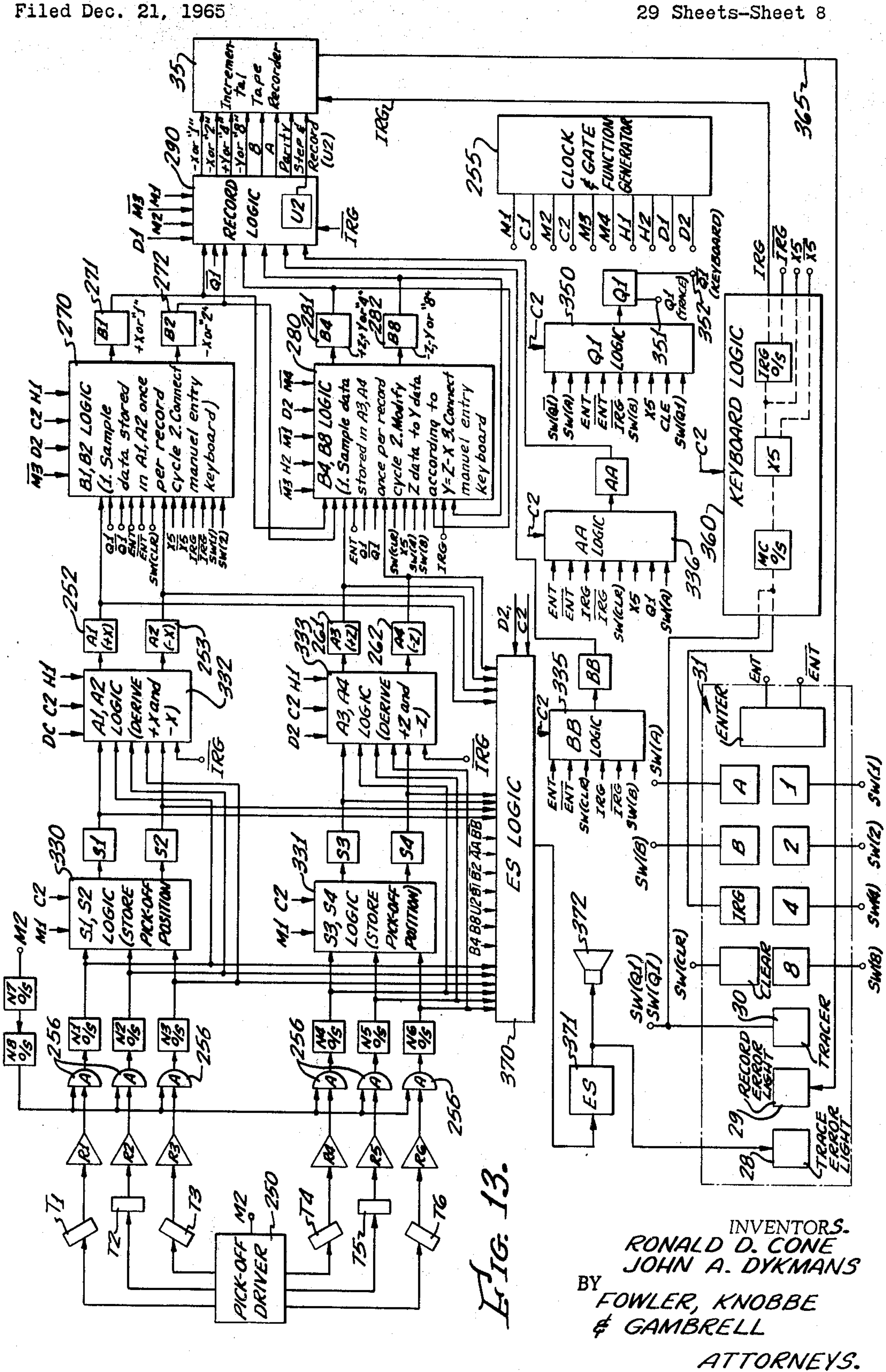
FIG. 13 is a detailed block diagram of the system of FIG. 12.
Figure 14:
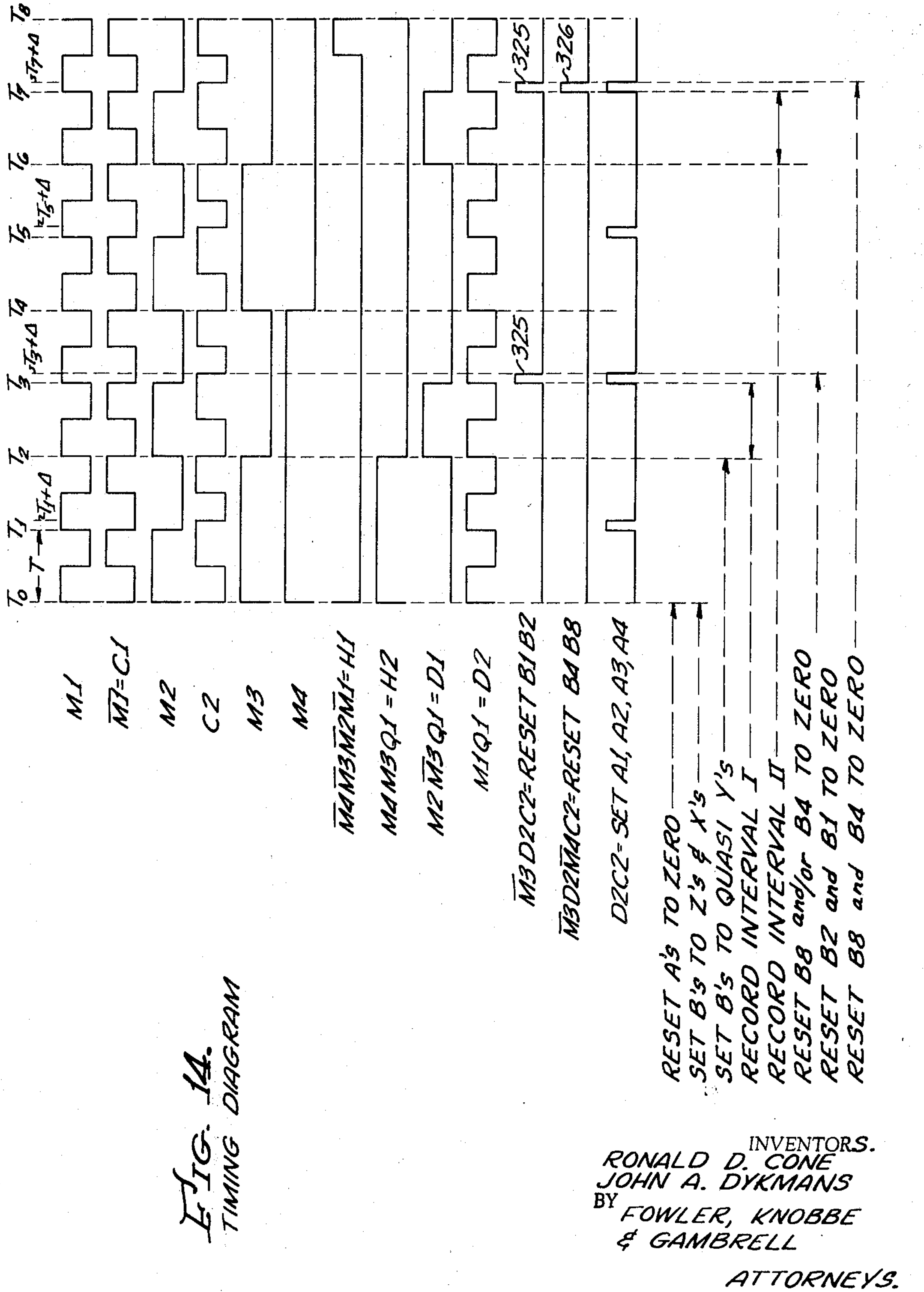
FIG. 14 is a timing diagram illustrating the outputs of the clock and gate function generator of FIG. 13 and the timing periods at which various operations are performed in the data translation logic.

Referring to FIGS. 13 and 14, the clock and gate function generator 255 produces a plurality of synchronized timing and gating pulse trains for controlling the entire system operation. The basic timing signals are M1, M2, C2, M3 and M4. It is to be noted that the clock train C2 is not symmetrical. Thus, every other C2 pulse extends a Δ time period beyond the M2 pulse. From these are derived H1, H2, D1, D2 and reset timing pulses 325 and 326. The function Q1 in H2, D1 and D2 terms indicates the tracing mode, i.e. H2, D1 and D2 are available only during the tracing mode.

FIG. 14 illustrates the pulse trains for a single record cycle, that is, the pulses shown occur during the time interval that it takes to record a single increment of movement of the stylus. Each record cycle is divided into eight time intervals $T_0$, $T_1$, $T_2$, $T_3$, $T_4$, $T_5$, $T_6$, $T_7$ and $T_8$ by the clock train M1. The record cycle is fixed by the maximum recording rate of the incremental tape drive. As described below, two incremental recorder steps are alloted per cycle. Therefore, with a recorder having a maximum recording rate of 500 steps per second, the record cycle is fixed at 4 milliseconds.

Referring now to FIG. 13, the pick-off driver stage 250 is connected to the M2 clock function so that each of the pick-offs are pulsed by the trailing edge of each M2 pulse. Referring to FIG. 14, it will be seen that each of the pick-offs are thus pulsed four times each record cycle at time periods $T_1$, $T_3$, $T_5$ and $T_7$. The outputs of each of the pick-offs are connected to inputs of respective read amplifier stages R1, R2, R3, R4, R5 and R6 which drive respective one-shot multivibrators N1, N2, N3, N4, N5 and N6 through respective AND gates 256. As shown, each of the outputs of the read amplifiers are ANDed with a function derived from the clock M2 but delayed a short time thereafter by a pair of one-shot multivibrators N7 and N8. As a result, the outputs of each of the read amplifiers are read a fixed time subsequent to the trailing edge of the clock M2. The N one-shot multivibrator stages, when triggered, produce clean pulses of fixed length synchronized with respect to the clock M2. With a record cycle of 4 milliseconds, a representative ON time for the N1–N6 one-shots is 75 micro-seconds, 3.4 micro-seconds for N7 and 5.5 micro-seconds for N8.

As described below, the present invention provides an encoder assembly which provides a fixed dead space thereby substantially improving the accuracy of the digitizing process. During the translation of the pick-off data, the pick-off position is temporarily stored in flip-flops S1, S2, S3 and S4. The combination of flip-flops S1 and S2 and their associated input logic 330 provides four unique states for storing any position of the pick-off. Similarly, the combination of flip-flops S3 and S4 and their associated input logic 331 provides four unique states for storing any position of the Z axis encoder armature. The M1 and C2 clocks control both the logic stages 330 and 331.

The X and Z data bits are derived by four flip-flops A1, A2, A3 and A4 in conjunction with respective input logic stages 332 and 333 by comparing the output of the N1, N2, N3 and N4 one-shots with the previous states stored in the flip-flops S1, S2, S3 and S4. The clock functions D2, C2 and H1 control the logic stages 332 and 333. Flip-flops A1 and A2 store the magnitude and polarity of the change in X for use in decoding Z and for eventual recording. Likewise, flip-flops A3 and A4 store the magnitude and polarity of the change in Z. Thus, flip-flop stage A1 in its OFF or false state represents no movement in the +X direction. When this stage is triggered to its ON or true state, it represents a +X increment. In like manner, stage A2 stores −X data, stage A3 stores +Z data and stage A4 stores −Z data. Accordingly, these flip-flops correspond to storage elements 252, 253, 261 and 262 respectively of FIG. 12.

Logic stages 270 and 280 function as described above in relation to FIG. 12 and control the setting of the B1, B2, B4 and B8 flip-flops which function in the manner of the storage elements 271, 272, 281 and 282 of FIG. 12 to store the X and Y data. In addition, the B4 and B8 flip-flops are used at time $T_0$ as temporary stores for the Z data. Subsequently, during the record cycle, the decoded Y data is re-stored in B3 and B4 and forwarded to the output recorder logic network 290 for recording. The clock functions $\overline{M3}$, D2, C2 and H1 control the logic stages 270. The clock functions $\overline{M3}$, H2, $\overline{M1}$, D2 and $\overline{M4}$ control the logic stage 280.

The record logic 290 couples the outputs of each of the B1, B2, B4 and B8 and additional flip-flops AA and BB to the incremental tape recorder as described above. When the Z data is −1 and the X data is 1, the Y data is −2; also, when the Z data is 1 and the X data is −1, the Y data is +2. Since it is therefore possible to have an X incremental movement and two W incremental movements decoded in one record cycle, the two recorder intervals I and II defined by D1 are provided for each record cycle as shown in FIG. 14 so that a Y data bit may be recorded in each interval to properly record +2 or −2 whenever required. As shown, the record logic includes a U2 one-shot multivibrator for generating the step and record pulse input to the incremental tape recorder 35. Clock functions 1, M2, $\overline{M3}$, and M1 control the record logic 290. The manual entry keyboard 31 provides manual selector switches labeled 8, 4, 2, 1, B, A, CLEAR and ENTER which generate associated switch functions SW(8), SW(4), SW(2), SW(1), SW(B), SW(A) and SW-(CLEAR). The ENTER switch and its associated logic provides a true enter (ENT) and a not enter ($\overline{ENT}$) output.

The IRG switch is connected to the keyboard logic stage 360 which includes an MC one-shot multivibrator, and X5 flip-flop and an IRG one-shot multivibrator. The true output of the IRG one-shot multivibrator is connected directly to the input of the incremental tape recorder 35. Accordingly, each time the IRG button is pushed, the IRG one-shot is caused to trigger, resulting in the magnetic tape advancing a predetermined amount. In addition, both outputs of the IRG one-shot are connected to the BB logic 335 and one or more of the outputs of the IRG one-shot and X5 flip-flop are connected to the B1, B2 logic 270, the B4, B8 logic 280, and the AA logic 336 for resetting these flip-flops to OFF. Accordingly, no write signals can be transmitted to the incremental tape recorder 35 during the Inter-Record-Gap so as to insure that the gap is completely blank of data.

Further, the false IRG ($\overline{IRG}$) is connected to the A1, A2 logic 332 and the A3, A4 logic 333 for inhibiting these stages from being reset during entry of the Inter-Record-Gap. As a result, movement of the stylus during entry of IRG will continue to fill these flip-flops thereby initiating the trace error alarm.

The mode selector switch 30 provides a pair of switch functions indicating whether the switch is in the tracer (SW[Q1]) or keyboard (SW[$\overline{Q1}$]) mode. This switch controls the Q1 flip-flop via the Q1 logic stage 350. Thus, when the Q1 flip-flop is true, an output is provided on its Q1 terminal 351. When the keyboard mode is selected, an output is provided on the opposite or $\overline{Q1}$ terminal 352. These outputs control the B1, B2 logic 270, B4, B8 logic 280, AA logic and the record logic 290. In addition, the mode selector switch 30 provides an input to the keyboard logic for automatically producing an IRG function each time the mode selector switch is returned to the tracer mode from the keyboard mode.

The trace error audio and viusal alarm is provided by an ES logic stage 370 and an ES flip-flop 371. As shown, the ES logic 370 is responsive to the outputs of the N one-shot multivibrators, the S flip-flops and the A flip-flops. In this way, the outputs of each of the A flip-flops are compared with new data from the encoder so as to provide a detection for multiple X or Z increments during a single recording cycle. Clock functions D2 and C2 synchronize this stage with the clock. The output of the ES logic controls the ES flip-flop which drives both the trace error light 28 and a loud speaker 372 upon occurrence of a speed error. Reset of the ES flip-flop is derived from the B, BB, AA flip-flops and U2 one-shot.

Additionally, the ES logic detects movement of the stylus 20 when the IRG button has been operated to provide the Inter-Record-Gap. This function is provided by the $\overline{IRG}$ inputs to the A1, A2 logic stage 332 and the A3, A4 logic stage 333. Normally, these stages are reset to zero at time $T_0$, the beginning of each record cycle. However, when the IRG button has been actuated, the zero reset is inhibited so that the A1 and A2 stages continue to count up to an overflow resulting in sounding of the audio alarm over loud speaker 372 and a flashing of the trace error light 28. The operator is then notified that he has actuated the stylus when the machine was in IRG and the tape recorder could not accept input data.

The record error light 29 is responsively connected to the incremental tape recorder via lead 365. If the recorder is not properly functioning, its control circuitry applies a signal on lead 365 which causes light 29 to be energized and indicate to the operator that the recorder is not functioning properly.

Circuit details of the flip-flop and one-shot multivibrator stages

In the detailed block diagram of FIG. 13, each of the flip-flops and one-shot mulitvibrators are shown as individual blocks having generally a single input and a single output. It will be understood that these elements have been so represented in order to simplify the diagram and description of the overall operation. Thus, referring to FIG. 15*a*, each flip-flop includes a false input terminal 380, a true input terminal 381, a false output terminal 382 and a true output terminal 383. With reference to a specific flip-flop such as the X flip-flop, the false input is denoted as 0X, the true input denoted as 1X, the false output denoted as $\overline{X}$ and the true output denoted as X in the following description.

In the following description, the flip-flops described are the set-reset type flip-flop. Thus, a pulse of the proper polarity applied to the terminal 380 triggers the flip-flop to reset so as to ground terminal 383. A pulse at the true input terminal 381 triggers the flip-flop ON to apply a positive voltage to the true output terminal 383.

FIG. 15*b* is a detailed circuit schematic of the type of flip-flop used throughout the block diagram FIG. 13, where the input and output terminals are labeled in accordance with FIG. 15*a*. By way of example only, the following specific component values are given as typical of those which may be used in the flip-flop stage shown in FIG. 15*b*: All diodes are Sylvania type D6436; all transistors are Sylvania type SYL 4597; resistors 385 and 400 are 100K ohms; resistors 386, 390, 391, 392, 393, 394, 396 and 401 are 5.6K ohms; resistors 387 and 398 are 1.5K ohms; resistors 388 and 399 are 18K ohms; resistors 389 and 395 are 2.2K ohms; and resistor 397 is 12K ohms.

Referring to FIG. 16*a*, each one-shot multivibrator stage X includes a 1X input terminal 435, a true output terminal X identified as 436 and a false output terminal $\overline{X}$ identified as 437. A complete circuit schematic for the one-shot multivibrator stage is shown in FIG. 16*b*. By way of example only, the following specific component values are given as typical of those which may be used in the one-shot multivibrator state in FIG. 16*b*: All transistors are Sylvania type SYL 4597; all diodes are Sylvania type D6436; resistor 440 is 100K ohms; resistors 441 and 453 are 1.2K ohms; resistor 442 is 18K ohms; resistors 443, 445, 447, 448 and 454 are 5.6K ohms; resistors 444 and 452 are 2.2K ohms; resistors 446 and 449 are 12K ohms; and resistors 450 and 451 are 3.3K ohms.

Digital encoders

Figure 6:
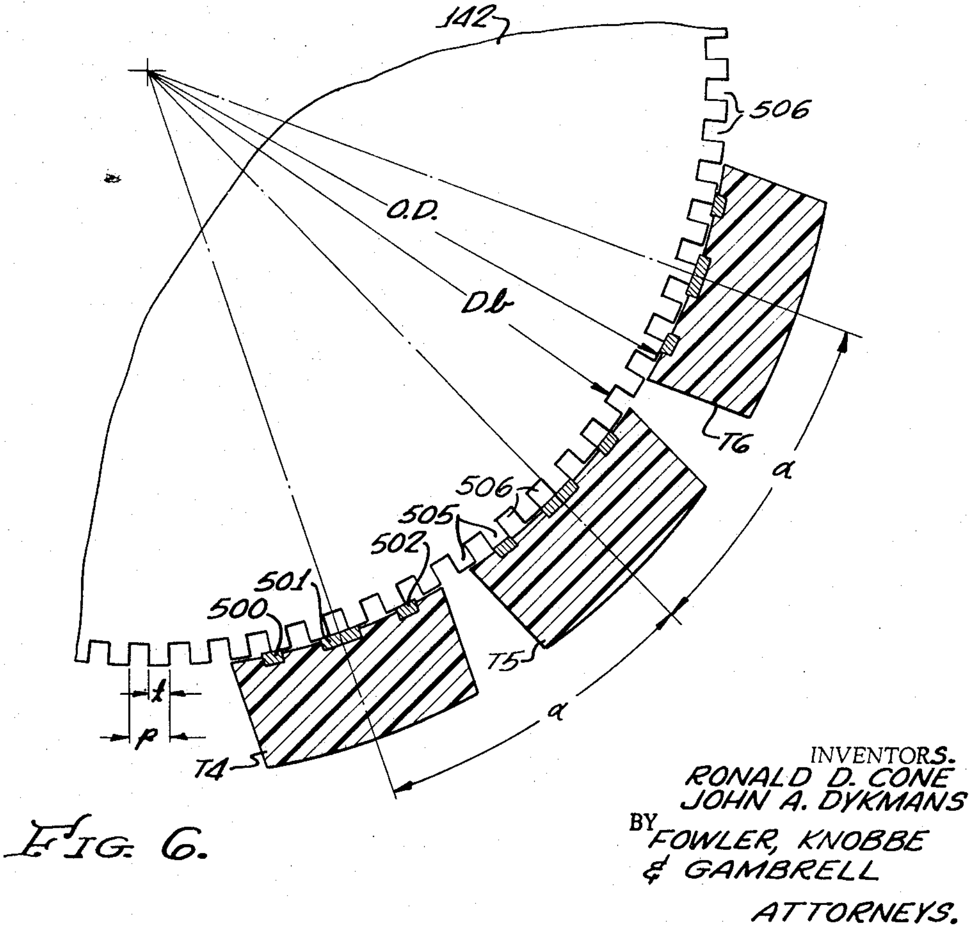
FIG. 6 is an enlarged fragmentary view of a digital encoder.

An enlarged view of the Z axis encoder armature wheel 142 and associated pick-offs T4, T5 and T6 is shown in FIG. 6. The X axis armature and pick-offs T1, T2 and T3 have a similar structural configuration. Each pick-off includes an E-shaped magnetic core having respective pole faces 500, 501 and 502. These pole faces cooperate with the regularly spaced teeth 505 and airgaps 506 of the armature 142 to provide output signals indicative of the direction and magnitude of movement of the armature relative to the fixed pick-offs. For the most efficient encoder, the armature is formed of a series of laminations of HI-MU 80 alloy or its equivalent.

The pick-offs are respectively displayed from one another through 120 electrical degrees, where the complete cycle of the electrical output of any one head is considered to be 360°. The relative positions of the respective heads and relative dimensions of the pole faces and teeth on the coding wheel are shown diagrammatically in FIG. 17. As shown, each of the outer pole faces 500 and 502 has a width corresponding to the thickness ($t$) of the teeth 505, whereas each of the inner pole faces 501 has a width corresponding to the circular pitch ($p$) which is twice the distance $t$. Further, the pole face 501 is spaced from the other faces 500 and 502 by the pitch distance ($p$).

The electrical displacement of 120° between pick-offs is provided by offsetting the pick-off T5 through a distance of ⅓$p$ with respect to T4 and displacing pick-off T6 a distance of ⅔$p$ with respect to pick-off T4, as shown. This displacement is provided by suitably arranging the pick-offs so that their center axes are displaced by an angle $\alpha$ as shown in FIG. 6. Representative dimensions for an actual encoder constructed as shown in FIGS. 5 and 6 are as follows:

| | Inches |
|---|---|
| Outside diameter (O.D.) of encoder armature wheel **142** | 3.501 |
| Root Circle ($D_b$) | 3.375 |
| Circular pitch ($p$) | .125 |
| Thickness of encoder armature **142** ($t_A$) | .06 |
| Tooth thickness $t$ | .06 |
| Number of teeth **505** | 88 |

Angle $\alpha$, 25°, 4 minutes, 22 seconds or 6⅓ p.

As shown in FIG. 18, the stationary portion of each pick-off advantageously comprises an E-shaped laminated core 510 having outside legs 515, 516 respectively providing the pole faces 500 and 502 and an inside leg 514 providing the pole face 501. A primary winding 511 is wound on the inside leg 514 and secondary windings 512 and 513 are respectively wound on the outside legs 515, 516. The primary winding is connected to the input $T_p$ terminals and the secondary windings 512 and 513 are connected in series opposition to output terminals $T_S$.

In operation, the core 510, encoder armature 142 and primary and secondary windings provide a pulse transformer in which the magnetic reluctance path is varied between the primary leg and respective secondary legs as the position of the armature 142 is varied. Thus, it will be seen that in the position shown, the maximum amount of iron of armature 142 bridges the gap between secondary leg 516 and primary leg 514. Accordingly, a current $i_I$ produced by a pulse supplied to the terminals $T_p$ produces a flux $\phi$ as shown which in turn induces an EMF in secondary winding 513 causing the current $i_0$ to flow in the direction shown through the load attached to the output terminals $T_S$. A current in the opposite direction is produced as the encoder armature 142 is translated through one-half pitch in either direction. As described below, only the positive going pulse output of the pick-off is utilized for detecting stylus movement.

A feature of the pick-off of FIG. 18 is that it balances out the high frequency coupling. Such coupling is inherent because of the high frequencies inherent in a square wave input pulse and the small amount of iron contained in each pick-off. As a result, even with the secondary gap completely open as shown for secondary leg 512, there is a signal induced in the secondary winding when the primary winding is pulsed. Accordingly, if the signal level which is independent of the armature movement were not cancelled, some means would have to be used for detecting the increase in signal when the gap is closed by the armature. However, by utilizing opposing secondary windings as shown, that portion of the signal which is relatively independent of the armature position is balanced out and a positive signal output is provided when the armature air gap 505 is across the left hand side of the head and a negative signal output is provided when the air gap is across the right hand side of the head. In the center position, when the iron of the armature is substantially equally distributed between the two halves of the head, the output signal is substantially zero. Hence, the signal appearing at terminals $T_S$ crosses the zero axis, thereby enabling a simple zero threshold detection and providing substantially greater accuracy for determining when the armature has traversed through an angular distance of one-half pitch.

A complete circuit schematic for each of the pick-off heads and associated windings is shown in FIG. 19. In the X axis encoder, one side of each primary winding is connected a common terminal $TX_C$. Likewise in the Z axis encoder, one side of each primary winding is connected to a common terminal $TZ_C$. The other side of each of the primary windings of the respective pick-off heads T1, T2, T3, T4, T5 and T6 are respectively labeled $T1_p$, $T2_p$, etc. Each of the secondary windings are connected in series opposition as shown and connected to respective output terminal pairs labeled $T1_S$, $T2_S$, $T3_S$, $T4_S$, $T5_S$ and $T6_S$.

Encoder pick-off driver and read amplifier stages

The encoder pick-off driver stage simultaneously pulses each of the primary windings of the pick-offs T1, T2, etc. four times each record cycle with the trailing edge of clock M2. Because of the relatively large air gap in the magnetic pick-offs, the flux in the pick-off cores decays very rapidly to zero. A feature of the driver stage is that it provides a low resistance coupling to the primary winding upon energization thereof so as to lengthen the $L/R$ time constant.

The circuit schematic for the pick-off driver stage is shown in FIG. 20 and operates as follows. The driver stage is excited by the clock M2 connected to terminal 525. When M2 is true (and provides a positive voltage to terminal 525), transistor 526 turns ON, driving transistors 527 and 528 into their ON state. Transistors 527 and 528 provide driver stages for the X and Z axis pick-offs respectively. Thus, the terminals $T1_p$, $T2_p$, $T3_p$ are respectively coupled to transistor 527 and terminals $T4_p$, $T5_p$, and $T6_p$ are respectively coupled to transistor 528.

Current is caused to flow through the primary winding of pick-off head T1 when transistor 527 is turned ON through the series path including the power supply line 530, parallel resistors 531 and 532, the pick-off primary winding and back through lead 533, transistor 527, and a small bias resistance 534 to ground. When clock M2 is false and goes to ground, transistor 526 is cut off and as a result transistors 527 and 528 are placed in their OFF states. The current in the primary then attempts to go to zero causing a transient voltage to be induced in the primary winding of the pick-off. The collector electrode of transistor 527 immediately rises as a result of the transient, but is clamped by diode 540 to +8 volts. Diodes 541, 542, 543 in combination with series diodes 544 and 545 clamp the emitter of transistor 527. As a result, an 8-volt transient is established in the primary winding and simultaneously this winding is connected to a very low resistance path provided by the diodes. This low resistance provides a long $L/R$ time constant so as to extend the time during which current is maintained in the primary winding thereby insuring that the output signal produced at the pick-off secondary is of long enough duration to be sampled. A representative time duration for the transient is 20 microseconds which is a few microseconds longer than the sampling period for the pick-off secondaries as described hereinafter.

A complete schematic for read amplifier R1 is shown in FIG. 21. As shown, the amplifier includes a pair of input terminals 550, 551 (labeled 1R1) for connecting the amplifier to the associated pick-off head. Positive pick-off signals applied between terminals 550 and 551 are amplified and appear at output terminal R1. As described below, the signal between this output terminal 552 and ground is periodically sampled by the system clock and used to drive an associated one-shot multivibrator stage N1. Identical read amplifier stages R2, R3 are constructed in the manner of FIG. 21.

N one-shot multivibrator stages

One-shot multivibrators N1, N2, N3, N4, N5 and N6 are respectively responsive to read amplifiers R1, R2, R3, R4, R5 and R6. When triggered, the multivibrators generate clean, fixed length square waves thereby simplifying further signal processing and decoding. Further, the time at which each of the pick-off heads is read is synchronized with clock M2 by respective AND gates 255 located at the inputs of each of the N one-shot multivibrators.

A schematic of the logic circuitry associated with the inputs of each of the N one-shots is shown in FIG. 22. The circuitry shown mechanizes the following logical equations:

$$1N1 = N8\ R1 \quad (3)$$
$$1N2 = N8\ R2 \quad (4)$$
$$1N3 = N8\ R3 \quad (5)$$
$$1N4 = N8\ R4 \quad (6)$$
$$1N5 = N8\ R5 \quad (7)$$
$$1N6 = N8\ R6 \quad (8)$$
$$1N7 = M2 \quad (9)$$
$$1N8 = N7 \quad (10)$$

As shown in FIG. 22, a pair of additional on-shot multivibrator stages N7 and N8 provide a fixed time delay following each M2 clock pulse. The output of the N8 one-shot is connected to one input of an AND gate 255 comprising diodes 650 and 651. The other input to the AND gate 651 comprises the output of the read amplifier R1. The output of this AND gate is connected to the input of the N1 one-shot multivibrator. In like manner, each of the N one-shot multivibrators is triggered by the output of its associated read amplifiers at a fixed time following the trailing edge of the clock M2.

The pulse trains provided at the outputs of the N1, N2 and N3 one-shot multivibrators as the encoder armature is caused to rotate are illustrated in FIG. 23. It will be understood that a similar set of pulse trains can be drawn for the outputs of the N4, N5 and N6 one-shot multivibrators associated with the Z axis encoder. As shown in FIG. 23, each of the pulse trains is displaced one from the other by an electrical displacement of 120 degrees. This displacement is produced by the physical displacement of the pick-off heads as described hereinabove.

The three pluse trains produced by the X pick-offs are utilized to provide magnitude and polarity information in the following manner: Assume that the electrical distance corresponding to the pitch of the teeth of the encoder armature is divided into six equal intervals so as to provide state 1, state 2, state 3, state 4, state 5 and state 6, as shown in FIG. 23. Each of these six states is unique. Thus state 1 is defined by N1, N2 $\overline{N3}$; state 2 is defined by N1 $\overline{N2}$ N3; state 3 is defined by N1 N2 N3; state 4 is defined by $\overline{N1}$ $\overline{N2}$ N3; state 5 is defined by N1 N2 N3; and state 6 is defined by $\overline{N1}$ N2 $\overline{N3}$. It will be apparent that as the encoder armature is caused to move in the direction of arrow 675, it will result in a change from state 1, to state 2, to state 3, to state 4, to state 5, to state 6 and back to state 1. For reasons described below, states 2, 4, and 6 are not used. Accordingly, the positive incremental movement in the X direction ($P_X$) is defined as follows:

$$P_X=(1\rightarrow 3)+(3\rightarrow 5)+(5\rightarrow 1) \qquad (11)$$

Similarly, a negative movement in the X direction is defined as follows:

$$N_X=(3\rightarrow 1)+(5\rightarrow 3)+(1\rightarrow 5) \qquad (12)$$

where the numbers 1, 3 and 5 in both sets of Equations 11 and 12 refer to the states 1, 3 and 5 shown in FIG. 23. It will be noted that Equations 11 and 12 are based upon the availability of information as to both a past and present position of the encoder armature. Thus, defining a positive change in X as translating from state 1 to state 3 means that it is necessary to store the position at state 1 and compare this state with the position at state 3. Likewise, if the armature should be rotated in the opposite direction, it would be necessary to compare state 5 with state 1.

The requisite data storage for obtaining digital data repersenting the magnitude and polarity of stylus movements in the X direction is provided for the X axis encoder by the S1 and S2 flip-flops and associated logic circuitry interconnecting these flip-flops with the outputs of the N one-shot multivibrator. The unique states provided by the two flip-flops S1 and S2 are utilized to store the state corresponding to the previous position of the digital encoder as follows:

$$S1=N1\ N2 \text{ or } N3\ N2 \qquad (13)$$

$$\overline{S1}=N1\ N3 \qquad (14)$$

$$S2=N1\ N3 \text{ or } N2\ N3 \qquad (15)$$

$$\overline{S2}=N1\ N2 \qquad (16)$$

Substituting these states and the respective N states corresponding to the positions into Equations 11 and 12 allows the following equations to be written defining a positive and negative movement in the X direction:

$$P_X=\overline{S2}\ N1\ N3+\overline{S2}\ N2\ N3+S1\ S2\ N1\ N2 \qquad (17)$$

$$N_X=\overline{S1}\ N1\ N2+S1\ S2\ N1\ N3+\overline{S2}\ N2\ N3 \qquad (18)$$

where the N outputs represent the new position of the encoder armature and the S outputs represent a previous position of the encoder armature stored in the S flip-flops.

The logical equations for the input logic of the S1 and S2 flip-flops are as follows:

$$0S1=N1\ N3\ M1\ C2 \qquad (19)$$

$$1S1=(N1+N3)\ N2\ M1\ C2 \qquad (20)$$

$$0S2=N1\ N2\ M1\ C2 \qquad (21)$$

$$1S2=(N1+N2)\ N3\ M1\ C2 \qquad (22)$$

Similar unique states are provided by the S2 and S4 flip-flops for storing the prior states of the Z axis encoder armature. Logical equations may be written for the input logic of the S3 and S4 flip-flops associated with the Z axis encoder as follows:

$$0S3=N4\ N6\ M1\ C2 \qquad (23)$$

$$1S3=N4+N6)\ N5\ M1\ C2 \qquad (24)$$

$$0S4=N4\ N5\ M1\ C2 \qquad (25)$$

$$1S4=(N4+N5)\ N6\ M1\ C2 \qquad (26)$$

Referring to logical Equations 19–22, it will be apparent that the flip-flops S1 and S2 are triggered in accordance with Equations 13–16 above in synchronism with the M1 C2 clock which extends for Δ time at times $T_1$, $T_3$, $T_5$ and $T_7$.

The logical equations of the input logic of the S1 and S2 flip-flops are mechanized in the schematic diagram of FIG. 24. The logical equations associated with the inputs of the S3 and S4 flip-flops are mechanized in the schematic diagram of FIG. 25. The design of the logic circuitry in FIG. 24 and additional schematics described below is well known in the art. Thus, diodes 700, 701 and 702 provide an AND gate for ANDing the outputs of the N1 and N2 one-shot multivibrators with the M1 clock. The output of this AND gate is applied to an input of an OR gate comprising diodes 705 and 706. The output of this OR gate is ANDed with the C2 clock by diode 710 and applied to the true input of flip-flop S1, which input is labeled in the diagram as 1S1.

Improved increment discrimination

Improved incremental discrimination is afforded by discarding states 2, 4 and 6 of FIG. 23 and leaving dead zones between the active states 1, 3 and 5. The reason for such improvement is most easily understood by considering the problems which would be present without these unused states or dead zones. For example, if a positive incremental change in X were defined as a change from state 1 to state 2, it will be apparent that if the encoder armature rested on or very close to the separation between the two boundaries separating the states, any small motion of the stylus would cause the system to oscillate between state 1 and state 2. This would be recorded on the magnetic tape as repeated plus and minus increments of motion. If the encoder armature happened to be right on the line between the states, no movement at all would be required to record a plus or minus increment since the noise inherent in the system would be sufficient. Such operation, of course would be wholly undesirable since it is desired to record only legitimate positive or negative increments resulting from an actual movement of the stylus through the distance corresponding to the detected increment. Further, when the stylus is at rest, a zero representation is desired so that no increments are then recorded on the tape. By leaving the unused states or dead zones 2, 4 and 6, a definite movement of the stylus resulting in a definite movement of the decoder armature is required in order to initiate an incremental change in the position or negative direction.

A1 and A2 flip-flop stages

The stored states in the S1 and S2 flip-flops are compared four times each record cycle as determined by the clock D2 C2 with the outputs of the N one-shot multivibrators by the input logic circuitry of the A1 and A2 flip-flops for deriving the X data bits.

The logical equations for the input logic of these flip-flops are as follows:

$$0A1 = H1\ \overline{IRG}\ C2 \quad (27)$$

$$1A1 = (\overline{S2}\ N1\ N3 + \overline{S1}\ N2\ N3 + S1\ S2\ N1\ N2)\ D2\ C2 \quad (28)$$

$$0A2 = H1\ \overline{IRG}\ C2 \quad (29)$$

$$1A2 = (\overline{S2}\ N2\ N3 + \overline{S1}\ N1\ N2 + S1\ S2\ N1\ N3)\ D2\ C2 \quad (30)$$

The Equations 27 and 28 are mechanized in the schematic diagram of FIG. 27 and the logical Equations 29 and 30 are mechanized in the schematic diagram of FIG. 28.

It will be noted that Equations 28 and 30 defining the true inputs of the A1 and A2 flip-flops, respectively, are identical with Equations 17 and 18 above except that the D2 C2 clock is ANDed with these functions for timing purposes. Thus, the A1 flip-flop is triggered ON for each increment of displacement in a +X direction and the A2 flip-flop is triggered ON for each increment of displacement in the −X direction. Accordingly flip-flops A1 and A2 store the magnitude and polarity of the change in X for use both in the decoding of the Z information and for eventual recording on the magnetic tape.

A3 and A4 flip-flop stages

Flip-flops A3 and A4 are associated with the Z axis encoder. The stored states in the S3 and S4 flip-flops are compared four times each record cycle with the outputs of the N4, N5 and N6 one-shot multivibrators by the input logic circuitry of the A3 and A4 flip-flops for deriving the Z data bits from the Z axis encoder.

The logical equations associated with the inputs of these flip-flops are as follows:

$$0A3 = H1\ \overline{IRG}\ C2 \quad (31)$$

$$1A3 = (\overline{S4}\ N4\ N6 + \overline{S3}\ N5\ N6 + S3\ S4\ N4\ N5)\ D2\ C2 \quad (32)$$

$$0A4 = H1\ \overline{IRG}\ C2 \quad (33)$$

$$1A4 = (\overline{S4}\ N5\ N6 + \overline{S3}\ N4\ N5 + S3\ S4\ N4\ N6)\ D2\ C2 \quad (34)$$

The logical Equations 31, 32 of the input logic of the A3 flip-flop are mechanized in the schematic diagram of FIG. 32. The logical Equations 33, 34 of the input logic of the A4 flip-flop are mechanized in the schematic diagram of FIG. 33. The A3 flip-flop is triggered true for each +Z incremental displacement and the A4 flip-flop is triggered true for each −Z incremental displacement of the Z axis armature encoder. Accordingly, flip-flops A3 and A4 store the magnitude and polarity of the change in Z. This information is used for obtaining the magnitude and polarity of movements along the Y axis for recording on the magnetic tape.

The A1, A2, A3 and A4 flip-flops are reset at the end of each record cycle (see Equations 27, 29, 31, 33, and FIG. 14) unless the IRG function has been energized. As described hereinafter, their reset is inhibited during IRG so that movement of the stylus will then energize the trace error alarm.

The various states for the A3 and A4 flip-flops in conjunction with the states of the A1 and A2 flip-flops are designated in FIG. 26. It will be seen that the four flip-flops A1, A2, A3 and A4 are utilized to provide nine unique states which define all possible combinations of incremental displacement of the X and Z encoder armatures.

B1 and B2 flip-flop stages

Referring to the timing diagram of FIG. 14, it will be noted that the outputs of the A1 and A2 flip-flops are sampled at the end of each record cycle and the B1 and B2 flip-flops set accordingly. The B1 and B2 flip-flops represent + or − incremental motion of the stylus along the X coordinate axis of the tracing bed. Subsequently, the data stored in the B flip-flops is recorded during the succeeding record cycle and also used as an input to the Z and Y recording logic as shown in FIG. 12 and described in detail hereinafter.

The logical equations for the inputs of the B1 and B2 flip-flops are as follows:

$$0B1 = (\overline{M3}\ D2 + \overline{Q1}\ ENT + SW(CLR)\ \overline{Q1} + X5 + IRG)C2 \quad (35)$$

$$1B1 = \text{A}A1\ \overline{A2}\ H1\ Q1 + SW(1)\ \overline{ENT}\ \overline{Q1})\ \overline{X5}\ \overline{IRG}\ C2 \quad (36)$$

$$0B2 = (\overline{M3}\ D2 + \overline{Q1}\ ENT + SW(CLR)\ \overline{Q1} + X5 + IRG)\ C2 \quad (37)$$

$$1B2 = (A2\ \overline{A1}\ H1\ Q1 + SW(2)\ \overline{ENT}\ \overline{Q1})\ \overline{X5}\ \overline{IRG}\ C2 \quad (38)$$

Equation 36 denotes that flip-flop B1 is placed in its true ON state when flip-flop A1 is in its true state and flip-flop A2 is in its false state at the clock time H1 C2. The term Q1 is determined by the mode selector switch 30 and represents the tracer mode. The $\overline{X5}$ and $\overline{IRG}$ connote that the B1 flip-flop is not allowed to become true when X5 or IRG is true in order to inhibit recording data during the Inter-Record Gap. The other portion of Equation 36 defines setting the B1 flip-flop by Switch "1" of the manual selector keyboard 31.

Logical Equation 38 is directed to the true input of the B2 flip-flop is quite similar to the corresponding logical Equation 36 true input of the B1 flip-flop, the only difference being the respectively opposite connections to the A1 and A2 flip-flops.

The equations defining the false inputs of the B1 and B2 flip-flops are the same, the $\overline{M3}$ D2 C2 term defining that these flip-flops are reset at the time $T_3+\Delta$ as shown in the timing diagram of FIG. 14. The other terms define that the B1 and B2 flip-flops are reset when the ENTER button is actuated and the system is not in the tracer mode ($\overline{Q1}$ ENT); and when the CLEAR button is actuated, and the device is not in the tracer mode (SW(CLR $\overline{Q1}$)

Also, these flip-flops are reset during IRG (X5+IRG).

Logical Equation 35 defining the false input logic of the B1 flip-flop is mechanized in the schematic diagram 29. Logical Equation 37 defining the false input logic of the B2 flip-flop is mechanized in the schematic of FIG. 30. The logical Equations 36 and 38 defining the true input logic of the B1 and B2 flip-flops are mechanized in the schematic of FIG. 31.

B4 and B8 flip-flop stages

The B4 and B8 flip-flop stages and their input logic networks modify the X and Z encoded data to data corresponding to incremental motion of the stylus along the Y coordinate axis of the tracing bed 15.

The logical equations defining the input logic of the B4 and B8 flip-flops are as follows:

$$0B4 = [B1\ B4\ H2\ \overline{M1} + \overline{B2}\ \overline{M3}\ D2 + D2\ \overline{M3}\ \overline{M4} + ENT\ \overline{Q1} + SW(CLR)\ \overline{Q1} + X5 + \overline{B8}\ \overline{M3}\ D2]\ C2 \quad (39)$$

$$1B4 = [(A3\ \overline{A4}\ \overline{M3}\ \overline{M4} + B2\ \overline{B8}\ H2 + B1\ B8\ H2)\ \overline{M1}\ Q1 + SW(4)\ \overline{ENT}\ \overline{Q1}]\ \overline{IRG}\ C2 \quad (40)$$

$$0B8 = [B8\ B2\ H2\ \overline{M1} + B2\ \overline{M3}\ D2 + \overline{M3}\ \overline{M4}\ D2 + SW(CLR)\ \overline{Q1} + \overline{Q1}\ ENT + X5 + \overline{B4}\ \overline{M3}\ D2]\ C2 \quad (41)$$

$$1B8 = [(B2\ B4\ H2 + B1\ \overline{B4}\ H2 + \overline{A3}\ A4\ \overline{M3}\ \overline{M4})\ Q1\ \overline{M1} + SW(8)\ \overline{ENT}\ \overline{Q1}]\ \overline{IRG}\ C2 \quad (42)$$

These equations are respectively mechanized in the schematic diagrams of FIGS. 34, 35, 36 and 37.

Referring to the table of FIG. 26 and the timing diagram of FIG. 14, it will be noted that at time $T_0$, the B1, B2, B4 and B8 flip-flops are set to the values stored in the A flip-flops at the end of the previous record cycle. The set B4 flip-flop then represents a +Z increment and the B8 flip-flop a −Z increment. At time $T_2$, determined by the clock H2 $\overline{MI}$ C2, the B4 and B8 flip-flops are set to a state which is referred to on the timing diagram as the quasi Y state. At this time, the equation $Y=Z-X$ is performed by the logic networks of FIGS. 34–37. For example, if at time $T_0$, both the B1 and B4 flip-flops are triggered to their true states indicating plus values of X and Z, it will be apparent from the equation $Y=Z-X$ that the value of Y is zero for these particular conditions. Referring to FIG. 26, it may be noted in mode 4 that the B4 flip-flop is triggered to its OFF state at time $T_2$ if B4 and B1 are then true. This function is likewise defined as the first component of logical Equation 39.

It will also be noted that in modes 5 and 7 of FIG. 26, the values of X and Z are such as to give Y values of +2 and −2, respectively from the equation $Y=Z-X$. The information designating the +2Y or −2Y condition is stored in the B4 and B8 flip-flops by triggering both of these flip-flops ON at time $T_2$ as designated in FIG. 26. Recording the double valued Y's is performed by recording unitary values thereof at two different times during a complete record cycle. These values are recorded on the magnetic tape by successively recording unit values of either +Y or −Y as required in order to fulfill the equation $Y=Z-X$. Thus, in the first record interval between times $T_2$ and $T_3$ as shown in FIG. 14, the X values in flip-flops B1 and B2 are recorded and also the Y values except in modes 5 and 7. In mode 5, a +Y is recorded and in mode 7, a −Y is recorded depending upon the states of the B1 and B2 flip-flops (see Equations 39 and 41). The values actually recorded on the tape in the intervals between time $T_2$ and $T_3$ for each of the respective modes 0 through 8 are listed in the table of FIG. 26.

At the end of the first recording of the signals on the magnetic tape, the B1 and B2 flip-flops are reset to zero and with the exception of modes 5 and 7, so also are the B4 and B8 flip-flops. In mode 5 the B4 flip-flop is reset to zero and in mode 7, the B8 flip-flop is reset to zero so that subsequently in the second record interval between times $T_6$ and $T_7$, the remaining +Y or −Y increment stored in the B4 or B8 flip-flops is recorded on the magnetic tape. For example, in mode 5 which corresponds to an output of +2Y, at the end of the previous recording interval between $T_2$ and $T_3$, the B8 flip-flop is reset to zero, thus leaving only the B4 flip-flop in its true state representing the value of +Y. This value is subsequently recorded in the interval between times $T_6$ and $T_7$ as shown at 751. Accordingly, in both of the recording intervals shown in 750 and 751 during mode 5, a +Y value is recorded on the magnetic tape so that the final processing computer will receive a total value of +2Y. Subsequently, at time $T_7+\Delta$, any remaining set B4 or B8 flip-flop is reset to its zero state so as to be in condition for sampling the outputs of the A flip-flops which have meanwhile been filled with data from the Z axis digital encoder.

Record logic

The data recorded on the magentic tape is read from the B1, B2, B4 and B8 flip-flops through respective write logic in the record logic 290 (FIGS. 12 and 13). This write logic is defined by the following logical equations:

$$W1=B1 \quad (43)$$

$$W2=B2 \quad (44)$$

$$W4=B4\ \overline{B1}\ D1+\overline{Q1}\ B4 \quad (45)$$

$$W8=B8\ \overline{B2}\ D1+\overline{Q1}\ B8 \quad (46)$$

These equations are mechanized by the circuit network of FIG. 38.

The digitizer shown and described herein does not record any information unless the stylus has moved through a predetermined distance in the X or Y direction. This is accomplished by the U2 one-shot multivibrator and its input logic network which generates a step and record signal only if one or more of B8, B4, B2 or B1 flip-flops are true. Thus, if all of these flip-flops are false, indicating that the stylus has remained at a fixed position, no step and record signal is transmitted to the recorder for advancing the magnetic tape.

The logical equation of the input logic of the U2 one-shot is as follows:

$$U2=([B8+B4+B2+B1]\ \overline{AA}\ \overline{BB}\ D1 +SW\ (ENT)\ \overline{ENT})\ M2\ \overline{M3}\ \overline{IRG}\ M1 \quad (47)$$

This equation is mechanized by the network shown schematically in FIG. 41. The step and record function is ANDed with the $\overline{IRG}$ term so that no step and record signal can be transmitted to the tape recorder while the IRG is entered. Also, it will be noted that the step and record signal is produced each time the ENTER button is manually actuated.

IRG control logic

The IRG or Inter-Record-Gap function provides a three-quarter inch empty gap on the magnetic tape each time the IRG selector button is depressed. Furthermore, this gap is automatically provided any time the mode selector switch 30 is actuated to go from the keyboard mode to the tracer mode.

The MC one-shot, the flip-flop X5, and the IRG one-shot multivibrator control the IRG function and blank all of the information going out to the tape recorder in order to leave the tape completely empty for this ¾" gap. This is performed by resetting the B1, B2, B4, B8, BB and AA flip-flop stages to zero. This function is defined in the logical Equations 35, 37, 39, 41, 52 and 54.

The logical equations defining the input logic network of the MC one-shot, the X5 flip-flop and the IRG one-shot are as follows:

$$1[(MC)]=SW(IRG)+SW\ (Q1) \quad (48)$$

$$0X5=\overline{MC}\ X5\ C2 \quad (49)$$

$$1X5=(MC)\ (\overline{IRG})\ C2 \quad (50)$$

$$1(IRG)=X5\ \underline{X5} \quad (51)$$

Referring to logical Equation 51, the $\underline{X5}$ refers to the use of the output of the X5 flip-flop as a timing function.

These logical equations are mechanized in the circuitry shown in FIG. 39. As shown therein, upon actuation of the IRG selector switch 774, the lead 777 connected to the input of the MC one-shot multivibrator is grounded regardless of whether transistor 776 is ON or OFF. This grounding of the lead 777 results in a voltage drop thereon causing the MC one-shot to trigger. Accordingly, the IRG function may be selected regardless of the position of the mode selector switch 30.

Triggering of the MC one-shot turns the X5 flip-flop ON. As a result, the IRG one-shot is triggered, resulting in blanking all of the information going out to the tape recorder.

In addition, as shown in FIG. 39, when the tracer selector switch 30 is returned to its tracer position and Q1 is true, a positive voltage is applied to the anode of diode 775 causing transistor 776 to conduct. The resulting sharp voltage drop on lead 777 connected to the input of the MC one-shot causes this stage to be triggered. In this manner, the IRG function is automatically obtained each time the mode selector switch 30 is returned to the tracer mode. As described above, this feature prevents the operator from erroneously going back into the tracer mode and beginning a tracer operation before inserting a new Inter-Record-Gap.

The AA and BB flip-flop stages

The AA and BB flip-flops are used for storing data bits to be written on the A and B channels of the magnetic tape. The logical equations defining the input logic to these stages are as follows:

$$0AA=[ENT+SW(CLR)+X5\ Q1+IRG]\ C2 \quad (52)$$

$$1AA=[SW(A)\ \overline{ENT}]\ \overline{IRG}\ C2 \quad (53)$$

$$0BB=[ENT+SW(CLR)+IRG]\ C2 \quad (54)$$

$$1BB=[SW(B)\ \overline{ENT}\ \overline{IRG}]\ C2 \quad (55)$$

Thus, the stages are respectively triggered ON by the A and B switches of the keyboard and triggered OFF by the ENTER switch, clear switch and IRG.

Mode selector switch and manual keyboard entry

The tracer mode and manual keyboard entry mode are determined by the mode selector switch 30 (FIGS. 1 and 12) whose ON position is designated as SW(Q1) and whose OFF position is designated as SW($\overline{Q1}$). This switch controls the Q1 flip-flop. The circuitry associated with the tracer mode switch 30 is shown in FIG. 40.

The keyboard mode is determined by resetting the switch 30 (FIG. 39) Q1 flip-flop to its OFF state and is defined in the logical equations as $\overline{Q1}$. Previously, it was noted that when the tracer switch 30 is actuated, transistor 776 is turned on. When the switch is moved from the tracer to the keyboard mode, this transistor is allowed to go off and its collector will rise to plus 18 volts. The collector will stay at this potential until the instant that the mode switch 30 engages the 18 volt supply and provides base excitation to transistor 776.

The logical equations associated with the Q1 flip-flop are as follows:

$$\text{keyboard}=0Q1=[SW(\overline{Q1})+SW(A)\ \overline{ENT}\ \overline{IRG} +SW(B)\ \overline{ENT}\ \overline{IRG}]\ C2 \quad (56)$$

$$\text{trace } 1Q1=[ENT+X5+CLE]\ SW(Q1)\ C2 \quad (57)$$

wherein Equation 56 represents the keyboard entry mode and Equation 57 represents the tracer mode, ENT is the output of the ENTER switch and CLE is the output of the CLEAR switch.

A feature of the invention is that the operator may enter the keyboard mode under certain conditions without actuating the mode selector switch. Thus, referring to Equation 56, it will be noted that the keyboard mode is obtained when either of the A or B selector switches SW(A) or SW(B) is depressed and the machine is not in ENTER or IRG. This permits the operator to mark any particular point with a special recorded code by entering any code preceded with A or B and depressing the ENTER button. The special code is recorded and the machine automatically returned to the tracer mode.

Trace error audio and visual alarm

The trace error network detects if a displacement increment is indicated at the output of the pick-offs identical to the state already stored in the S flip-flops during a given recording cycle. As previously described, this provides a means for detecting whenever the encoder armature traverses a distance greater than one increment of motion in the time allotted for recording a data bit corresponding to an incremental movement. Although high speed incremental recorders permit a very high recording rate, i.e. 125 inches of analog trace per minute, the operator may inadvertently jerk the stylus so as to momentarily exceed the recording capability of the machine.

The logical equations associated with the input of the ES flip-flop are as follows:

$$1(ES)=((\overline{S4}\ N4\ N6+\overline{S3}\ N5\ N6 +S3\ S4\ N4\ N5)\ A3\ \overline{A4}+(\overline{S4}\ N5\ N6 +\overline{S3}\ N4\ N5+S3\ S4\ N4\ N6)\ \overline{A3}\ A4 +\overline{S2}\ N1\ N3+\overline{S1}\ N2\ N3 +S1\ S2\ N1\ N2)\ A1\ \overline{A2}+(\overline{S2}\ N2\ N3 +\overline{S1}\ N1\ N2 +S1\ S2\ N1\ N3)\ \overline{A1}\ A2)\ D2\ C2 \quad (58)$$

$$0(ES)=B4\ B8\ \underline{U2}\ \overline{B1}\ \overline{B2}\ \overline{AA}\ \overline{BB} \quad (59)$$

where $\underline{U2}$ is a timing function. Equation 58 is mechanized in the schematics of FIGS. 42*a* and 42*b*, these figures representing a common schematic joined by lead 900; and Equation 59 is mechanized in the schematic of FIG. 42*d*.

The operation of the error detector is as follows. A first series of AND gates ANDs the outputs $\overline{S2}$, N1, N3 so as to produce a signal if the encoder armature advances to the same position as is stored in the S2 flip-flop. Similarly, the other encoder positions are compared with their corresponding S flip-flop states. If two like states are produced when the stylus is advanced in the +X direction during a single record gap an error signal [E(+X)] is applied on lead 901. Similarly, any error in the −X direction appears as error signal [E(−X)] on lead 902, an error in the +Z direction appears as error signal [E(+Z)] on lead 903 and an error in the −Z direction appears as error signal [E(−Z)] on lead 904 so as to provide an error input to the ES flip-flop at time D2 C2.

The output of the ES flip-flop is used for energizing both the indicator light 29 on the front panel control board and the load speaker 372. The logical equations associated with the input of the indicator light (IL) (ES) and the input of the speaker (IL) (SPK) are as follows:

$$I(L(ES))=((A1+A2+A3+A4)\ \overline{ES}+ES\ F2 \quad (60)$$

$$I(L(SPK))=ES\ \overline{M1} \quad (61)$$

These equations are mechanized in the schematic of FIG. 42*c*.

Referring to logical Equation 60 and FIG. 42*c*, it will be seen that the indicator light is energized when the error flip-flop ES is triggered. The function F2 is an alternating pulse wave for providing a blinking indicator lamp. Likewise, it will be seen that the indicator lamp is continuously energized if any of the A flip-flop stages are true coincident with the ES stage being false. The latter circuitry provides an error detection whenever the machine is in the IRG mode. At such time, the A flip-flops are inhibited from being reset to zero and so will be triggered upon movement of the stylus. Accordingly, the operator is given visual indication if the stylus has been moved during entry of an Inter-Record-Gap.

A tone is emitted from the loud speaker 372 by ANDing the output of the ES flip-flop with the clock $\overline{M1}$ so that the operator is provided with both a visual and audio signal should he exceed the recording rate of the digitizer.

The trace error flip-flop is reset only upon entry of a special 8–4 code as shown by Equation 59 and the network of FIG. 42*d*. In this manner, the operator is required to go out of the tracing mode and enter this error code on the magnetic tape before the trace error light 29 and audio alarm will be turned off. When he returns to the tracing mode, an Inter-Record-Gap is automatically entered so as to insure that the processing computer disregards the portion of the tape containing the error and only that portion thereof.

Conclusion

In conclusion, it will be seen that the graphical data digitizer described above provides an economical, rapid means for accurately digitizing graphical data on practically any format. Graphical data may be on opaque, translucent or transparent material and even very faint data may be quickly and accurately digitized. Furthermore, the invention reduces the inertia and friction loads on the stylus to a point wherein the movement corresponds to that of a pencil so that the operator is able to trace over even the most intricate plots and produce a highly accurate digitization of the graphical data.

Although and exemplary embodiment of the invention has been disclosed in detail and discussed hereinabove, it will be understood that numerous other applications of the invention are possible and that the embodiment disclosed may be subjected to various changes, modifications and substitutions without departing from the spirit of the invention.

We claim:

1. A graphical data digitizer comprising
a housing;
a tracing bed supported by said housing for receiving the graphical data;
a stylus for tracing said graphical data;
a carraige assembly mounting said stylus in juxtaposition with said tracing bed for movement along respective orthogonal axes;
means for converting movement of said stylus along said respective orthogonal axes into two channels of digital data including first and second digital encoder means supported by the housing and not supported by said carriage assembly but coupled to said carriage assembly by a low mass, low inertia means; and
means for recording said digital data as individual characters on respective channels of a recording media representing positive and negative incremental movements of said stylus along said respective orthogonal axes.

2. The graphical data digitizer of claim 1 wherein said carriage assembly includes
a rod supported for transverse movement across said tracing bed, and
a stylus housing slideably supported on said rod.

3. The graphical data digitizer of claim 1 wherein
said stylus includes a low friction member adapted for engaging the surface of said tracing bed, and
parallax free means for accurately following the graphical data comprising a transparent member having a face closely proximate the surface of said tracing bed, and a cross hair inscribed on said face.

4. The graphical data digitizer of claim 1 wherein said carriage assembly is coupled to said converter means by flexible, substantially continuous cables.

5. The graphical data digitizer of claim 1 wherein said carriage assembly comprises
a rod supported for transverse movement across said tracing bed,
flexible cable means fixedly connected to opposite ends of said rod so that movement at one end of said rod produces an equal force at the opposite end thereof in both directions of movement across said tracing bed, and
rotatable means for freely supporting said cable means for movement in either direction along its length.

6. The graphical data digitizer of claim 5 wherein said first digital encoder includes a rotatable input member operatively coupled to said flexible cable means.

7. The graphical data digitizer of claim 6 wherein said rotatable input member includes a pulley having a helical groove therein with said cable means being wound around said pulley one or more times, said groove having a sufficient number of turns to allow travel of said cable therein as said rod is translated between opposite ends of the tracing bed.

8. The graphical data digitizer of claim 2 including
flexible cable means for connecting said stylus housing to a rotatable input of said second digital encoder.

9. The graphical data digitizer of claim 1 wherein
said first and second digital encoder means provides a plurality of unique states as the stylus traces said graphical data, adjacent ones of said unique states being separated by dead zones so that the stylus must be moved through a predetermined distance before a digital output is generated.

10. The graphical data digitizer of claim 1 wherein each of said digital encoder means produces plural unique states according to incremental movement of the stylus along said respective orthogonal axes, said digitizer further including
means for storing respective ones of said unique states, and
means for deriving the digital data by comparing the output of the digital encoder with the previous states stored in said storage means.

11. The graphical data digitizer of claim 10 including
a plural storage means for storing said derived digital data,
means for periodically sampling data from each of said plural storage means,
means for combining data from each of said channels, and
means for connecting the data sampled from one of said channels to said recording means and means for connecting data derived from said combined channels to said recording means.

12. The graphical data digitizer of claim 1 including
first and second means responsive to said first and second digital encoders for storing digital data corresponding to the magnitude and polarity of incremental motion of said stylus,
means for modifying data stored in said second storage means during each record cycle, and
means for periodically writing the data in each of said first and second storage elements on said recorder means.

13. The graphical data digitizer of claim 10 comprising
mode selector means for selectively filling said first and second storage means from said first and second digital encoder means or from a manual entry keyboard.

14. The graphical data digitizer of claim 1 wherein said first digital encoder means is responsive to movement of said stylus along the X coordinate axis and the second digital encoder is responsive to movement of the stylus along the X and Y axes, said digitizer further including
a clock for defining a record cycle,
first storage means responsive to said first digital encoder means for storing digital data corresponding to +X incremental motion during each record cycle,
second storage means responsive to said first digital encoder means for storing digital data corresponding to —X incremental motion during each record cycle,
third storage means responsive to said second digital encoder for storing digital data corresponding to +Z incremental motion during each record cycle,
fourth means responsive to said second digital encoder for storing digital data corresponding to —Z incremental motion during each record cycle,
means responsive to the outputs of said first and second stoarge means for modifying during each record cycle the data stored in said third and fourth storage means according to the equation $Y=Z-X$ so that said third storage means is reset with data corresponding to +Y incremental motion and said fourth storage means is reset with data corresponding to —Y incremental motion, and
means responsive to said clock for writing the data in each of said first, second, third and fourth storage means on said recorder means during each record cycle.

15. The graphical data digitizer of claim 14 wherein said clock defines first and second recording intervals for each record cycle so that data corresponding to +2Y and —2Y are recorded as individual characters on said recording means during said respective first and second recording intervals.

16. The graphical data digitizer of claim 1 wherein said first and second digital encoders include a stationary magnetic core having windings formed thereon, a rotatable magnetic armature which varies the reluctance path interconnecting said windings according to the rotational motion of said armature, and means for substantially cancelling that portion of the encoder output signal independent of movement of said armature and providing a zero crossing signal for each increment of movement thereof.

17. The graphical data digitizer of claim 1 wherein each of said digital encoders comprises a rotatable armature having periodically spaced teeth an air gaps cooperating with a stationary magnetic core having an inner core and a pair of outer cores, a primary winding formed on said inner core and secondary windings respectively formed on said outer cores.

18. The graphical data digitizer of claim 1 wherein each of said digital encoders includes a movable magnetic member, and three magnetic pick-offs, each providing an output signal corresponding to motion of said magnetic member through a predetermined incremental distance, said pick-offs being physically spaced apart to provide output signals out of phase with respect to each other when a pulse is applied to said primary winding to provide plural unique states according to the magnitude and direction of incremental movement of the stylus.

19. A graphical data digitizer comprising tracing means for tracing graphical data;

digital encoder means for translating incremental movement of said tracing means and the direction of movement thereof into corresponding digital data;

data storage means responsive to said encoder means for storing data representing the magnitude and polarity of incremental motion of said tracing means;

a magnetic tape recorder; and control means responsive to data stored in said data storage means and operatively coupled to said tape recorder to automatically advance the magnetic tape and record the values stored in said storage means on the magnetic tape in response to and as a result of data corresponding to incremental motion of said tracing means having been previously stored in said data storage means.

20. A graphical data digitizer providing a completely floating zero position and unlimited zero-offset comprising a tracing bed for receiving the graphical data;

an asynchronously driven tracing means for physically tracing the input graphical data;

digital encoder means having an input driven in accordance with the asynchronous movements of said tracing means and synchronously driven output means for producing digital data representing the magnitude and polarity of each incremental movement of said tracing means;

an incremental tape recorder;

means for coupling said digital data to said incremental tape recorder for recording said digital data on magnetic tape, said means being responsive to said data and preventing advancement of said tape if there is no data to be recorded; and mode selector means for interrupting data recording while said tracing means is translated between arbitrary first and second positions on said tracing bed so that the operator may resume recording digital data representing incremental movement of the tracing means from said arbitrarily selected second position without having recorded any data corresponding to movement of the tracing means between said first and second positions.

21. A graphical data digitizer comprising a housing;

a tracing bed supported by said housing for receiving the graphical data;

a stylus for tracing said graphical data;

a carriage assembly mounting substantially only said stylus for movement over said tracing bed, said carriage providing said movable support with minimum friction and inertia so that movement of the stylus closely duplicates writing with a pencil;

encoder means supported by said housing and not supported by said carriage assembly for converting incremental motion of said stylus into digital data; and means having very low mass and friction for (i) coupling said carriage assembly to said data encoding means, and (ii) maintaining accurate alignment of said carriage assembly with respect to said tracing bed.

22. A graphical data digitizer for recording data corresponding to movement of a tracing means and automatically detecting movements of said tracing means in excess of the rate at which data can be recorded comprising tracing means for physically tracing the input graphical data;

encoder means for converting incremental motion of the tracing means into digital data representing the magnitude and direction of each incremental movement of said tracing means;

recorder means for periodically recording said digital data, said recorder requiring a predetermined length of time for recording characters corresponding to said digital data; and means responsive to said encoder means for detecting the generation of digital data in excess of the recording capability of said recorder and for indicating to the operator that the tracing means has been moved in excess of the rate at which data can be recorded, said means immediately detecting any increment of movement of said tracing means occurring in a time period when the data corresponding to said increment of movement cannot be recorded because of a preceding incremental movement occurring during said same time period.

23. The graphical data digitizer of claim 22 comprising storage means responsive to said encoder means for storing digital data corresponding to the magnitude and polarity of incremental motion of said stylus, and means for comparing the outputs of said storage means with the outputs of said encoder means, for detecting the generation of data in excess of the recording capability of said recorder.

24. The graphical data digitizer of claim 22 comprising alarm means responsive to said means for detecting the generation of data in excess of the recording capability of said recorder, and means for selecting and recording a predetermined error code on said recorder, which means turns off said alarm means.

25. The graphical data digitizer of claim 24 comprising means for automatically leaving a blank interval on said magnetic tape when tracing is resumed after entry of said alarm code to provide the processing computer with a reference point for discarding that portion of the recorded data which contains an error.

26. A graphical data digitizer providing a convenient and rapid means for correcting tracing errors comprising tracing means for physically tracing the input graphical data;

encoder means for converting incremental motion of said tracing means into digital data representing the magnitude and direction of incremental motion of said tracing means;

data storage means responsive to said encoder means for storing data representing the magnitude and direction of incremental motion of said tracing means;

means for recording said digital data on magnetic tape;

control means operatively coupled to said means for recording said digital data on magnetic tape for automatically advancing the magnetic tape and recording thereon the values stored in said storage means so that incremental motion of said tracing means is recorded as individual characters on the magnetic tape, said control means responsive to data stored in said data storage means so that said stored data is automatically recorded as the graphical data is traced by said tracing means;

means for leaving blank intervals on said magnetic tape corresponding to arbitrary points on the graphical data by selectively advancing the magnetic tape while inhibiting the writing of data thereon;

means for selecting an error code and recording same on said magnetic tape, said error code addressing the processing computer so as to disregard data between the preceding blank interval and the blank interval following said error code; and means for automatically leaving a blank interval when the operator resumes tracing of the graphical data.

27. The graphical data digitizer of claim 26 comprising storage means for storing digital data responsive to the output of said encoder means, means for inhibiting resetting of said storage means during insertion of a bank interval on said magnetic tape, and means responsive to said storage means for notifying the operator if the stylus is moved during entry of a blank interval on said magnetic tape.

28. A digital encoder for translating motion into digital data comprising a movable armature having periodically spaced air gaps, three spaced magnetic cores juxtaposed said armature, each of said cores having a primary leg and associated primary winding and two secondary legs and associated secondary windings, the spacing between said primary leg and said secondary legs of each core corresponding to the spaced air gaps of said armature so that for each core the reluctance of the magnetic path bridging the primary leg with one of the secondary legs is at a maximum when the reluctance of the magnetic path bridging the primary leg with the other of the secondary legs is at a minimum, said cores being physically displaced from one another relative to the spaced air gaps of said armature to provide three signals on said secondary windings which are out of phase with respect to each other when a pulse is applied to said primary windings, said out-of-phase signals providing plural unique states according to the magnitude and direction of movement of said armature, and means for connecting the secondary windings of each of said cores in opposition so as to substantially cancel that portion of the signal which is independent of armature travel.

29. The digital encoder of claim 28 comprising means for pulsing the primary winding of each core and immediately thereafter connecting said primary winding to a low impedance path so as to increase the $L/R$ time constant and extend the length of time that current is maintained in said primary winding, and means for sensing the current in the secondary windings of each core a short time increment after pulsing said primary winding.

References Cited

UNITED STATES PATENTS

| | | | |
|---|---|---|---|
| 3,154,845 | 11/1964 | Pelton. | |
| 3,182,399 | 5/1965 | Price. | |
| 3,189,928 | 6/1965 | Pendleton. | |
| 3,241,132 | 3/1966 | Milan-Kamski | 340—347 |
| 3,253,273 | 5/1966 | Allen et al. | 340—347 |
| 3,288,074 | 1/1967 | Kedem | 24—257 |
| 3,323,132 | 5/1967 | Davis et al. | 346—17 |
| 3,346,724 | 10/1967 | Fuhrmeister et al. | 340—347 X |
| 3,372,485 | 3/1968 | Mangus et al. | |
| 3,189,890 | 6/1965 | Gilbert et al. | 340—347 |
| 3,200,395 | 8/1965 | Goldfarb et al. | 340—347 |
| 3,422,537 | 1/1969 | Dewey et al. | |

OTHER REFERENCES

Whistler, R.: "Cartesian Coordinate Planar Drive System," RCA Technical Notes, No. 339; November 1959.

DARYL W. COOK, Primary Examiner

M. K. WOLENSKY, Assistant Examiner

U.S Cl. X.R.

33—1

PO-1050
(5/69)

UNITED STATES PATENT OFFICE
CERTIFICATE OF CORRECTION

Patent No. 3,505,670 Dated April 7, 1970

Inventor(s) Ronald D. Cone and John A. Dykmans

It is certified that error appears in the above-identified patent and that said Letters Patent are hereby corrected as shown below:

Column 2, line 26 "hte" (first occurrence) should read --the--
line 34 "graphictl" should read --graphical--

Column 12, line 55 "elemnts" should read --elements--
Column 14, line 46 "W" should read --Y--
line 54 "1" should read --D1--
Column 18, line 44 After line 44 should be inserted the following two paragraphs --By way of example only, the following specific component values are given as typical of these which may be used in the pick-off driver stage shown in Fig. 20: all transistors are Sylvania type SYL 4597; all diodes are Sylvania type D6436; all capacitors are 1.2 MFD; resistors 560, 561, 562, 563, 531, 532, 565, 567, 569, 570, 571, 572, 573, 574 are 220 ohms; resistors 534, 568 are 3 ohms; and resistors 564, 566 are 3.3K ohms.

Representative component values for the read amplifier stage of Fig. 21 are as follows: all transistors are Sylvania type SYL 4597; all diodes are Sylvania type D6436; all capacitors are 1.2 MFD; resistors 583, 587, 590, 33K ohms; resistors 586, 588, 591, 5.6K ohms; resistor 580, 10K ohms; resistor 581, 680 ohms; resistor 582, 330 ohms; resistor 584, 3.3K ohms; and resistor 585, 120 ohms.--

Column 19, line 22 "$\bar{N}2$ $N\bar{3}$" should read --$\overline{N2}$ $\overline{N3}$--
line 24 "N1" should read --$\overline{N1}$--
line 70 "$\overline{S2}$" (second occurrence) should read --$\overline{S1}$--
Column 20, line 9 "S2" should read --S3--
line 16 "N4 + N6)" should read --(N4 + N6)--
Column 22, line 11 "AA1" should read --(A1--
Column 25, line 11 "$\overline{ENT}$ $\overline{IRG]}$" should read --$\overline{ENT]}$ $\overline{IRG}$--

PO-1050
(5/69)

UNITED STATES PATENT OFFICE

CERTIFICATE OF CORRECTION

Patent No. 3,505,670 Dated April 7, 1970

Inventor(s) Ronald D. Cone and John A. Dykmans PAGE - 2

It is certified that error appears in the above-identified patent and that said Letters Patent are hereby corrected as shown below:

Column 26, line 1 "+$\overline{S2}$" should read --+($\overline{S2}$--

SIGNED AND
SEALED
AUG 25 1970

(SEAL)
Attest:

Edward M. Fletcher, Jr.
Attesting Officer

WILLIAM E. SCHUYLER, JR.
Commissioner of Patents